US012298531B2

(12) United States Patent
Min et al.

(10) Patent No.: US 12,298,531 B2
(45) Date of Patent: May 13, 2025

(54) CAMERA MODULE

(71) Applicant: LG INNOTEK CO., LTD., Seoul (KR)

(72) Inventors: Sang Jun Min, Seoul (KR); Sang Ok Park, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 760 days.

(21) Appl. No.: 17/277,057

(22) PCT Filed: Oct. 7, 2019

(86) PCT No.: PCT/KR2019/013107
§ 371 (c)(1),
(2) Date: Mar. 17, 2021

(87) PCT Pub. No.: WO2020/076029
PCT Pub. Date: Apr. 16, 2020

(65) Prior Publication Data
US 2022/0035173 A1   Feb. 3, 2022

(30) Foreign Application Priority Data

Oct. 8, 2018 (KR) .................... 10-2018-0119627
Dec. 6, 2018 (KR) .................... 10-2018-0155784

(51) Int. Cl.
*G02B 27/64* (2006.01)
*G02B 7/02* (2021.01)
(Continued)

(52) U.S. Cl.
CPC ............. *G02B 27/646* (2013.01); *G02B 7/02* (2013.01); *G03B 3/10* (2013.01); *G03B 5/00* (2013.01);
(Continued)

(58) Field of Classification Search
CPC ..................................................... G03B 19/22
See application file for complete search history.

(56) References Cited

U.S. PATENT DOCUMENTS

2018/0150973 A1  5/2018  Tang et al.
2018/0239105 A1  8/2018  Lee et al.
(Continued)

FOREIGN PATENT DOCUMENTS

CN    107340668 A    11/2017
CN    107407849 A    11/2017
(Continued)

OTHER PUBLICATIONS

International Search Report dated Jan. 22, 2020 in International Application No. PCT/KR2019/013107.
(Continued)

*Primary Examiner* — Noam Reisner
(74) *Attorney, Agent, or Firm* — Saliwanchik, Lloyd & Eisenschenk

(57) ABSTRACT

A camera module may comprise a first camera module and a second camera module spaced apart from the first camera module, wherein: the first camera module comprises a cover, a housing, a bobbin, a first coil, a first magnet, a second coil, a second magnet, and a first sensor; the first magnet comprises a first-first magnet disposed at a position corresponding to a second lateral plate, a first-second magnet disposed at a position corresponding to a third lateral plate, and a first-third magnet disposed at a position corresponding to a fourth lateral plate; and a first dummy member and the first sensor are disposed at a position corresponding to a first lateral plate of the cover.

20 Claims, 40 Drawing Sheets

(51) Int. Cl.
*G03B 3/10* (2021.01)
*G03B 5/00* (2021.01)
*G03B 19/22* (2021.01)
*G03B 30/00* (2021.01)

(52) U.S. Cl.
CPC ............ *G03B 19/22* (2013.01); *G03B 30/00* (2021.01); *G03B 2205/0007* (2013.01); *G03B 2205/0069* (2013.01)

(56) References Cited

U.S. PATENT DOCUMENTS

| | | | |
|---|---|---|---|
| 2018/0352120 A1 | 12/2018 | Zurowski et al. | |
| 2019/0137723 A1 | 5/2019 | Bernal et al. | |
| 2019/0137850 A1 | 5/2019 | Ha et al. | |
| 2019/0204532 A1* | 7/2019 | Konuma | G02B 27/646 |
| 2019/0227255 A1* | 7/2019 | Hu | G03B 3/10 |
| 2019/0243087 A1* | 8/2019 | Osaka | G02B 27/646 |
| 2020/0033554 A1* | 1/2020 | Chan | H04N 23/45 |

FOREIGN PATENT DOCUMENTS

| | | |
|---|---|---|
| CN | 107783352 A | 3/2018 |
| EP | 3 798 724 A1 | 3/2021 |
| EP | 3 951 494 A1 | 2/2022 |
| JP | 2017-198988 A | 11/2017 |
| JP | 2017-227850 A | 12/2017 |
| KR | 10-2011-0080286 A | 7/2011 |
| KR | 10-2012-0025811 A | 3/2012 |
| KR | 10-2015-0104387 A | 9/2015 |
| KR | 10-1651115 B1 | 9/2016 |
| KR | 10-2017-0065951 A | 6/2017 |
| KR | 10-1792439 B1 | 10/2017 |
| KR | 10-1806888 B1 | 12/2017 |
| KR | 10-2018-0013286 A | 2/2018 |
| KR | 10-2018-0081978 A | 7/2018 |
| WO | 2018/182203 A1 | 10/2018 |

OTHER PUBLICATIONS

Supplementary European Search Report dated Jun. 14, 2022 in European Application No. 19872171.4.
Office Action dated Dec. 21, 2022 in Chinese Application No. 201980065836.0.
Office Action dated Mar. 30, 2022 in Chinese Application No. 201980065836.0.
Supplementary European Search Report dated Jun. 5, 2023 in European Application No. 20814116.8.
Office Action dated Aug. 1, 2023 in Japanese Application No. 2021-518596.
Office Action dated Dec. 19, 2023 in Korean Application No. 10-2018-0119627.
Office Action dated Mar. 5, 2024 in Korean Application No. 10-2018-0155784.

* cited by examiner (a)                                    (b)

CAMERA MODULE

CROSS-REFERENCE TO RELATED APPLICATIONS

This application is the U.S. national stage application of International Patent Application No. PCT/KR2019/013107, filed Oct. 7, 2019, which claims the benefit under 35 U.S.C. § 119 of Korean Application Nos. 10-2018-0119627, filed Oct. 8, 2018; and 10-2018-0155784, filed Dec. 6, 2018; the disclosures of each of which are incorporated herein by reference in their entirety.

TECHNICAL FIELD

This embodiment relates to a camera module.

BACKGROUND ART

As various portable terminals are widely spread and commonly used, and the wireless Internet services have been commercialized, the demands of consumer related to portable terminals have been diversified and various kinds of additional devices have been installed in portable terminals.

Among them, there is a camera module for photographing a subject as a photograph or a moving picture. Meanwhile, recently, a dual camera module in which two camera modules are disposed side by side has been studied.

However, although the need of customers to close the separation distance (gap) of the camera optical axis in the dual camera module is increasing, there is a problem that interference between magnets occurs due to the characteristics of the actuator. In particular, CLAF OIS is sensitive to magnetic field interference, making it difficult to dispose close proximity.

In addition, since it is difficult to apply the technology of a voice coil motor (VCM) used in a conventional camera module for a camera module for ultra-compact and low power consumption, related studies have been actively conducted.

In the case of a camera module mounted on a small electronic product such as a smartphone, the camera module may be frequently shocked during use, and the camera module may be slightly shaken due to the user's hand shake during photographing. In view of this point, in recent years, a technology for additionally installing a camera module for inhibiting hand shaking has been developed.

DETAILED DESCRIPTION OF THE INVENTION

Technical Subject

The first embodiment is to provide a dual camera module capable of minimizing mutual interference between magnets in a structure in which CLAF OIS actuators are disposed in dual.

The second embodiment is to provide a lens driving apparatus and camera modules and optical devices comprising the same capable of reducing the magnetic field interference between magnets comprised in two adjacent lens driving apparatuses mounted on the dual camera module, improving the electromagnetic force to perform the AF function, and balancing the electromagnetic force in the X-axis direction and the electromagnetic force in the Y-axis direction to perform the OIS function.

Technical Solution

A camera module according to a first embodiment comprises a first camera module and a second camera module spaced apart from the first camera module, wherein the first camera module comprises: a cover; a housing disposed inside the cover; a bobbin disposed inside the housing; a first coil disposed on the bobbin; a first magnet disposed inside the housing and facing the first coil; a second coil facing the first magnet; a second magnet disposed on the bobbin; and a first sensor detecting the second magnet, wherein the cover comprises: a first lateral plate disposed adjacent to the second camera module; a second lateral plate disposed on the opposite side of the first lateral plate; and a third lateral plate and a fourth lateral plate disposed on opposite sides between the first lateral plate and the second lateral plate, wherein the first magnet comprises: a first-first magnet disposed at a position corresponding to the second lateral plate; a first-second magnet disposed at a position corresponding to the third lateral plate; and a first-third magnet disposed at a position corresponding to the fourth lateral plate, and wherein a first dummy member and a first sensor may be disposed at a position corresponding to the first lateral plate of the cover.

The first dummy member comprises two dummy members spaced apart from each other, and the first sensor may be disposed between the two dummy members.

The first camera module further comprises a first substrate at least a portion thereof is disposed between the two dummy members, and the first sensor may be disposed on an inner surface of the first substrate.

The first camera module further comprises an upper elastic member coupled to an upper portion of the bobbin and an upper portion of the housing, wherein the upper elastic member comprises four upper elastic units, wherein the first substrate comprises four terminals formed on an outer surface of the first substrate, and wherein the four upper elastic units may be electrically connected to the four terminals, respectively.

The first camera module further comprises a lower elastic member coupled to a lower portion of the bobbin and a lower portion of the housing, wherein the lower elastic member comprises two lower elastic units, wherein the first substrate comprises two terminals formed at a lower portion the first substrate, and wherein the two lower elastic units may electrically connect the first coil and the two terminals of the first substrate.

The first camera module further comprises a base disposed below the housing, a second substrate disposed on an upper surface of the base, and four wires connecting the four upper elastic units and the second substrate, wherein the second coil is disposed on the second substrate, and wherein the second coil may comprise a second-first coil facing the first-first magnet, a second-second coil facing the first-second magnet, and a second-third coil facing the first-third magnet.

The first coil comprises a first-first coil facing the first-second magnet and a first-second coil facing the first-third magnet, wherein the first coil may not face the first-first magnet.

The first-first magnet is a two-pole magnet having different polarities of the inner surface and the outer surface, wherein each of the first-second magnet and the first-third magnet may be a 4-pole magnet in which an upper portion of an inner surface has a polarity different from that of a lower portion of the inner surface and an upper portion of the outer surface, and has same polarity as that of a lower portion of the outer surface.

The first dummy member is a non-magnetic body, and the first dummy member has a weight corresponding to the weight of the first-first magnet, wherein the first magnet may not be disposed at a position corresponding to the first lateral plate of the cover.

The second camera module comprises a cover; a housing disposed within the cover of the second camera module; a bobbin disposed in the housing of the second camera module; a first coil disposed on the bobbin of the second camera module; a first magnet disposed inside the housing of the second camera module and facing the first coil of the second camera module; a second coil facing the first magnet of the second camera module; a second magnet disposed on the bobbin of the second camera module; and a second sensor detecting the second magnet of the second camera module, wherein the cover of the second camera module comprises: a first lateral plate facing the first lateral plate of the first camera module; a second lateral plate disposed on the opposite side of the first lateral plate of the second camera module; a third lateral plate and a fourth lateral plate disposed opposite to each other between the first lateral plate of the second camera module and the second lateral plate of the second camera module, wherein the first magnet of the second camera module comprises: a first-first magnet disposed at a position corresponding to the second lateral plate of the second camera module; a first-second magnet disposed at a position corresponding to the third lateral plate of the second camera module; and a first-third magnet disposed at a position corresponding to the fourth lateral plate of the second camera module, and wherein a second dummy member and the second sensor may be disposed at a position corresponding to the first lateral plate of the cover of the second camera module.

A camera module according to a first embodiment comprises a first camera module and a second camera module, wherein the first camera module comprises: a cover, a bobbin disposed inside the cover; a first coil disposed on the bobbin; a first magnet facing the first coil; a second coil disposed below the first magnet; a second magnet disposed on the bobbin; and a first sensor that detects the second magnet, wherein the second camera module comprises: a cover; a bobbin disposed inside the cover of the second camera module; a first coil disposed on the bobbin of the second camera module; a first magnet facing the first coil of the second camera module; a second coil disposed below the first magnet of the second camera module; a second magnet disposed on the bobbin of the second camera module; and a second sensor for detecting the second magnet of the second camera module, wherein each of the cover of the first camera module and the cover of the second camera module comprises: a first lateral plate disposed adjacent to each other; a second lateral plate disposed opposite the first lateral plate; and a third lateral plate and a fourth lateral plate disposed opposite to each other between the first lateral plate and the second lateral plate, wherein the first magnet of the first camera module is disposed at a position corresponding to the second lateral plate to the fourth lateral plate of the first camera module, wherein the first magnet of the second camera module is disposed at a position corresponding to the second lateral plate to the fourth lateral plate of the second camera module, wherein a first dummy member and the first sensor are disposed at a position corresponding to the first lateral plate of the first camera module, and wherein a second dummy member and the second sensor may be disposed at a position corresponding to the first lateral plate of the second camera module.

A lens driving apparatus according to a second embodiment may comprise: a housing comprising a first side portion and a second side portion disposed opposite to each other, and a third side portion and a fourth side portion disposed between the first side portion and the second side portion and disposed opposite to each other; a bobbin disposed inside the housing; a first magnet disposed on the first side portion of the housing; a second magnet disposed on the second side portion of the housing; a third magnet disposed on the third side portion of the housing; a dummy member disposed on the fourth side portion of the housing; a first coil disposed on the bobbin and facing the first magnet; a second coil disposed on the bobbin and facing the second magnet; a first yoke disposed between the first magnet and an outer side surface of the first side portion of the housing; a second yoke disposed between the second magnet and an outer side surface of the second side portion of the housing; and a third coil comprising a coil unit facing each of the first to third magnets in an optical axis direction.

The lens driving apparatus may further comprise a third yoke disposed on the third magnet.

The first yoke is disposed on the first side surface of the first magnet, the second yoke is disposed on the first side surface of the second magnet, the first side surface of the first magnet is an opposite side of the second side surface of the first magnet facing the first coil unit, and the first side surface of the second magnet may be an opposite side of the second side surface of the second magnet facing the second coil unit.

The third yoke may be disposed between an upper surface of the third side portion of the housing and the third magnet.

The housing comprises at least one hole penetrating through the first and second side portions, and each of the first and second yokes may comprise at least one hole corresponding to the at least one first hole.

The housing comprises at least one third hole that penetrates the upper surface of the third side portion and is open toward the inner side of the housing, and the third yoke may comprise at least one third through hole corresponding to the at least one third hole.

Each of the first and second yokes comprises: a body disposed on the first side surface of each of the first and second magnets; and an extension portion extending from the body to at least one of a third side surface and an upper surface of each of the first and second magnets, wherein the third side surface may be a side surface disposed between the first side surface and the second side surface of each of the first and second magnets.

The third yoke may comprise a body disposed on an upper surface of the third magnet, and an extension portion extending from the body toward a side surface of the third magnet.

Each of the first and second magnets may comprise: a first magnet portion comprising a first N pole and a first S pole; a second magnet portion comprising a second N pole and a second S pole; and a first partition wall located between the first magnet portion and the second magnet portion and disposed between the first magnet portion and the second magnet portion in the optical axis direction.

The third magnet may comprise: a third magnet portion comprising a third N pole and a third S pole; a fourth magnet portion comprising a fourth N pole and a fourth S pole; and a second partition wall disposed between the third magnet portion and the fourth magnet portion and disposed between the third magnet portion and the fourth magnet portion in a direction perpendicular to the optical axis direction.

Advantageous Effects

Through the first embodiment, mutual interference between magnets can be minimized in a dual camera module in which CLAF OIS actuators are dually disposed.

Therefore, it is possible to minimize the gap between the two camera modules.

The second embodiment can reduce magnetic interference between magnets comprised in two adjacent lens driving apparatuses mounted on a dual camera module, and improve electromagnetic force for performing an AF function, and it is possible to balance the electromagnetic force in the X-axis direction and the electromagnetic force in the Y-axis direction to perform an OIS function.

BRIEF DESCRIPTION OF DRAWINGS

FIG. 31 is a side view of the configurations illustrated in FIG. 30a.

FIG. 32 is a plan view of the configurations illustrated in FIG. 30a.

FIG. 37b shows a housing, a circuit board, and a position sensor according to a second embodiment of FIG. 37a.

FIG. 38a shows an upper elastic member according to a second embodiment of FIG. 37a.

FIG. 38b shows a lower elastic member according to a second embodiment of FIG. 37a.

BEST MODE

Figure 1:
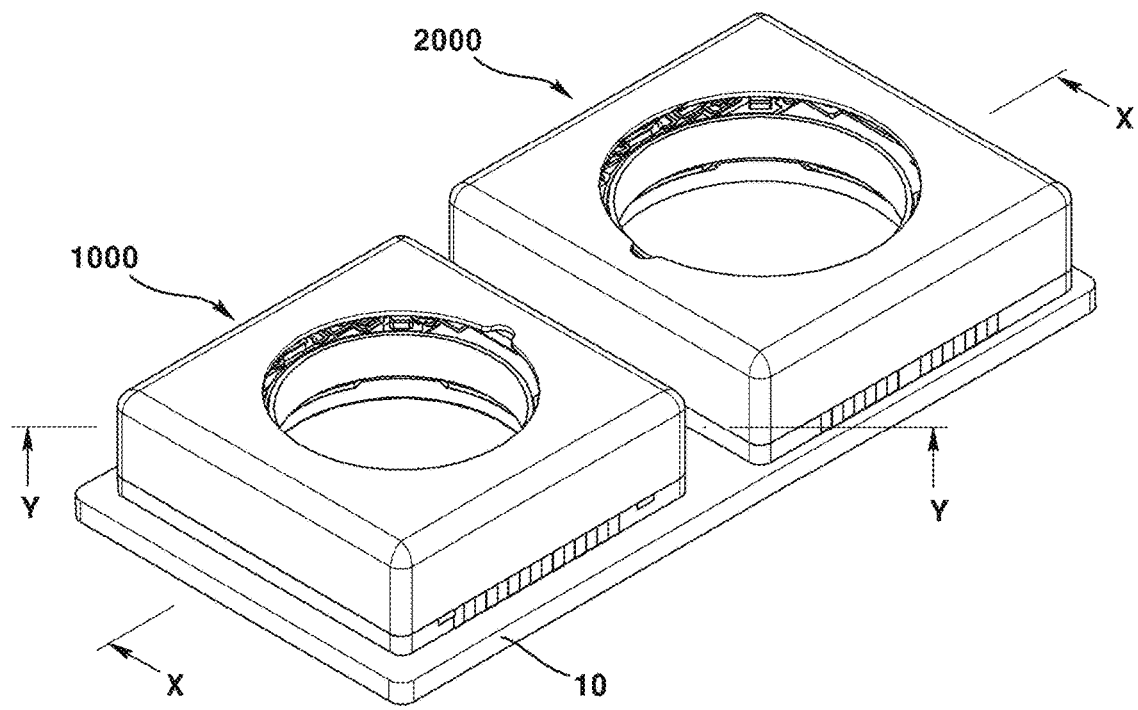
FIG. 1 is a perspective view illustrating a partial configuration of a dual camera module according to a first embodiment.

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (comprising technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may comprise the plural form unless specifically stated in the phrase, and when described as "at least one (or more than one) of A and B and C", it may comprise one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being "connected", "coupled", or "jointed" to another component, the component may be directly connected, coupled, or jointed to the other component, however, it should be understood that another element may be "connected", "coupled" or "jointed" between components.

In addition, when described as being formed or disposed in "on (above)" or "below (under)" of each component, "on (above)" or "below (under)" means that it comprises not only the case where the two components are directly in contact with, but also the case where one or more other components are formed or disposed between the two components. In addition, when expressed as "on (above)" or "below (under)", the meaning of not only an upward direction but also a downward direction based on one component may be comprised.

The 'optical axis direction' used below is defined as the optical axis direction of a lens and/or image sensor coupled to the lens driving apparatus. Meanwhile, the 'optical axis direction' may correspond to an 'up-down direction', a 'z-axis direction', and the like.

Terms such as "corresponding" used hereinafter may comprise at least one of "facing" or "overlapping" meanings.

'Auto Focus' used below is defined as a function to automatically focus on the subject to obtain a clear image of the subject on the image sensor by adjusting the distance to the image sensor by moving the lens in the direction of the optical axis according to the distance to the subject. Meanwhile, 'auto focus' may be used interchangeably with 'AF (auto focus)'.

The 'closed loop auto focus' used hereinafter is defined as an auto focus in which feedback control is performed together. Meanwhile, 'closed-loop auto focus' may be used interchangeably with 'closed-loop auto focus (CLAF)'. Furthermore, an auto focus that does not perform feedback control may be referred to as 'open-loop auto focus (OLAF)'.

The 'handshake correction' used hereinafter is defined as a function of moving or tilting the lens in a direction perpendicular to the optical axis direction so as to cancel vibration (motion) generated in the image sensor by an external force. Meanwhile, 'handshake correction' may be used interchangeably with 'optical image stabilization (OIS)'.

For convenience of explanation, the lens driving apparatus according to the second embodiment is described using Cartesian coordinate systems (x, y, z), but may be described using other coordinate systems, and the second embodiment is not limited thereto. In each drawing, the x-axis and y-axis mean a direction perpendicular to the z-axis, which is the optical axis direction, the z-axis direction, which is the optical axis direction, is called the 'first direction', the x-axis direction is called the 'second direction', the y-axial direction may be referred to as a 'third direction'. Further, the optical axis direction may be defined as the optical axis direction of a lens coupled to the lens driving apparatus.

Hereinafter, the configuration of an optical device according to a first embodiment will be described.

An optical device may be any one of hand phones, mobile phones, smart phones, portable communication devices, portable smart devices, digital cameras, laptop computers, digital broadcasting terminals, personal digital assistants (PDAs), portable multimedia players (PMPs), and navigation. However, the type of optical device is not limited thereto, and any device for photographing an image or photograph may be comprised in the optical device.

An optical device may comprise a main body. The main body can form an external appearance of an optical device. The main body can accommodate a camera device. A display unit may be disposed on one surface of the main body. For example, a display unit and a camera device may be disposed on one surface of the main body, and a camera device may be additionally disposed on the other surface of the main body (a surface located opposite to one surface). Meanwhile, the camera device disposed on the other surface of the main body may comprise a dual camera module.

An optical device may comprise a display unit. The display unit may be disposed on one surface of the main body. The display unit may output an image photographed by the camera device.

An optical device may comprise a camera device. The camera device can be placed on the main body. At least a portion of the camera device may be accommodated inside the main body. A plurality of camera devices may be provided. The camera device may be disposed on one surface of the main body and the other surface of the main body, respectively. The camera device may photograph an image of a subject. The camera device may comprise dual camera modules.

Hereinafter, a configuration of a dual camera module according to the first embodiment will be described with reference to the drawings.

Figure 2:
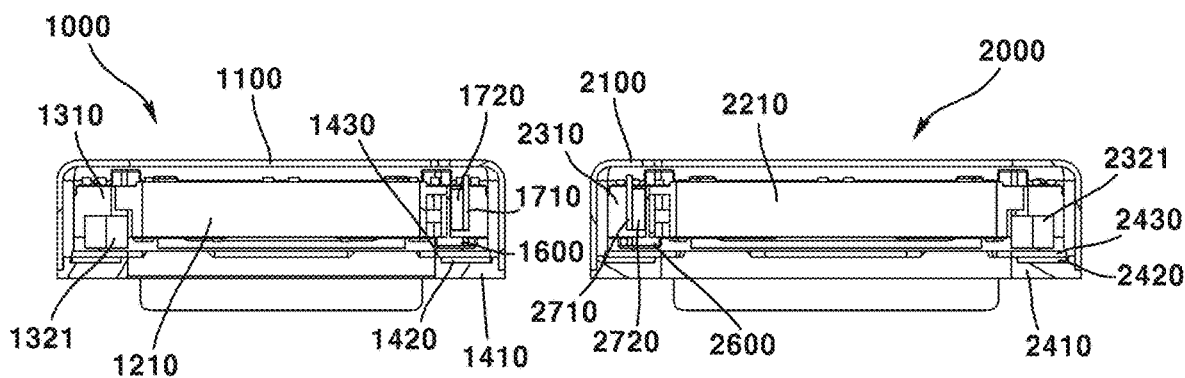
FIG. 2 is a cross-sectional view as viewed from X-X of FIG. 1.
Figure 3:
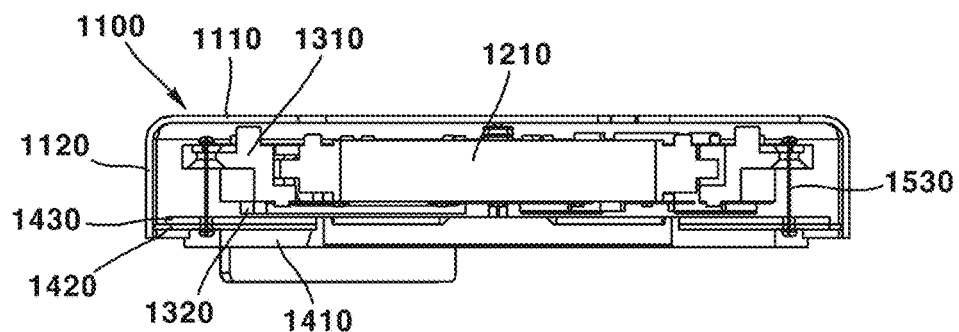
FIG. 3 is a cross-sectional view as viewed from Y-Y of FIG. 1.
Figure 4:
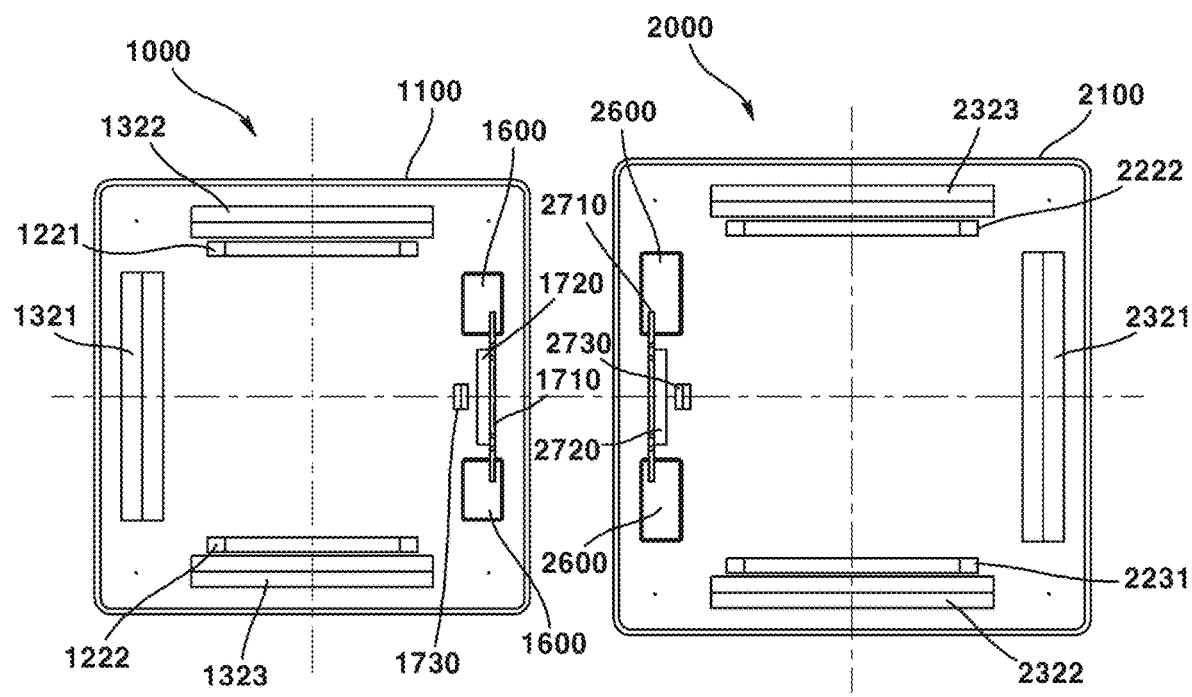
FIG. 4 is a conceptual diagram of a dual camera module according to a modified embodiment.
Figure 5:
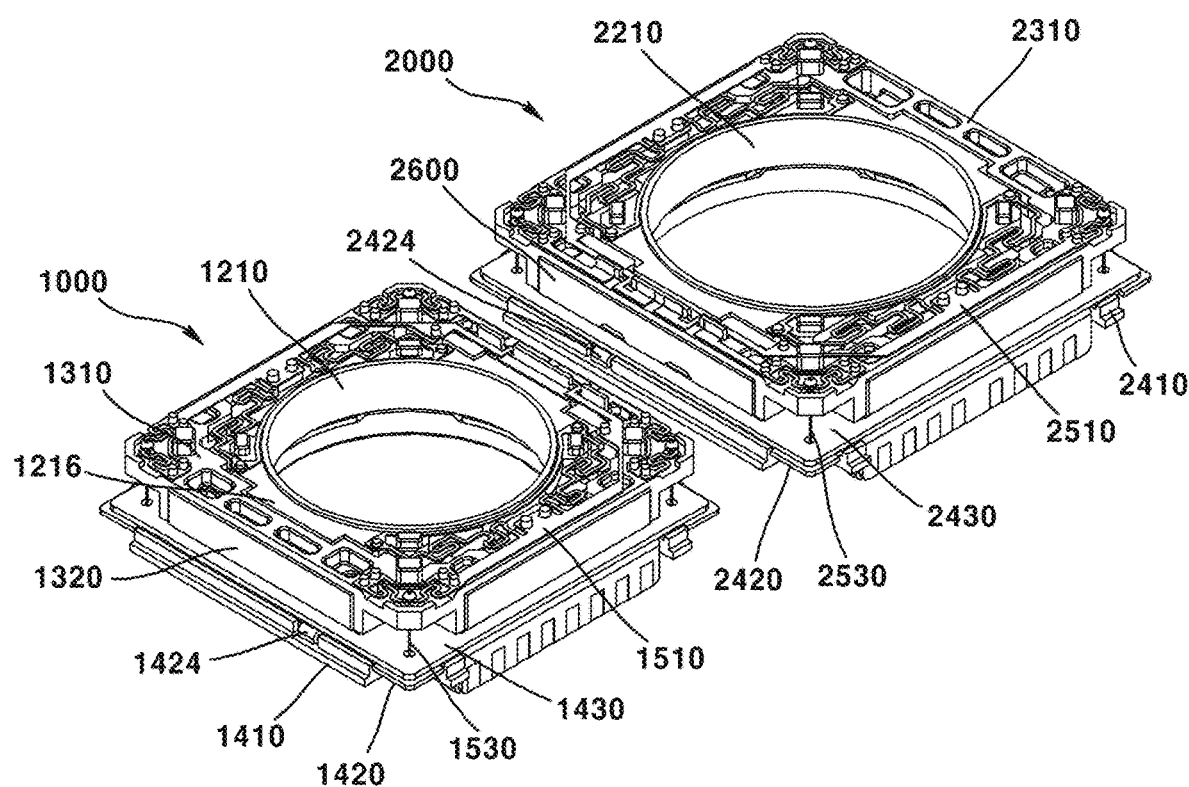
FIG. 5 is a perspective view illustrating a state in which the cover of the first camera module and the cover of the second camera module are removed from FIG. 1.
Figure 6:
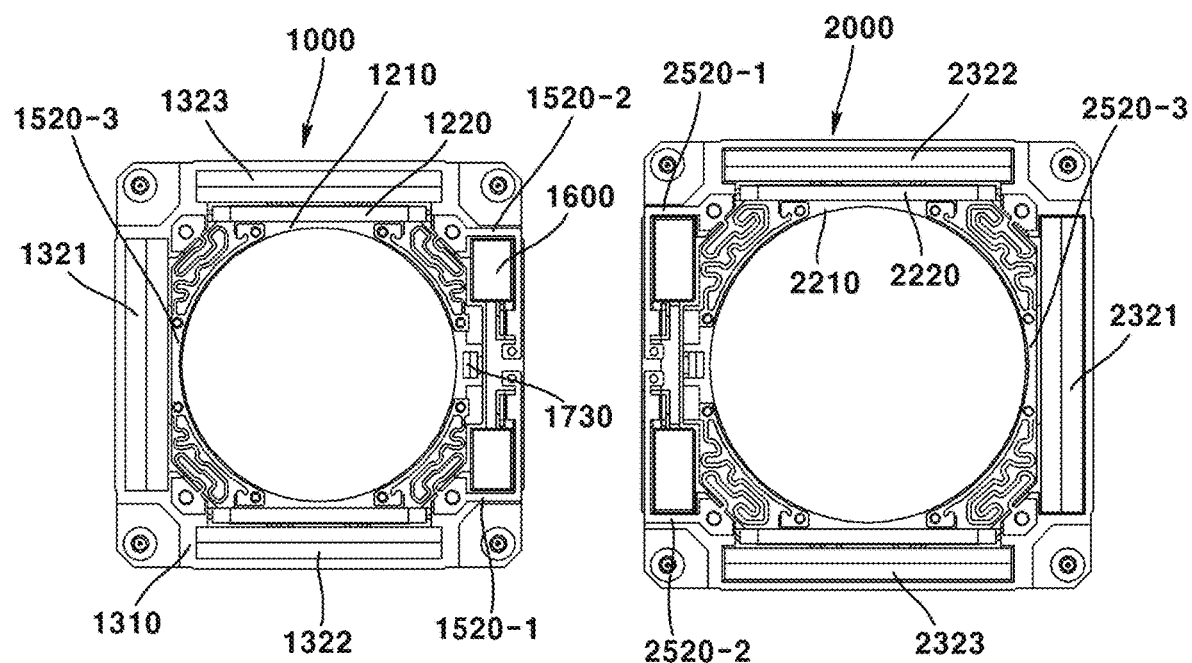
FIG. 6 is a bottom view of FIG. 5 from which some configurations are removed.
Figure 7:
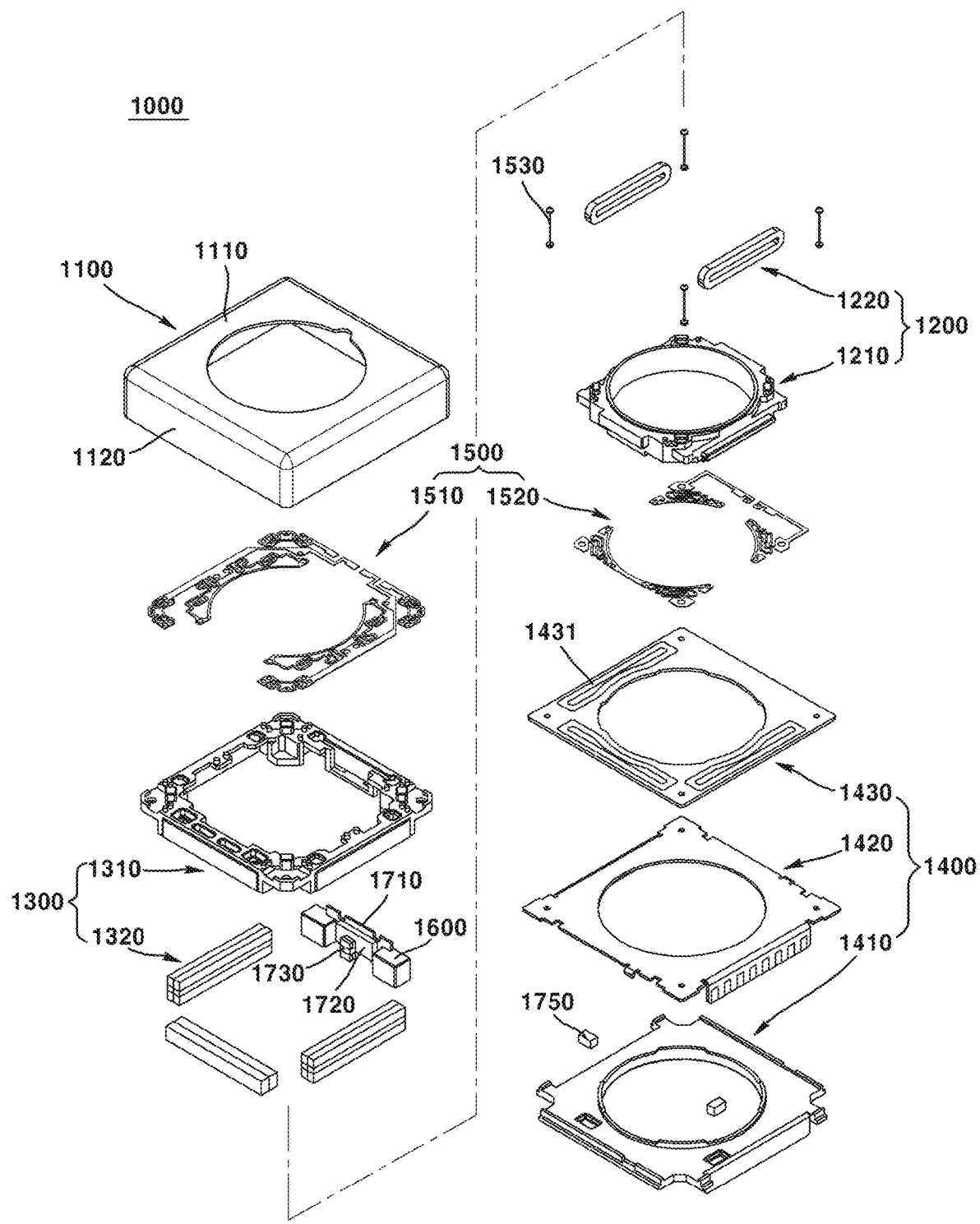
FIG. 7 is an exploded perspective view of a first lens driving apparatus according to a first embodiment.
Figure 8:
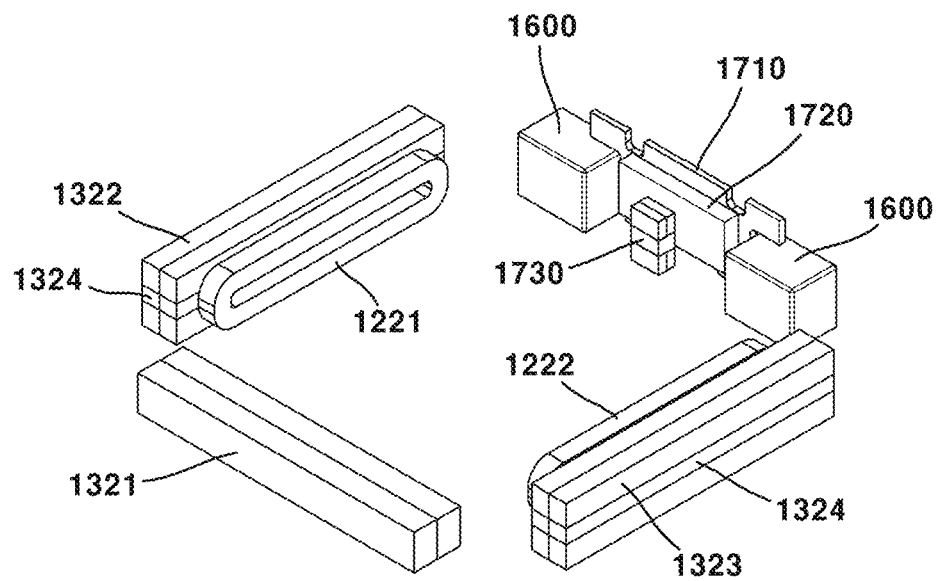
FIG. 8 is a perspective view showing a partial configuration of a first lens driving apparatus according to a first embodiment.
Figure 9:
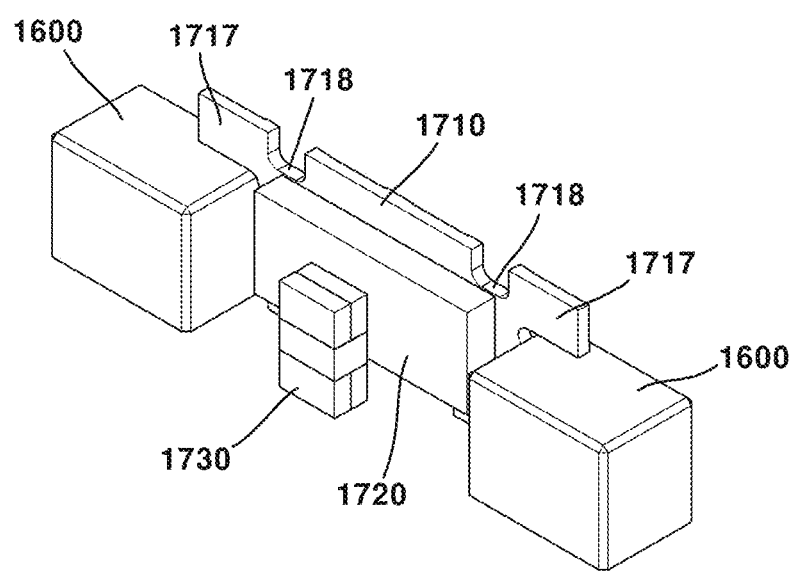
FIG. 9 is a partially enlarged view of FIG. 6.
Figure 10:
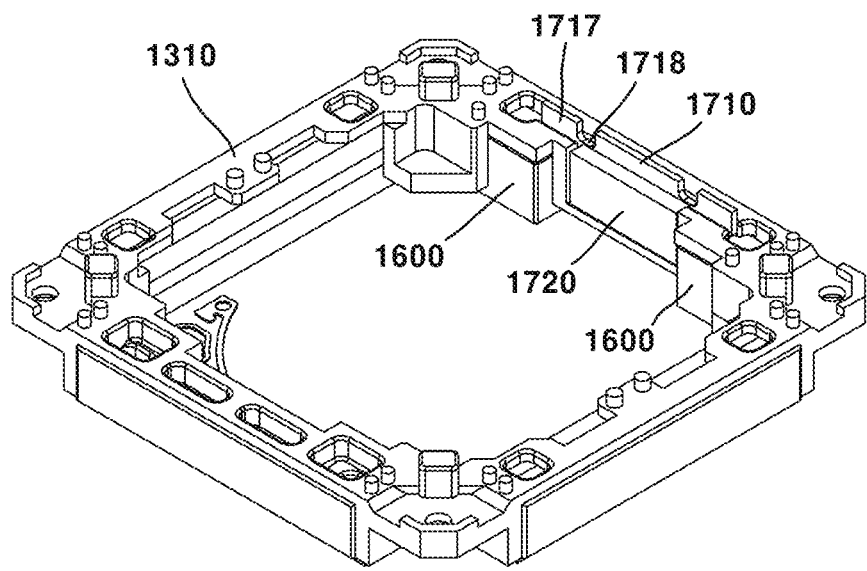
FIG. 10 is a perspective view of a state of the configuration in FIG. 9 coupled with the housing.
Figure 11:
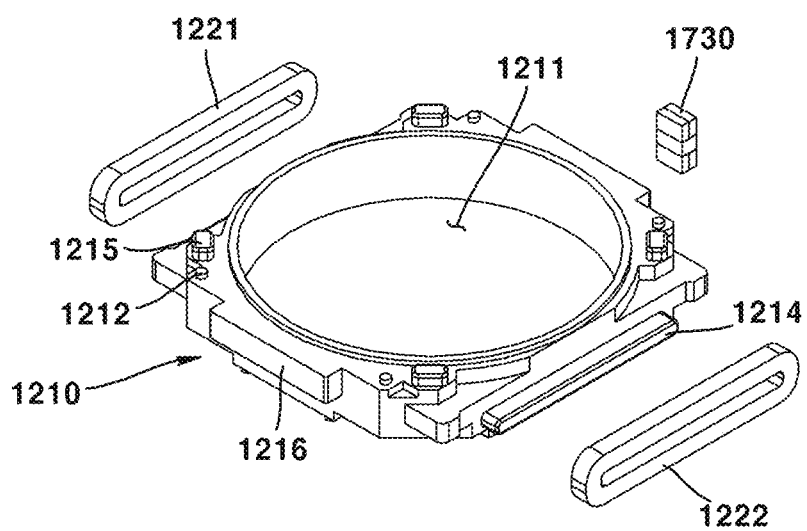
FIGS. 11 to 14 are exploded perspective views showing a partial configuration of a first lens driving apparatus according to a first embodiment.
Figure 12:
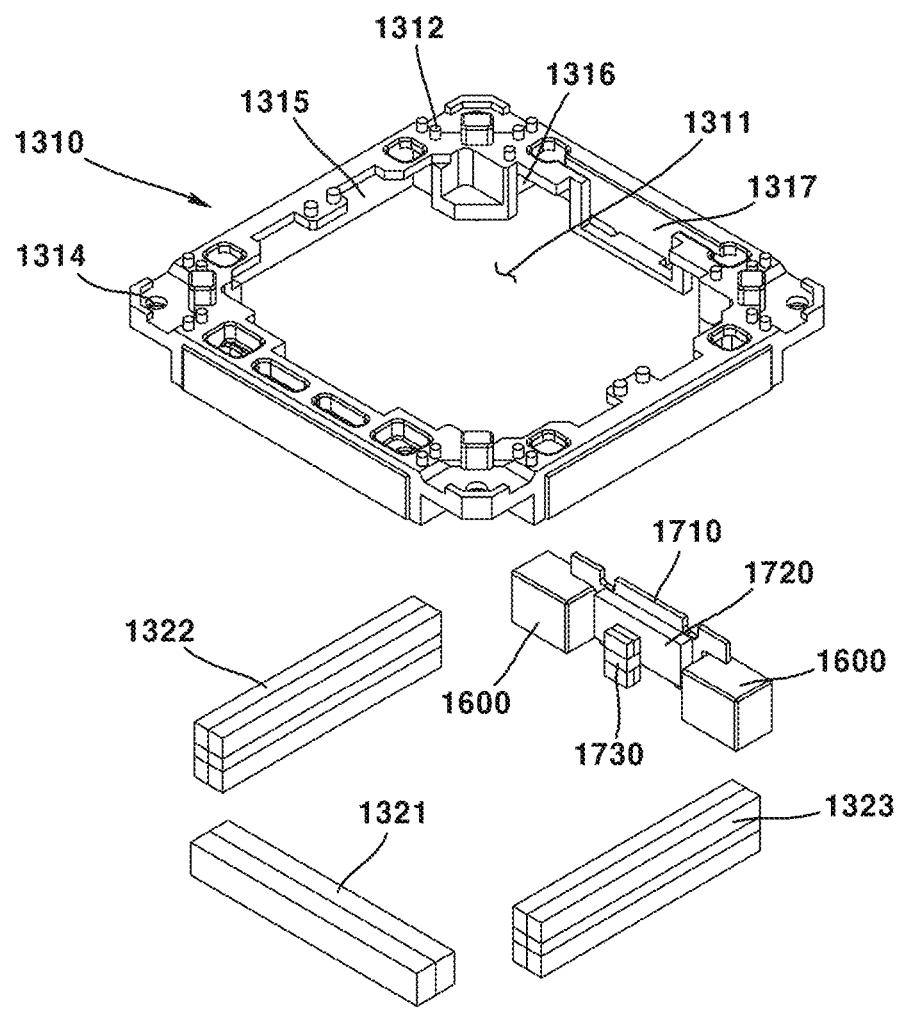
Figure 13:
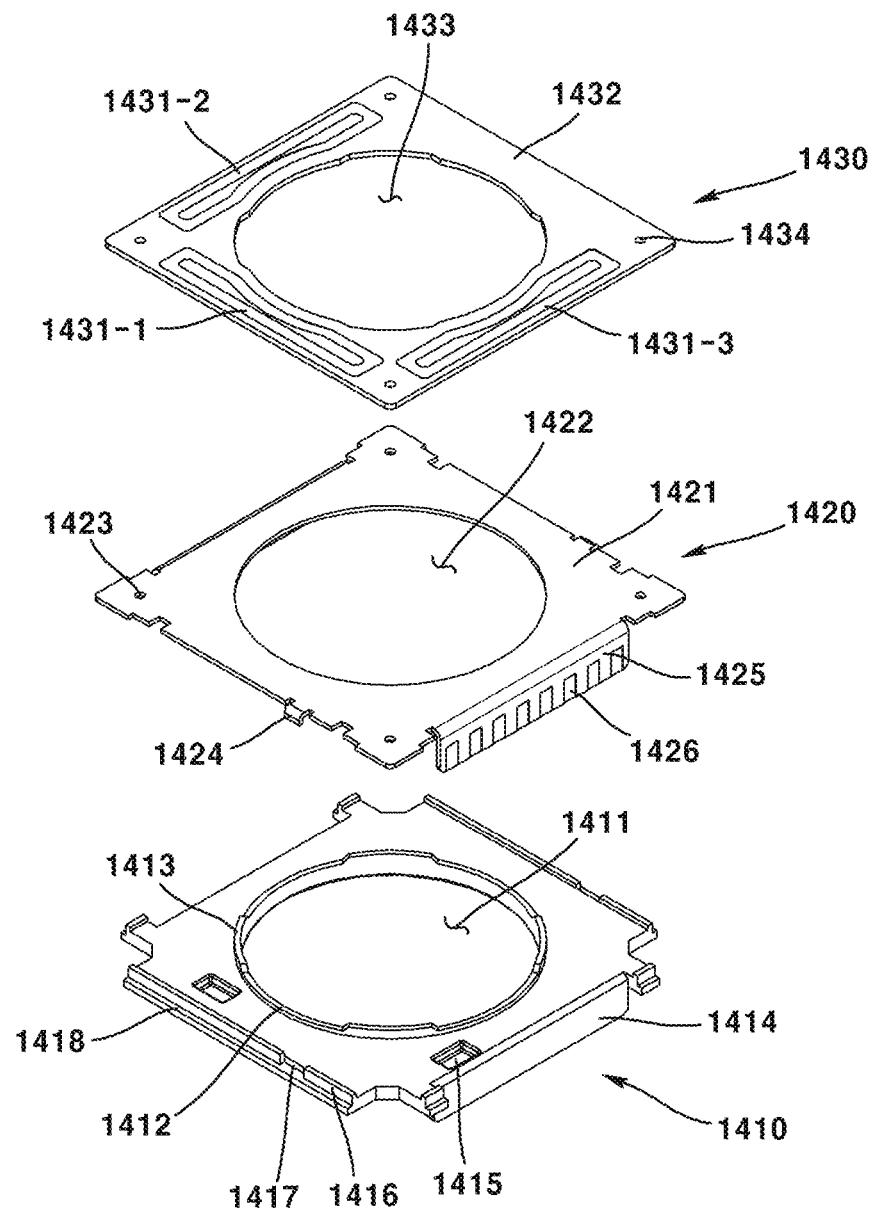
Figure 14:
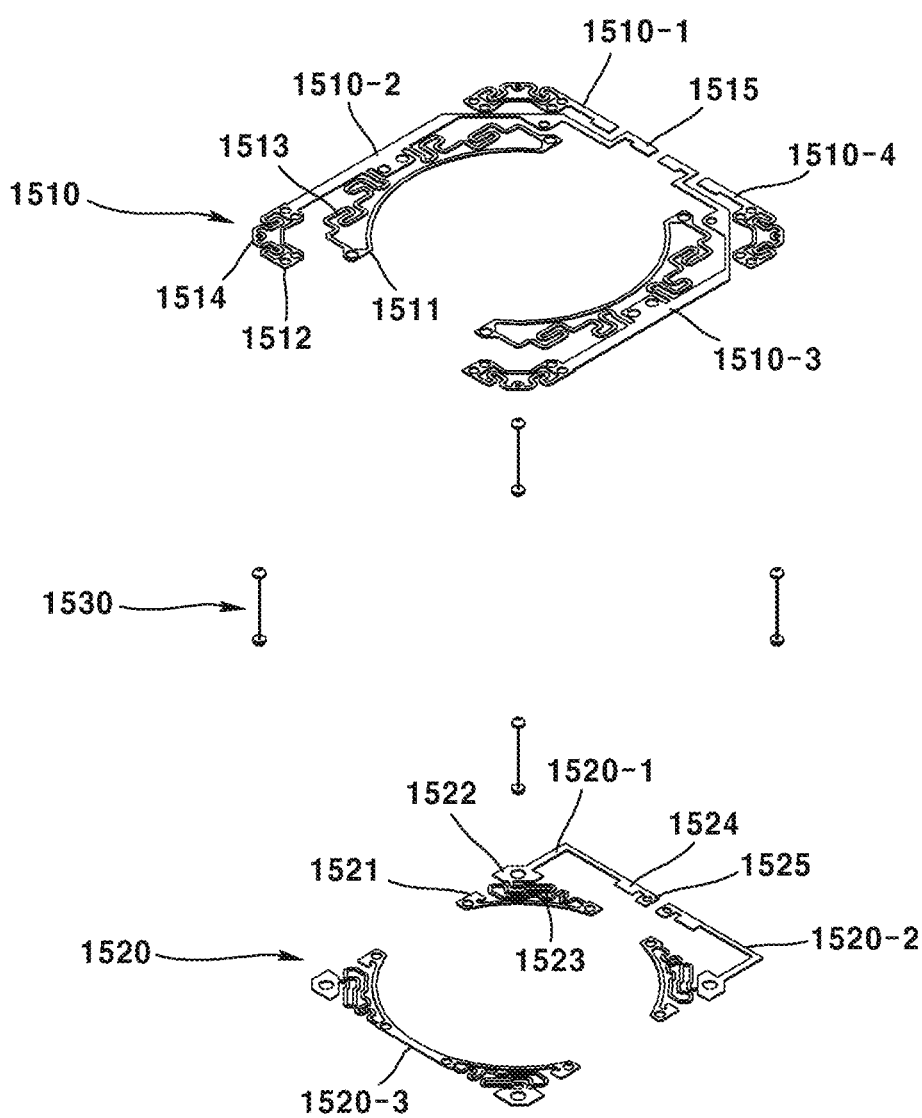
Figure 15:
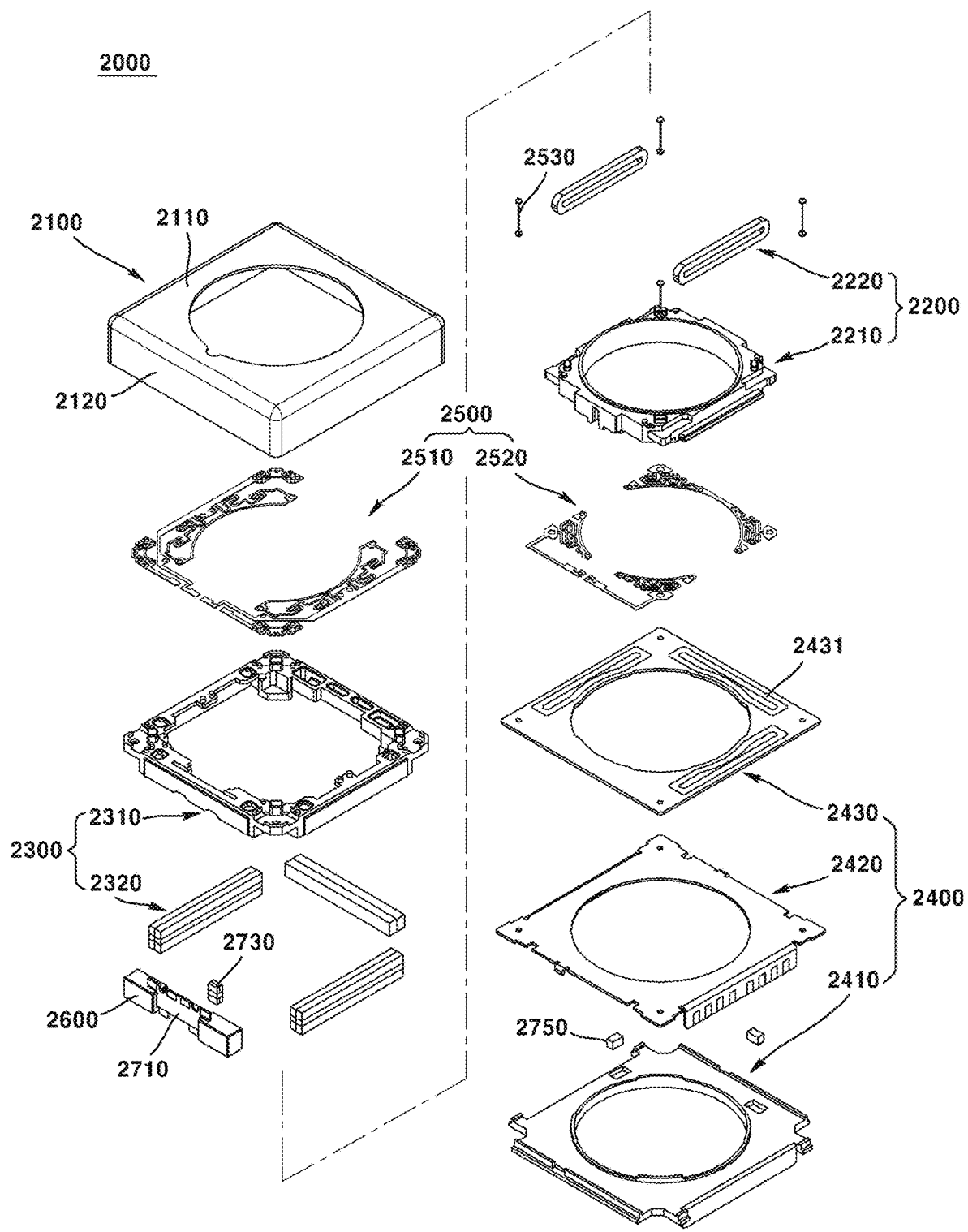
FIG. 15 is an exploded perspective view of a second lens driving apparatus according to a first embodiment.
Figure 16:
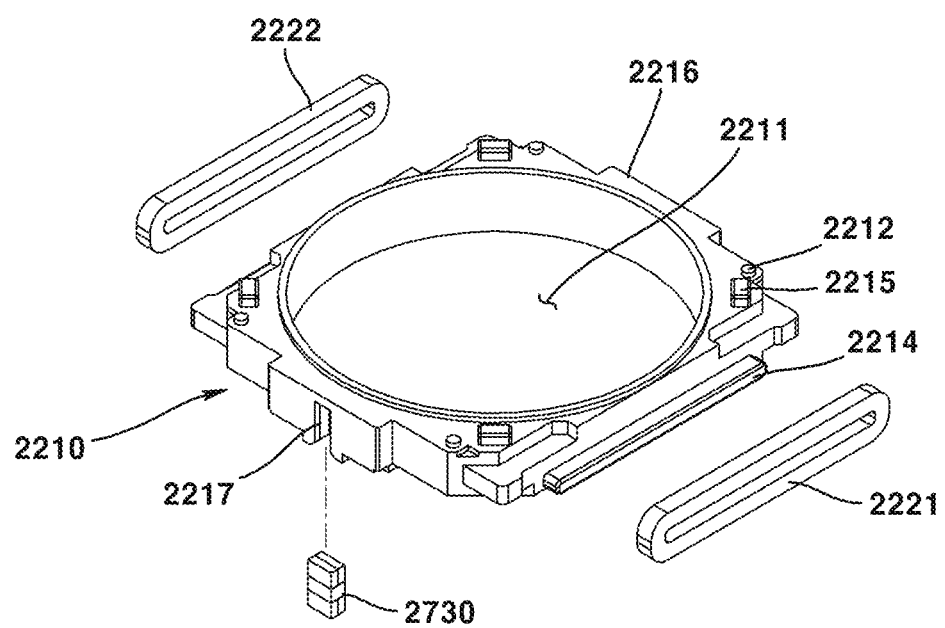
FIGS. 16 to 19 are exploded perspective views of some configurations of the second lens driving apparatus according to a first embodiment.
Figure 17:
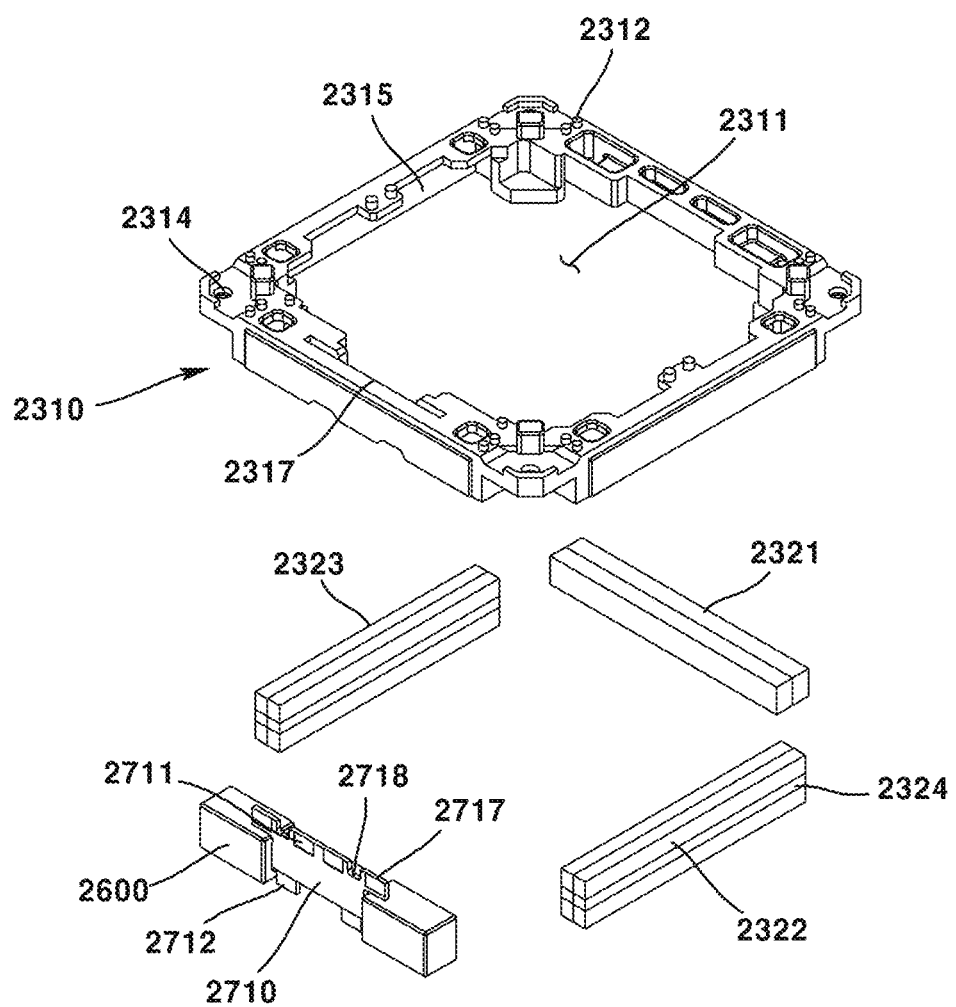
Figure 18:
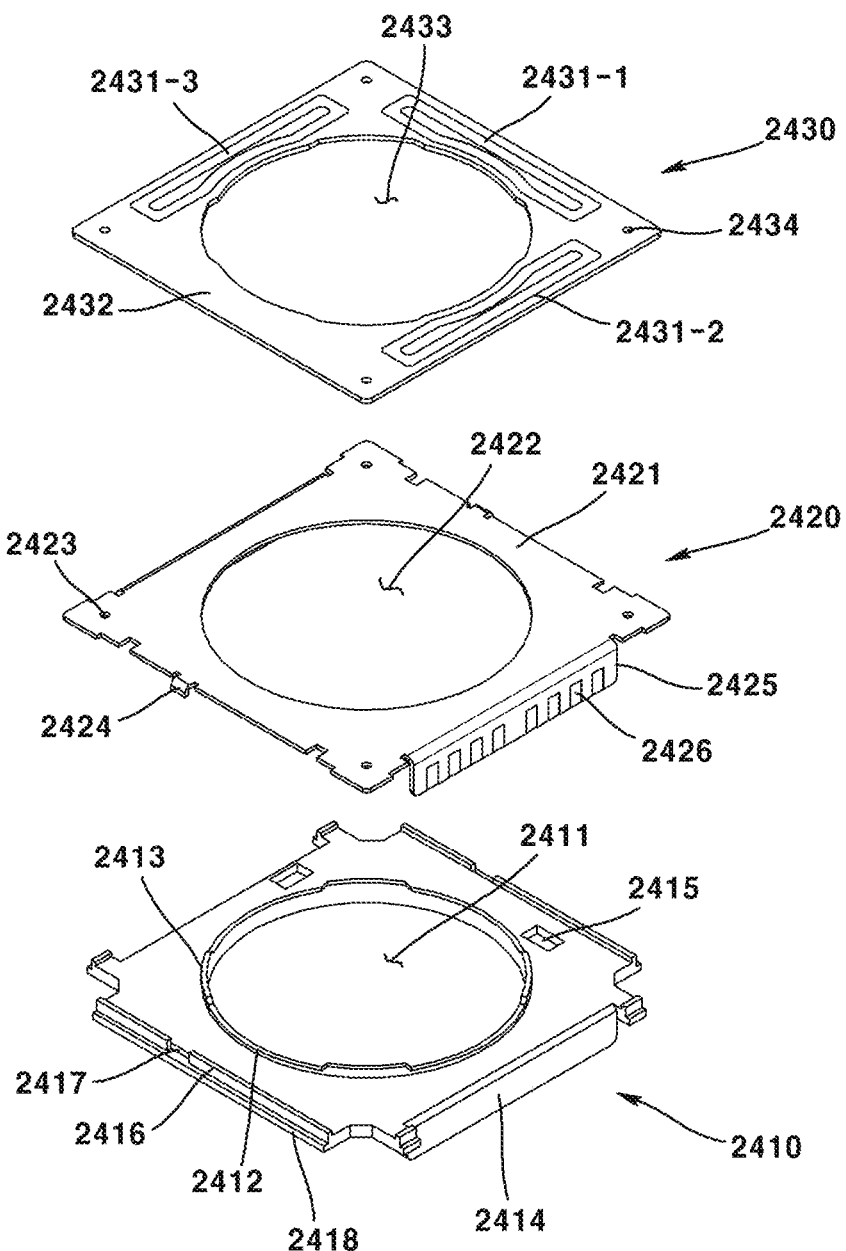
Figure 19:
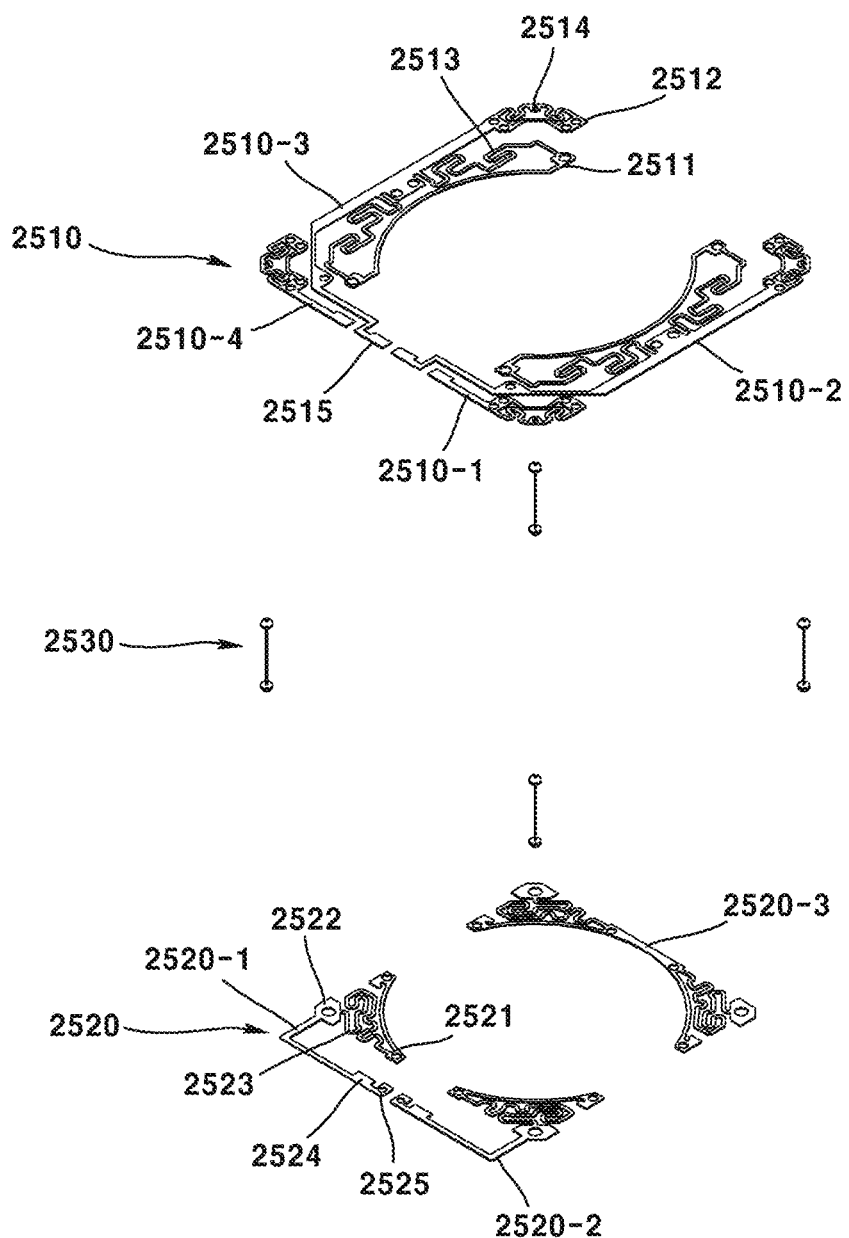

FIG. 1 is a perspective view illustrating a partial configuration of a dual camera module according to a first embodiment, FIG. 2 is a cross-sectional view as viewed from X-X of FIG. 1, FIG. 3 is a cross-sectional view as viewed from Y-Y of FIG. 1, FIG. 4 is a conceptual diagram of a dual camera module according to a modified embodiment, FIG. 5 is a perspective view illustrating a state in which the cover of the first camera module and the cover of the second camera module are removed from FIG. 1, FIG. 6 is a bottom view of FIG. 5 from which some configurations are removed, FIG. 7 is an exploded perspective view of a first lens driving apparatus according to a first embodiment, FIG. 8 is a perspective view showing a partial configuration of a first lens driving apparatus according to a first embodiment, FIG. 9 is a partially enlarged view of FIG. 6, FIG. 10 is a perspective view of a state of the configuration in FIG. 9 coupled with the housing, FIGS. 11 to 14 are exploded perspective views showing a partial configuration of a first lens driving apparatus according to a first embodiment, FIG. 15 is an exploded perspective view of a second lens driving apparatus according to a first embodiment, and FIGS. 16 to 19 are exploded perspective views of some configurations of the second lens driving apparatus according to a first embodiment.

A dual camera module may comprise a first camera module 1000 and a second camera module 2000. In the dual camera module, the first camera module 1000 and the second camera module 2000 may be disposed adjacent to each other. The first camera module 1000 and the second camera module 2000 may be spaced apart from each other. The first camera module 1000 and the second camera module 2000 may be disposed adjacent to each other. The first camera module 1000 and the second camera module 2000 may be disposed side by side. The first camera module 1000 and the second camera module 2000 may be disposed so that one side surface thereof faces each other. Side surfaces of the first camera module 1000 and the side surfaces of the second camera module 2000 facing each other may be disposed in parallel. The optical axis of the first camera module 1000 and the optical axis of the second camera module 2000 may be disposed in parallel. In a first embodiment, the distance between the optical axis of the first camera module 1000 and the optical axis of the second camera module 2000 can be minimized through a magnetic field interference prevention structure.

In the dual camera module according to a first embodiment, three magnets may have a symmetrical structure in a CLAF method in which a driver IC is integrated. In the first embodiment, in order to minimize magnetic field interference of the magnets, AF driving is performed with two magnets in the Y-axis direction less susceptible to magnetic interference, and the AF coil can be separated into two. OIS driving in the Y-axis direction is driven by disposing OIS coils using two magnets, and driving in the X-axis direction can be driven with one magnet. Through this, the gap between VCMs can be minimized. In a comparative example, a compensation magnet is disposed in addition to the sensing magnet for magnetic field balancing, but in a first embodiment, by disposing a sensing magnet in a way that there is no magnetic field influence, it becomes possible with one sensing magnet. In the first embodiment, in order to satisfy the frequency characteristics, by disposing a balancing weight on the opposite side of where one magnet is used, the weight balancing of an OIS driving unit can be achieved. The weight of the balancing weight can be maintained within +/−20% of the weight of the magnet.

The first camera module 1000 may be smaller than the second camera module 2000. Conversely, the first camera module 1000 may be larger than the second camera module 2000. As a modified embodiment, the first camera module 1000 may have the same size as the second camera module 2000. In this case, the first camera module 1000 may be the same product as the second camera module 2000.

The first camera module 1000 may comprise a first lens driving apparatus. The first lens driving apparatus may be a voice coil motor (VCM). The first lens driving apparatus may be a lens driving motor. The first lens driving apparatus may be a lens driving actuator. In the first embodiment, the first lens driving apparatus may comprise a CLAF OIS actuator or a CLAF OIS module. For example, a state in which a lens, an image sensor, and a printed circuit board are assembled to the first lens driving apparatus may be understood as the first camera module 1000.

The first camera module 1000 may comprise a cover 1100. The cover 1100 may cover a housing 1310. The cover 1100 may be coupled to a base 1410. The cover 1100 may form an internal space between the bases 1410. The cover 1100 may accommodate the housing 1310 therein. The cover 1100 may accommodate a bobbin 1210 therein. The cover 1100 may form the external appearance of the first camera module 1000. The cover 1100 may have a hexahedral shape with an open bottom surface. The cover 1100 may be a non-magnetic material. The cover 1100 may be formed of a metal material. The cover 1100 may be formed of a metal plate. The cover 1100 may be connected to a ground portion of a printed circuit board. Through this, the cover 1100 can be grounded. The cover 1100 may block electromagnetic interference (EMI). In this case, the cover 1100 may be referred to as 'shield can' or 'EMI shield can'.

The cover 1100 may comprise an upper plate 1110 and a lateral plate 1120. The cover 1100 may comprise an upper plate 1110 and a lateral plate 1120 extending downward from an outer circumference or an edge of the upper plate 1110. The lower end of the lateral plate 1120 of the cover 1100 may be disposed at a step portion 1434 of the base 1410. The inner surface of the lateral plate 1120 of the cover 1100 may be fixed to the base 1410 by an adhesive.

The cover 1100 may comprise a first lateral plate, a second lateral plate disposed at the opposite side of the first lateral plate, and a third lateral plate and a fourth lateral plate disposed opposite to each other between the first lateral plate and the second lateral plate. In the first embodiment, the first magnet 1320 may comprise a first-first magnet 1321 disposed at a position corresponding to the second lateral plate, and a first-second magnet 1322 disposed at a position corresponding to the third lateral plate, and a first-third magnet 1323 disposed at a position corresponding to the fourth lateral plate. In this case, a dummy member 1600 having a weight corresponding to the weight of the first-first magnet 1321 may be disposed at a position corresponding to the first lateral plate of the cover 1100. Through this structure, magnetic interference between the first camera module 1000 and the second camera module 2000 may be minimized.

The first lateral plate of the cover 1100 of the first camera module 1000 may be disposed adjacent to the second camera module 2000. The first lateral plate of the cover 1100 of the first camera module 1000 may be disposed adjacent to the first lateral plate of the cover 2100 of the second camera module 2000. The first lateral plate of the cover 1100 of the first camera module 1000 may face the first lateral plate of the cover 2100 of the second camera module 2000. The first lateral plate of the cover 1100 of the first camera module 1000 may be disposed parallel to the first lateral plate of the cover 2100 of the second camera module 2000.

The first camera module 1000 may comprise a first mover 1200. The first mover 1200 may be coupled to a lens. The first mover 1200 may be connected to a second mover 1300 through an elastic member. The first mover 1200 may move through interaction with the second mover 1300. At this time, the first mover 1200 may move integrally with the lens. Meanwhile, the first mover 1200 may move during AF driving. At this time, the first mover 1200 may be referred to as an 'AF mover'. Meanwhile, the first mover 1200 may move together with the second mover 1300 during OIS driving. The first mover 1200 may comprise a bobbin 1210 and a first coil 1220.

The first camera module 1000 may comprise a bobbin 1210. The bobbin 1210 may be disposed inside the housing 1310. The bobbin 1210 may be movably coupled to the housing 1310. The bobbin 1210 may move in the optical axis direction with respect to the housing 1310.

The bobbin 1210 may comprise a hole 1211 into which a lens is coupled. A thread may be formed on the inner circumferential surface of the hole 1211 of the bobbin 1210. Alternatively, the inner circumferential surface of the hole 1211 of the bobbin 1210 may be formed as a curved surface without a thread. The bobbin 1210 may comprise a first protrusion 1212 coupled to an upper elastic member 1510. The first protrusion 1212 of the bobbin 1210 may be inserted into a corresponding hole of the upper elastic member 1510 to be coupled. The bobbin 1210 may comprise a second protrusion coupled to a lower elastic member 1520. The second protrusion of the bobbin 1210 may be inserted into a corresponding hole of the lower elastic member 1520 to be coupled. The bobbin 1210 may comprise a third protrusion 1214 on which the first coil 1220 is disposed. The first coil 1220 may be wound around the third protrusion 1214 of the bobbin 1210. The bobbin 1210 may comprise a groove in which a second magnet 1730 is disposed. The second magnet 1730 may be inserted into the groove of the bobbin 1210 and coupled thereto. The bobbin 1210 may comprise a cutout portion that is opened so that a portion of an outer surface of the second magnet 1730 is visible. The horizontally opened width of the cutout portion of the bobbin 1210 may be smaller than the width of the second magnet 1730 in a corresponding direction.

The bobbin 1210 may be coupled to at least one or more of the upper elastic member 1510, the lower elastic member 1520, the first coil 1220, and the second magnet 1730 by an adhesive. In this case, the adhesive may be an epoxy cured by at least one or more of heat, laser, and ultraviolet (UV) light.

The bobbin 1210 may comprise an upper stopper 1215. The upper stopper 1215 may be formed on an upper surface of the bobbin 1210. The upper stopper 1215 may comprise a protrusion. The upper stopper 1215 may be spaced apart from the first protrusion 1212. The upper stopper 1215 may be formed in a shape different from the first protrusion 1212. The upper stopper 1215 may have a rectangular parallelepiped shape, and the first protrusion 1212 may have a cylindrical shape. The upper stopper 1215 may be overlapped with the upper plate 1110 of the cover 1100 in a vertical direction. The upper stopper 1215 may be in contact with the upper plate 1110 of the cover 1100 when the bobbin 1210 moves upward. Through this, the upper limit (highest position) of the stroke of the bobbin 1210 is limited by the upper stopper 1215.

The bobbin 1210 may comprise a lower stopper 1216. The lower stopper 1216 may be formed on a side surface of the bobbin 1210. The lower stopper 1216 may comprise a protrusion. The lower stopper 1216 may be formed only on one of the four side surfaces of the bobbin 1210. In more detail, the lower stopper 1216 may be formed on a side surface opposite to the side surface of the bobbin 1210 on which the second magnet 1730 is disposed. The lower stopper 1216 may be vertically overlapped with the first magnet 1320. In more detail, the lower stopper 1216 may be overlapped with the first-first magnet 1321 in a vertical direction. The lower stopper 1216 may be in contact with the first-first magnet 1321 when the bobbin 1210 moves downward. Through this, the lower stopper 1216 may mechanically limit the lower limit (lowest position) of the stroke of the bobbin 1210.

The first camera module 1000 may comprise a first coil 1220. The first coil 1220 may be an 'AF coil'. The first coil 1220 may be disposed in the bobbin 1210. The first coil 1220 may be disposed on the bobbin 1210. The first coil 1220 may be disposed in contact with the bobbin 1210. The first coil 1220 may be disposed between the bobbin 1210 and the housing 1310. The first coil 1220 may be disposed on the outer circumference of the bobbin 1210. The first coil 1220 may be directly wound on the bobbin 1210. The first coil 1220 may face the first magnet 1320. The first coil 1220 may electromagnetically interact with the first magnet 1320. When current is supplied to the first coil 1220 and an electromagnetic field is formed around the first coil 1220, the first coil 1220 The first coil 1220 may move with respect to the first magnet 1320 due to an electromagnetic interaction between the first coil 1220 and the first magnet 1320.

The first coil 1220 may comprise a pair of lead wires for supplying power. One end portion (lead wire) of the first coil 1220 is coupled to a first lower elastic unit 1520-1, and the other end portion (lead wire) of the first coil 1220 may be coupled to a second lower elastic unit 1520-2. The first coil 1220 may be electrically connected to the lower elastic member 1520. The first coil 1220 can be supplied with power through the printed circuit board, the second board 1420, the support member 1530, the upper elastic member 1510, the first substrate 1710, a driver IC 1720 and the lower elastic member 1520.

The first coil 1220 may comprise a plurality of coils. The first coil 1220 may comprise a first-first coil 1221 and a first-second coil 1222 spaced apart from each other. The first coil 1220 may comprise a first-first coil 1221 facing the first-second magnet 1322 and a first-second coil 1222 facing the first-third magnet 1323. The first-first coil 1221 and the first-second coil 1222 may be disposed in an opposite side of the side surface of the bobbin 1210. The first-first coil 1221 and the first-second coil 1222 may be referred to as 'glass coils'. The first coil 1220 may comprise a connecting coil electrically connecting the first-first coil 1221 and the first-second coil 1222. That is, the first-first coil 1221 and the first-second coil 1222 may be integrally formed.

In the first embodiment, the first coil 1220 may not face the first-first magnet 1321. The first coil 1220 may not be disposed at a position corresponding to the first-first magnet 1321. The first coil 1220 may only face the first-second magnet 1322 and the first-third magnet 1323 and may not face the first-first magnet 1321.

The first camera module 1000 may comprise a second mover 1300. The second mover 1300 may be movably coupled to a stator 1400 through the support member 1530. The second mover 1300 may support the first mover 1200 through an elastic member. The second mover 1300 may move the first mover 1200 or may move together with the first mover 1200. The second mover 1300 may move through interaction with the stator 1400. The second mover 1300 can move during OIS driving. At this time, the second mover 1300 may be referred to as an 'OIS mover'.

The first camera module 1000 may comprise a housing 1310. The housing 1310 may be disposed inside the cover 1100. The housing 1310 may be disposed between the cover 1100 and the bobbin 1210. The housing 1310 may be disposed outside the bobbin 1210. The housing 1310 may accommodate at least a portion of the bobbin 1210. The housing 1310 may be formed of a material different from that of the cover 1100. The housing 1310 may be formed of an insulating material. The housing 1310 may be formed of an injection product. The housing 1310 may be spaced apart from the lateral plate 1120 of the cover 1100.

The housing 1310 may comprise a first hole 1311, in the central portion, penetrating through in a vertical direction. The bobbin 1210 may be disposed in the first hole 1311 of the housing 1310. The housing 1310 may comprise a first protrusion 1312 coupled to the upper elastic member 1510. The first protrusion 1312 of the housing 1310 may be inserted into a corresponding hole of the upper elastic member 1510 to be coupled. The housing 1310 may comprise a second protrusion coupled to the lower elastic member 1520. The second protrusion of the housing 1310 may be inserted into a corresponding hole of the lower elastic member 1520 to be coupled. The housing 1310 may comprise a second hole 1314 through which the support member 1530 passes. The housing 1310 may comprise a first groove 1315 in which the first magnet 1320 is disposed. The housing 1310 may comprise a second groove 1316 in which the dummy member 1600 is disposed. The second groove 1316 of the housing 1310 may be a groove recessed from the lower surface of the housing 1310. The housing 1310 may comprise a first substrate 1710 and a third groove 1317 in which the driver IC 1720 is disposed. The third groove 1317 of the housing 1310 may be a groove recessed from the upper surface of the housing 1310. The second groove 1316 of the housing 1310 and the third groove 1317 of the housing 1310 may be connected.

The housing 1310 may be coupled to one or more of the upper elastic member 1510, the lower elastic member 1520, the first magnet 1320, the first substrate 1710, and the driver IC 1720 by an adhesive. At this time, the adhesive may be an epoxy cured by at least one or more of heat, laser, and ultraviolet (UV) light.

The housing 1310 may comprise four side portions and four corner portions disposed between four side surfaces. The housing 1310 may comprise a first side portion disposed corresponding to a first lateral plate of the lateral plate 1120 of the cover 1100, a second side portion disposed corresponding to a second lateral plate, a third lateral plate disposed corresponding to a third lateral plate, and a fourth side portion disposed corresponding to the fourth lateral plate. A dummy member 1600, a first substrate 1710, and a driver IC 1720 are disposed in the first side portion of the housing 1310, the first-first magnet 1321 is disposed in the second side portion of the housing 1310, the first-second magnet 1322 is disposed in a third side portion of the housing 1310, and the first-third magnet 1323 may be disposed in a fourth side portion of the housing 1310.

The first camera module 1000 may comprise a first magnet 1320. The first magnet 1320 may be a 'driving magnet'. The first magnet 1320 may be disposed in the housing 1310. The first magnet 1320 may be disposed between the bobbin 1210 and the housing 1310. The first magnet 1320 may face the first coil 1220. The first magnet 1320 may electromagnetically interact with the first coil 1220. The first magnet 1320 may face the second coil 1431. The first magnet 1320 may electromagnetically interact with the second coil 1431. The first magnet 1320 may be used in common for AF driving and OIS driving. The first magnet 1320 may be disposed in a side portion of the housing 1310. At this time, the first magnet 1320 may be a flat magnet having a flat plate shape.

The first magnet 1320 may comprise a plurality of magnets. The first magnet 1320 may comprise three magnets. The first magnet 1320 may comprise the first-first to first-third magnets 1321, 1322, and 1323. The first-first magnet 1321 may be used for OIS driving in the X direction. The first-second magnet 1322 and the first-third magnet 1323 may be used for AF driving and OIS driving in the Y direction. The first-first magnet 1321 may face a second-first coil 1431-1 of the second coil 1431. The first-second magnet 1322 faces the first-first coil 1221 of the first coil 1220 and may face a second-second coil 1431-2 of the second coil 1431. The first-third magnet 1323 faces the first-second coil 1222 of the first coil 1220 and may face a second-third coil 1431-3 of the second coil 1431. In the first embodiment, the first magnet 1320 may not be disposed at a position corresponding to the first lateral plate of the cover 1100. That is, the first magnet 1320 may not be disposed on the first side portion of the housing 1310. In other words, in the first embodiment, the driving magnet adjacent to the second camera module 2000 and at a position where magnetic force is expected to be generated may be omitted.

The first-first magnet 1321 may be a 2 pole magnet. The first-first magnet 1321 may be a two-pole magnetized magnet. The first-first magnet 1321 may be a two-pole magnet in which the polarity of the inner surface is different than that of the outer surface. As an example, the inner surface of the first-first magnet 1321 may be an N pole, and the outer surface of the first-first magnet 1321 may be an S pole. Conversely, the inner surface of the first-first magnet 1321 may be an S pole, and the outer surface of the first-first magnet 1321 may be an N pole. However, as a modified embodiment, the first-first magnet 1321 may be a 4-pole magnet.

Each of the first-second magnet 1322 and first-third magnet 1323 may be a 4-pole magnet. The 4-pole magnet may comprise a neutral portion 1324 disposed in a horizontal direction in the central portion. Here, the neutral portion 1324 may be a void. The first-second magnet 1322 and the first-third magnet 1323 may be 2-pole magnetized. As the first-second magnet 1322 and the first-third magnet 1323 are 2-pole magnetized, the AF electromagnetic force may be maximized. Each of the first-second magnet 1322 and the first-third magnet 1323 may be a 4-pole magnetized magnet. Each of the first-second magnet 1322 and first-third magnet 1323 may be a 4-pole magnet having an upper portion of an inner surface having a polarity different from that of a lower portion of the inner surface and an upper portion of the outer surface, and the same polarity as a lower portion of the outer surface. An upper portion of the inner surface and a lower portion of the outer surface of the first-second magnet 1322 may be an N pole, and a lower portion of the inner surface and an upper portion of the outer surface of the first-second magnet 1322 may be an S pole. Conversely, an upper portion of an inner surface and a lower portion of an outer surface of the first-second magnet 1322 may be an S pole, and a lower portion of the inner surface and an upper portion of the outer surface of the first-second magnet 1322 may be an N pole. An upper portion of an inner surface and a lower portion of an outer surface of the first-third magnet 1323 may be an N-pole, and a lower portion of the inner surface and an upper portion of the outer surface of the first-third magnet 1323 may be an S-pole. Conversely, an upper portion of the inner surface and a lower portion of the outer surface of the first-third magnet 1323 may be an S-pole, and a lower portion of the inner surface and an upper portion of the outer surface of the first-third magnet 1323 may be an N-pole.

In the first embodiment, the inner surface of the first-first magnet 1321 and the lower portion of the inner surface of the first-second magnet 1322 and the lower portion of the inner surface of the first-third magnet 1323 may have the same polarity. Accordingly, an upper portion of an outer surface of the first-first magnet 1321 and an inner surface of the first-second magnet 1322 and an upper portion of the inner surface of the first-third magnet 1323 may have the same polarity.

Each of the first-second magnet 1322 and the first-third magnet 1323 may comprise a first facing surface (inner surface) facing the first coil 1220. The first facing surface may comprise a neutral portion 1324 disposed in the central portion in a horizontal direction. The first facing surface may have different polarities between the upper and lower portions with respect to the neutral portion 1324. That is, the upper side of the neutral portion 1324 has an S pole, and the lower side of the neutral portion 1324 may have an N pole.

As a modified embodiment, the upper side of the neutral portion 1324 has an N-pole, and the lower side of the neutral portion 1324 may have an S-pole.

Each of the first-first to first-third magnets 1321, 1322, and 1323 may comprise a second facing surface facing the second coil 1431. The second facing surface may have different polarities at an inner side which is a central side of the first camera module 1000 and at an outer side which is an opposite of the inner side. That is, the inner side of the second facing surface may have an N pole, and the outer side of the second facing surface may have an S pole. As a modified embodiment, the inner side of the second facing surface may have an S pole, and the outer side of the second facing surface may have an N pole.

The first camera module 1000 may comprise a stator 1400. The stator 1400 may be disposed below the first and second movers 1200 and 1300. The stator 1400 may movably support the second mover 1300. The stator 1400 may move the second mover 1300. In this case, the first mover 1200 may also move together with the second mover 1300. The first camera module 1000 may comprise a base 1410. The base 1410 may be disposed below the housing 1310. The base 1410 may be disposed below the bobbin 1210. The base 1410 may be spaced apart from the housing 1310 and the bobbin 1210. The base 1410 may be disposed below the second substrate 1420. The base 1410 may be coupled to the cover 1100. The base 1410 may be disposed on a printed circuit board. The base 1410 may be disposed between the housing 1310 and the printed circuit board.

The base 1410 may comprise a hole 1411. The hole 1411 may be formed in the central portion of the base 1410. The hole 1411 may penetrate the base 1410 in the optical axis direction. The hole 1411 may be formed between the lens and the image sensor. The base 1410 may comprise a first protruded portion 1412. The first protruded portion 1412 may be extended from the inner circumference of the base 1410. The first protruded portion 1412 may be inserted into the first hole 1422 of the second substrate 1420. The outer circumference of the first protruded portion 1412 may correspond to the inner circumference of the second substrate 1420. The upper surface of the first protruded portion 1412 may be in contact with a lower surface of the third substrate 1430. The base 1410 may comprise a protrusion 1413 being protruded from an upper surface of the first protruded portion 1412 and inserted into the first hole 1433 of the third substrate 1430. The base 1410 may comprise a recess 1414. The recess 1414 may be formed on a side surface of the base 1410. An extension portion 1425 of the second substrate 1420 may be disposed in the recess 1414. The recess 1414 may be formed to have a width corresponding to the width of the second substrate 1420. The recesses 1414 may be formed respectively on two side surfaces that are disposed in the opposite side among the plurality of side surfaces of the base 1410. The base 1410 may comprise a groove 1415. The groove 1415 may be formed on an upper surface of the base 1410. A Hall sensor 1750 may be disposed in the groove 1415. The base 1410 may comprise a second protruded portion 1416. The second protruded portion 1416 may be formed adjacent to the outer circumference of the base 1410. The second protruded portion 1416 may be in contact with a side surface of the second substrate 1420. The second protruded portion 1416 may be formed respectively on two side surfaces that are disposed in the opposite side among the plurality of side surfaces of the base 1410. The second substrate 1420 may be disposed between the two second protruded portions 1416. The base 1410 may comprise a cutout portion 1417. The cutout portion 1417 may have a shape in which a portion of the second protruded portion 1416 is omitted. A ground portion 1424 of the second substrate 1420 may be disposed in the cutout portion 1417. The base 1410 may comprise a step portion 1418. The step portion 1418 may be formed on the side surface of the base 1410. The step portion 1418 may be formed on the outer circumferential surface of the base 1410. The stepped portion 1418 may be formed as a lower portion of the side surface of the base 1410 is protruded. In the step portion 1418, a lower end of the lateral plate 1120 of the cover 1100 may be disposed.

The first camera module 1000 may comprise a second substrate 1420. The second substrate 1420 may be disposed in the base 1410. The second substrate 1420 may be disposed on an upper surface of the base 1410. The second substrate 1420 may be disposed between the housing 1310 and the base 1410. A support member 1530 may be coupled to the second substrate 1420. The second substrate 1420 may supply power to the second coil 1431. The second substrate 1420 may be coupled with the third substrate 1430. The second substrate 1420 may be coupled to the second coil 1431. The second substrate 1420 may be coupled to a printed circuit board disposed in the lower side of the base 1410. The second substrate 1420 may comprise a flexible printed circuit board (FPCB). The second substrate 1420 may be partially bent.

The second substrate 1420 may comprise a body portion 1421. The body portion 1421 may be disposed on an upper surface of the base 1410. The second substrate 1420 may comprise a first hole 1422 formed in the central portion of the body 1421. The first hole 1422 may be formed between the lens and the image sensor. The second substrate 1420 may comprise a second hole 1423. The second hole 1423 may vertically penetrate the second substrate 1420. The wire of the support member 1530 may pass through the second hole 1423 of the second substrate 1420. The second substrate 1420 may comprise a ground portion 1424. The ground portion 1424 may be extended from the side surface of the body portion 1421 and bent. The ground portion 1424 may be disposed on the cutout portion 1417 of the base 1410 to be in contact with an inner surface of the lateral plate 1120 of the cover 1100. Through this, the cover 1100 may be electrically connected to the second substrate 1420 and grounded. The second substrate 1420 may comprise an extension portion 1425. The extension portion 1425 may be bent downward from the body portion 1421 and extended. The extension portion 1425 may be disposed on two side surfaces that are disposed in the opposite side among the four side surfaces of the second substrate 1420. A terminal 1426 may be disposed on an outer surface of the extension portion 1425. The terminal 1426 may comprise a plurality of terminals. The terminal 1426 of the second substrate 1420 may be coupled with the terminal of the printed circuit board by soldering.

The second substrate 1420 may comprise a second coil 1431. That is, the second coil 1431 may be a component of the second substrate 1420. However, the second coil 1431 may be disposed on a third substrate 1430 separate from the second substrate 1420.

The first camera module 1000 may comprise a third substrate 1430. The third substrate 1430 may be disposed on the base 1410. The third substrate 1430 may be disposed in the second substrate 1420. The third substrate 1430 may be disposed between the first magnet 1320 and the base 1410. Here, the third substrate 1430 is described as a configuration separate from the second substrate 1420, but the third substrate 1430 may be understood as a configuration comprised in the second substrate 1420.

The first camera module 1000 may comprise a second coil 1431. The second coil 1431 may be an 'OIS coil'. The second coil 1431 may be formed in the third substrate 1430. The second coil 1431 may be disposed in the second substrate 1420. The second coil 1431 may face the first magnet 1320. The second coil 1431 may electromagnetically interact with the first magnet 1320. In this case, when a current is supplied to the second coil 1431 and a magnetic field is formed around the second coil 1431, the first magnet 1320 may move with respect to the second coil 1431 due to an electromagnetic interaction between the second coil 1431 and the first magnet 1320. The second coil 1431 may move the housing 1310 and the bobbin 1210 in a direction perpendicular to the optical axis with respect to the base 1410 through electromagnetic interaction with the first magnet 1320. The second coil 1431 may be a fine pattern coil (FP coil) integrally formed on a substrate portion 1432 of the third substrate 1430.

The second coil 1431 may comprise a plurality of coils. The second coil 1431 may comprise three coils. The second coil 1431 may comprise a second-first coil 1431-1 facing the first-first magnet 1321, a second-second coil 1431-2 facing the first-second magnet 1322, and a second-third coil 1431-3 facing the first-third magnet 1323. The number of turns of the coil wound in the second-first coil 1431-1 may be greater than the number of turns of the coil wound in the second-second coil 1431-2. The number of turns of the coil wound in the second-third coil 1431-3 may correspond to the number of turns of the coil wound in the second-second coil 1431-2. In the first embodiment, during OIS driving, the movement in the X-axis direction is performed through the second-first coil 1431-1, and the movement in the Y-axis direction may be performed through the second-second coil 1431-2 and the second-third coil 1431-3. Therefore, in the first embodiment, the number of turns of the second-first coil 1431-1 may be set to be higher than the number of turns of the second-second coil 1431-2 and the second-third coil 1431-3 in order to compensate for the insufficient propulsion force in the X-axis direction. For example, the ratio of the number of turns of the second-first coil 1431-1 to the number of turns of the second-second and second-third coils 1431-2 and 1431-3 may be 1.5:2.0 to 1:1. Ideally, the ratio of the number of turns of the second-first coil 1431-1 to the number of turns of the second-second and second-third coils 1431-2 and 1431-3 is 1:1, but may be disposed up to 1.5:2.0 due to space constraints.

The third substrate 1430 may comprise a substrate portion 1432. The substrate portion 1432 may be a circuit board. The substrate portion 1432 may be an FPCB. The second coil 1431 may be integrally formed in the substrate portion 1432 as a fine pattern coil (FP coil). A first hole 1433 penetrating through the substrate 1432 in the optical axis direction may be formed in the central portion of the substrate 1432. A second hole 1434 through which the support member 1530 passes may be formed in the substrate portion 1432.

The first camera module 1000 may comprise an elastic member 1500. The elastic member 1500 may be coupled to the bobbin 1210 and the housing 1310. The elastic member 1500 may elastically connect the bobbin 1210 and the housing 1310. The elastic member 1500 may have elasticity at least in portion thereof. The elastic member 1500 may elastically support the movement of the bobbin 1210 during AF driving. The elastic member 1500 may comprise an upper elastic member 1510 and a lower elastic member 1520.

The first camera module 1000 may comprise an upper elastic member 1510. The upper elastic member 1510 may be coupled to an upper portion of the bobbin 1210 and an upper portion of the housing 1310. The upper elastic member 1510 may be coupled to an upper surface of the bobbin 1210 and an upper surface of the housing 1310. The upper elastic member 1510 may be formed of a plate spring.

The upper elastic member 1510 may be used as a conductive line connecting the second substrate 1420 and the first substrate 1710. The upper elastic member 1510 may comprise a plurality of upper elastic units. The upper elastic member 1510 may comprise four upper elastic units. The four upper elastic units may be electrically connected to the four terminals in the upper portion of the first substrate 1710, respectively. The upper elastic member 1510 may comprise first to fourth upper elastic units 1510-1, 1510-2, 1510-3, and 1510-4.

The upper elastic member 1510 may comprise an inner side portion 1511. The inner side portion 1511 may be coupled to an upper portion of the bobbin 1210. The inner side portion 1511 may comprise a hole inserted into the first protrusion 1212 of the bobbin 1210. The upper elastic member 1510 may comprise an outer side portion 1512. The outer side portion 1512 may be coupled to an upper portion of the housing 1310. The outer side portion 1512 may comprise a hole inserted into the first protrusion 1312 of the housing 1310. The upper elastic member 1510 may comprise a connection portion 1513. The connection portion 1513 may connect the inner side portion 1511 and the outer side portion 1512. The connection portion 1513 may have elasticity. The upper elastic member 1510 may comprise a coupling portion 1514. The coupling portion 1514 may be extended from the outer side portion 1512 and may be coupled to the support member 1530. The coupling portion 1514 may comprise a hole through which the wire of the support member 1530 passes. A solder ball connecting the coupling portion 1514 and the wire may be disposed on an upper surface of the coupling portion 1514. The upper elastic member 1510 may comprise a terminal portion 1515. The terminal portion 1515 is extended from the outer side portion 1512 and may be coupled to an upper terminal of the first substrate 1710 by soldering.

The first camera module 1000 may comprise a lower elastic member 1520. The lower elastic member 1520 may be coupled to a lower portion of the bobbin 1210 and a lower portion of the housing 1310. The lower elastic member 1520 may be coupled to a lower surface of the bobbin 1210 and a lower surface of the housing 1310. The lower elastic member 1520 may be formed of a plate spring.

The lower elastic member 1520 may be used as a conductive line connecting the first coil 1220 and the first substrate 1710. The lower elastic member 1520 may comprise a plurality of lower elastic units. The lower elastic member 1520 may comprise two lower elastic units. The two lower elastic units may electrically connect the first coil 1220 and the two terminals in the lower portion of the first substrate 1710. The lower elastic member 1520 may comprise first and second lower elastic units 1520-1 and 1520-2. In addition, the lower elastic member 1520 may comprise a third lower elastic unit 1520-3 electrically connecting the first-first coil 1221 and the first-second coil 1222 separately from the first and second lower elastic units 1520-1 and 1520-2.

The first camera module 1000 may comprise a support member 1530. The support member 1530 may connect the upper elastic member 1510 to the second substrate 1420 or the third substrate 1430. The support member 1530 may be coupled to an upper surface of the upper elastic member 1510 and a lower surface of the second substrate 1420. The support member 1530 may movably support the housing 1310. The support member 1530 may elastically support the housing 1310. The support member 1530 may have elasticity at least in portion thereof. The support member 1530 may elastically support the movement of the housing 1310 and the bobbin 1210 during OIS driving.

The support member 1530 may comprise a plurality of wires. The plurality of wires may comprise four wires. The plurality of wires may comprise four wires connecting the four upper elastic units and the second substrate 1420. The four wires may be paired with four upper elastic units to be coupled therewith. Through this, the four wires and the four upper elastic units may form four conductive lines between the second substrate 1420 and the first substrate 1710. As a modified embodiment, the support member 1530 may be formed of a plate spring.

The first camera module 1000 may comprise a dummy member 1600. The dummy member 1600 may be a 'first dummy member'. The dummy member 1600 may be disposed at a position corresponding to the first lateral plate of the cover 1100. The dummy member 1600 may be disposed in the first side portion of the housing 1310. The dummy member 1600 may have a weight corresponding to the weight of the first-first magnet 1321. However, the dummy member 1600 may have a weight lighter than that of the first-first magnet 1321. Alternatively, the dummy member 1600 may have a weight heavier than the weight of the first-first magnet 1321. The dummy member 1600 may be within 80% of the weight of the first-first magnet 1321 to 120% of the weight of the first-first magnet 1321. When the weight of the dummy member 1600 is less than the lower limit or exceeds the upper limit of the aforementioned value, the weight balancing of the OIS driving unit may collapse. The dummy member 1600 may be a nonmagnetic material. The dummy member 1600 may comprise a non-magnetic material. The magnetic strength of the dummy member 1600 may be weaker than that of the first-first magnet 1321. The dummy member 1600 may be disposed in the opposite side of the first-first magnet 1321 to align the center of gravity. The dummy member 1600 may be made of 95% or more of tungsten as a material. That is, the dummy member 1600 may be a tungsten alloy. For example, the specific gravity of the dummy member 1600 may be 18000 or more. The dummy member 1600 may be disposed between the first-first magnet 1321 and the second camera module 2000. The dummy member 1600 may be disposed at a position symmetrical to the first-first magnet 1321 with respect to the central axis of the housing 1310. In this case, the central axis of the housing 1310 may correspond to the optical axis. The dummy member 1600 may be overlapped with the first-first magnet 1321 in a horizontal direction. The dummy member 1600 may have a height corresponding to the first-second magnet 1322 and the first-third magnet 1323. The dummy member 1600 may have a thickness corresponding to the first-first magnet 1321 in a direction perpendicular to the optical axis. The dummy member 1600 may not be overlapped with the second magnet 1730 in a direction perpendicular to the optical axis.

The dummy member 1600 may comprise a plurality of dummy members. The dummy member 1600 may comprise two dummy members 1600 spaced apart from each other. The two dummy members 1600 may be formed in sizes and shapes corresponding to each other. That is, the two dummy members 1600 may be the same. In a modified embodiment, the dummy member 1600 is provided as one dummy member formed with a groove in the central portion thereof to accommodate the driver IC 1720.

The first camera module 1000 may comprise a first substrate 1710. At least a portion of the first substrate 1710 may be disposed between the two dummy members 1600. The first substrate 1710 may be an FPCB. The first substrate 1710 may be disposed in the housing 1310. The first substrate 1710 may be disposed in the first side portion of the housing 1310. The first substrate 1710 may be disposed between the driver IC 1720 and the housing 1310.

The first substrate 1710 may comprise a plurality of terminals. The first substrate 1710 may comprise four upper terminals formed on an outer surface of the first substrate 1710. The four upper terminals of the first substrate 1710 may be coupled to the four upper elastic units by soldering. The first substrate 1710 may comprise two lower terminals formed in the lower portion of the first substrate 1710. The two lower terminals of the first substrate 1710 may be coupled to the two lower elastic units by soldering. The first substrate 1710 may comprise an extension portion 1717. The extension portion 1717 may be extended toward the both sides and be disposed on an upper surface of the dummy member 1600. The first substrate 1710 may be disposed so that the both sides of the extension portions 1717 are laid on the dummy member 1600. The first substrate 1710 may comprise a groove 1718. The groove 1718 may be formed on an upper surface of the first substrate 1710. The groove 1718 may be formed between the upper terminals in the upper portion of the first substrate 1710.

The first camera module 1000 may comprise a driver IC 1720. The driver IC 1720 may be disposed between the two dummy members 1600. The driver IC 1720 may be overlapped with the two dummy members 1600 in the horizontal direction. The driver IC 1720 may be disposed in the inner surface of the first substrate 1710. The driver IC 1720 may be electrically connected to the first coil 1220. The driver IC 1720 may supply current to the first coil 1220.

The driver IC 1720 may comprise a sensor. In this case, the sensor may be a Hall IC or a Hall sensor. Alternatively, the driver IC 1720 may be a sensor. The sensor may detect the second magnet 1730. The sensor may be disposed between the two dummy members 1600. The sensor may be overlapped with the two dummy members 1600 in the horizontal direction. The sensor may be disposed in an inner surface of the first substrate 1710. The position of the second magnet 1730 detected by the sensor may be used for AF feedback. The sensor of the first camera module 1000 may be a 'first sensor'.

The first camera module 1000 may comprise a second magnet 1730. The second magnet 1730 may be a 'sensing magnet'. The second magnet 1730 may be disposed in the bobbin 1210. The second magnet 1730 may be disposed adjacent to the sensor of the driver IC 1720. The second magnet 1730 may be disposed to face the sensor of the driver IC 1720. The second magnet 1730 may be inserted into the groove of the bobbin 1210 from below. The second magnet 1730 may be seen through the cutout portion of the bobbin 1210. The second magnet 1730 may be a 4-pole magnet. The second magnet 1730 may comprise a neutral portion disposed in a horizontal direction.

The first camera module 1000 may comprise a Hall sensor 1750. The Hall sensor 1750 may be disposed between the base 1410 and the second substrate 1420. The Hall sensor 1750 may detect the movement of the second mover 1300. The Hall sensor 1750 may detect the movement of the housing 1310 and the first magnet 1320 by detecting the magnetic force of the first magnet 1320. The detection value detected by the Hall sensor 1750 may be used for OIS feedback control. The Hall sensor 1750 may comprise a plurality of Hall sensors. Hall sensor 1750 may comprise two Hall sensors. The Hall sensor 1750 may comprise a first Hall sensor detecting movement in the x-axis direction in the horizontal direction and a second Hall sensor detecting movement in the y-axis direction in the horizontal direction.

The first camera module 1000 may comprise a damper. The damper may be disposed on the support member 1530. The damper may be disposed on the support member 1530 and the housing 1310. The damper may be disposed on the elastic member. The damper may be disposed on the elastic member and/or the support member 1530 so that a resonance phenomenon generated in the elastic member and/or the support member 1530 can be inhibited.

The first camera module 1000 may comprise a printed circuit board. The printed circuit board may be a printed circuit board (PCB). The printed circuit board is formed in a plate shape and may comprise an upper surface and a lower surface. An image sensor may be disposed on the upper surface of the printed circuit board. A lens driving apparatus may be disposed on the upper surface of the printed circuit board. The printed circuit board may be electrically connected to the image sensor. The printed circuit board may be electrically connected to the lens driving apparatus. The printed circuit board may comprise a terminal which is coupled to a terminal on the extension portion 1425 of the second substrate 1420 by soldering. A connector connected to the outside may be disposed on the printed circuit board.

The first camera module 1000 may comprise an image sensor. The image sensor may be disposed on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed so that the lens and the optical axis coincide. That is, the optical axis of the image sensor and the optical axis of the lens may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The first camera module 1000 may comprise a lens module. The lens module may be coupled to the bobbin 1210. The lens module may be screw-coupled to the bobbin 1210. The lens module may be fixed to the bobbin 1210 by an adhesive. The lens module may comprise a barrel and a lens coupled to the inside of the barrel. The lens may comprise a plurality of lenses. The lens may comprise 5 or 6 lenses.

The first camera module 1000 may comprise a filter. The filter may comprise an infrared filter. The infrared filter may block light in the infrared wavelength band among the light passing through the lens. Alternatively, the infrared filter may absorb light in an infrared wavelength band among the light passing through the lens. The filter can be placed between the lens and the image sensor. The filter may be disposed in the base 1410. Alternatively, as a modified embodiment, the filter may be disposed in a sensor base disposed between the base 1410 and the printed circuit board.

The second camera module 2000 may comprise a second lens driving apparatus. The second lens driving apparatus may be a voice coil motor (VCM). The second lens driving apparatus may be a lens driving motor. The second lens driving apparatus may be a lens driving actuator. In the first embodiment, the second lens driving apparatus may comprise a CLAF OIS actuator or a CLAF OIS module. For example, a state in which a lens, an image sensor, and a printed circuit board are assembled to the second lens driving apparatus may be understood as the second camera module 2000.

The second camera module 2000 may comprise a cover 2100. The cover 2100 may cover the housing 2310. The cover 2100 may be coupled to the base 2410. The cover 2100 may form an internal space between the base 2410 and the base 2410. The cover 2100 may accommodate the housing 2310 therein. The cover 2100 may accommodate the bobbin 2210 therein. The cover 2100 may form the outer appearance of the second camera module 2000. The cover 2100 may have a hexahedral shape with an open bottom surface. The cover 2100 may be a non-magnetic material. The cover 2100 may be formed of a metal material. The cover 2100 may be formed of a metal plate. The cover 2100 may be connected to the ground portion of the printed circuit board. Through this, the cover 2100 may be grounded. The cover 2100 may block electromagnetic interference (EMI). In this case, the cover 2100 may be referred to as 'shield can' or 'EMI shield can'.

The cover 2100 may comprise an upper plate 2110 and a lateral plate 2120. The cover 2100 may comprise an upper plate 2110 and a lateral plate 2120 extending downward from an outer circumference or an edge of the upper plate 2110. The lower end of the lateral plate 2120 of the cover 2100 may be disposed in the step portion 2434 of the base 2410. The inner surface of the lateral plate 2120 of the cover 2100 may be fixed to the base 2410 by an adhesive.

The cover 2100 may comprise a first lateral plate, a second lateral plate disposed in the opposite side of the first lateral plate, and a third lateral plate and a fourth lateral plate disposed in the opposite side from each other between the first lateral plate and the second lateral plate. In the first embodiment, the first magnet 2320 may comprise a first-first magnet 2321 disposed at a position corresponding to the second lateral plate, a first-second magnet 2322 disposed at a position corresponding to the third lateral plate, and a first-third magnet 2323 disposed at a position corresponding to the fourth lateral plate. In this case, a dummy member 2600 having a weight corresponding to the weight of the first-first magnet 2321 may be disposed at a position corresponding to the first lateral plate of the cover 2100.

The second camera module 2000 may comprise a first mover 2200. The first mover 2200 may be coupled to a lens. The first mover 2200 may be connected to a second mover 2300 through an elastic member. The first mover 2200 may move through interaction with the second mover 2300. At this time, the first mover 2200 may move integrally with the lens. Meanwhile, the first mover 2200 may move during AF driving. At this time, the first mover 2200 may be referred to as an 'AF mover'. Meanwhile, the first mover 2200 may move together with the second mover 2300 during OIS driving. The first mover 2200 may comprise a bobbin 2210 and a first coil 2220.

The second camera module 2000 may comprise a bobbin 2210. The bobbin 2210 may be disposed inside the housing 2310. The bobbin 2210 may be movably coupled to the housing 2310. The bobbin 2210 may move in the optical axis direction with respect to the housing 2310.

The bobbin 2210 may comprise a hole 2211 into which a lens is coupled. A thread may be formed on an inner circumferential surface of the hole 2211 of the bobbin 2210. Alternatively, the inner circumferential surface of the hole 2211 of the bobbin 2210 may be formed in a curved surface without a thread. The bobbin 2210 may comprise a first protrusion 2212 coupled with an upper elastic member 2510. The first protrusion 2212 of the bobbin 2210 may be inserted into a corresponding hole of the upper elastic member 2510 to be coupled. The bobbin 2210 may comprise a second protrusion coupled to a lower elastic member 2520. The second protrusion of the bobbin 2210 may be inserted into and coupled to a corresponding hole of the lower elastic member 2520. The bobbin 2210 may comprise a third protrusion 2214 on which the first coil 2220 is disposed. The first coil 2220 may be wound around the third protrusion 2214 of the bobbin 2210. The bobbin 2210 may comprise a groove in which the second magnet 2730 is disposed. The second magnet 2730 may be inserted into the groove of the bobbin 2210 to be coupled thereto. The bobbin 2210 may comprise a cutout portion 2217 that is opened so that a portion of the outer surface of the second magnet 2730 is visible. The open width of the cutout portion 2217 of the bobbin 2210 in the horizontal direction may be smaller than the width of the second magnet 2730 in a corresponding direction.

The bobbin 2210 may be coupled to one or more of the upper elastic member 2510, the lower elastic member 2520, the first coil 2220, and the second magnet 2730 by an adhesive. At this time, the adhesive may be an epoxy cured by at least one or more of heat, laser, and ultraviolet (UV) light.

The bobbin 2210 may comprise an upper stopper 2215. The upper stopper 2215 may be formed on an upper surface of the bobbin 2210. The upper stopper 2215 may comprise a protrusion. The upper stopper 2215 may be spaced apart from the first protrusion 2212. The upper stopper 2215 may have a different shape from the first protrusion 2212. The upper stopper 2215 may have a rectangular parallelepiped shape, and the first protrusion 2212 may have a cylindrical shape. The upper stopper 2215 may be overlapped with the upper plate 2110 of the cover 2100 in a vertical direction. The upper stopper 2215 may be in contact with the upper plate 2110 of the cover 2100 when the bobbin 2210 moves upward. Through this, the upper stopper 2215 may limit the upper limit (highest position) of the stroke of the bobbin 2210.

The bobbin 2210 may comprise a lower stopper 2216. The lower stopper 2216 may be formed on a side surface of the bobbin 2210. The lower stopper 2216 may comprise a protrusion. The lower stopper 2216 may be formed only on one side surface of the four side surfaces of the bobbin 2210. In more detail, the lower stopper 2216 may be formed on a side surface opposite to the side surface of the bobbin 2210 on which the second magnet 2730 is disposed. The lower stopper 2216 may be overlapped with the first magnet 2320 in a vertical direction. In more detail, the lower stopper 2216 may be overlapped with the first-first magnet 2321 in a vertical direction. The lower stopper 2216 may be in contact with the first-first magnet 2321 when the bobbin 2210 moves downward. Through this, the lower stopper 2216 may mechanically limit the lower limit (lowest position) of the stroke of the bobbin 2210.

The second camera module 2000 may comprise a first coil 2220. The first coil 2220 may be an 'AF coil'. The first coil 2220 may be disposed on the bobbin 2210. The first coil 2220 may be disposed on the bobbin 2210. The first coil 2220 may be disposed in contact with the bobbin 2210. The first coil 2220 may be disposed between the bobbin 2210 and the housing 2310. The first coil 2220 may be disposed on an outer circumference of the bobbin 2210. The first coil 2220 may be directly wound on the bobbin 2210. The first coil 2220 may face the first magnet 2320. The first coil 2220 may electromagnetically interact with the first magnet 2320. When a current is supplied to the first coil 2220 and an electromagnetic field is formed around the first coil 2220, the first coil 2220 may move with respect to the first magnet 2320 by an electromagnetic interaction between the first coil 2220 and the first magnet 2320.

The first coil 2220 may comprise a pair of lead wires for supplying power. One end portion (lead wire) of the first coil 2220 is coupled to a first lower elastic unit 2520-1, and the other end portion (lead wire) of the first coil 2220 may be coupled to a second lower elastic unit 2520-2. The first coil 2220 may be electrically connected to a lower elastic member 2520. The first coil 2220 can be supplied with power through the printed circuit board, a second substrate 2420, a support member 2530, the upper elastic member 2510, a first substrate 2710, a driver IC 2720, and a lower elastic member 2520.

The first coil 2220 may comprise a plurality of coils. The first coil 2220 may comprise a first-first coil 2221 and a first-second coil 2222 spaced apart from each other. The first coil 2220 comprises a first-first coil 2221 facing the first-second magnet 2322 and a first-second coil 2222 facing the first-third magnet 2323. The first-first coil 2221 and the first-second coil 2222 may be disposed in an opposite side of the side surface of the bobbin 2210. The first-first coil 2221 and the first-second coil 2222 may be referred to as 'glass coils'. The first coil 2220 may comprise a connection coil that electrically connects the first-first coil 2221 and the first-second coil 2222. That is, the first-first coil 2221 and the first-second coil 2222 may be integrally formed.

In the first embodiment, the first coil 2220 may not face the first-first magnet 2321. The first coil 2220 may not be disposed at a position corresponding to the first-first magnet 2321. The first coil 2220 may only face the first-second magnet 2322 and the first-third magnet 2323 and may not face the first-first magnet 2321.

The second camera module 2000 may comprise a second mover 2300. The second mover 2300 may be movably coupled to the stator 2400 through the support member 2530. The second mover 2300 may support the first mover 2200 through an elastic member. The second mover 2300 may move the first mover 2200 or may move together with the first mover 2200. The second mover 2300 may move through interaction with the stator 2400. The second mover 2300 can move during OIS driving. In this case, the second mover 2300 may be referred to as an "OIS mover".

The second camera module 2000 may comprise a housing 2310. The housing 2310 may be disposed inside the cover 2100. The housing 2310 may be disposed between the cover 2100 and the bobbin 2210. The housing 2310 may be disposed in the outer side of the bobbin 2210. The housing 2310 may accommodate at least a portion of the bobbin 2210. The housing 2310 may be formed of a material different from that of the cover 2100. The housing 2310 may be formed of an insulating material. The housing 2310 may be formed of an injection product. The housing 2310 may be spaced apart from the lateral plate 2120 of the cover 2100.

The housing 2310 may comprise a first hole 2311 penetrating through the central portion in a vertical direction. The bobbin 2210 may be disposed in the first hole 2311 of the housing 2310. The housing 2310 may comprise a first protrusion 2312 coupled to the upper elastic member 2510. The first protrusion 2312 of the housing 2310 may be inserted into a corresponding hole of the upper elastic member 2510 to be coupled. The housing 2310 may comprise a second protrusion coupled to the lower elastic member 2520. The second protrusion of the housing 2310 may be inserted into a corresponding hole of the lower elastic member 2520 to be coupled. The housing 2310 may comprise a second hole 2314 through which the support member 2530 passes. The housing 2310 may comprise a first groove 2315 in which the first magnet 2320 is disposed. The housing 2310 may comprise a second groove in which the dummy member 2600 is disposed. The second groove of the housing 2310 may be a groove recessed from the lower surface of the housing 2310. The housing 2310 may comprise a third groove 2317 in which the first substrate 2710 and the driver IC 2720 is disposed. The third groove 2317 of the housing 2310 may be a groove recessed from the upper surface of the housing 2310. The second groove of the housing 2310 and the third groove 2317 of the housing 2310 may be connected.

The housing 2310 may be coupled to one or more among the upper elastic member 2510, the lower elastic member 2520, the first magnet 2320, the first substrate 2710, and the driver IC 2720 by an adhesive. At this time, the adhesive may be an epoxy cured by at least one or more among heat, laser, and ultraviolet (UV) rays.

The housing 2310 may comprise four side portions and four corner portions disposed between the four side portions. The housing 2310 may comprise a first side portion disposed corresponding to the first lateral plate of the lateral plate 2120 of the cover 2100, a second side portion disposed corresponding to the second lateral plate, a third lateral plate disposed corresponding to the third lateral plate, and a fourth side portion disposed corresponding to the fourth lateral plate. A dummy member 2600, a first substrate 2710, and a driver IC 2720 are disposed in a first side portion of the housing 2310, and the first-first magnet 2321 is disposed in a second side portion of the housing 2310, a first-second magnet 2322 is disposed in a third side portion of the housing 2310, and a first-third magnet 2323 may be disposed in a fourth side portion of the housing 2310.

The second camera module 2000 may comprise a first magnet 2320. The first magnet 2320 may be a 'driving magnet'. The first magnet 2320 may be disposed in the housing 2310. The first magnet 2320 may be disposed between the bobbin 2210 and the housing 2310. The first magnet 2320 may face the first coil 2220. The first magnet 2320 may electromagnetically interact with the first coil 2220. The first magnet 2320 may face the second coil 2431. The first magnet 2320 may electromagnetically interact with the second coil 2431. The first magnet 2320 may be used in common for AF driving and OIS driving. The first magnet 2320 may be disposed in a side portion of the housing 2310. In this case, the first magnet 2320 may be a flat magnet having a flat plate shape.

The first magnet 2320 may comprise a plurality of magnets. The first magnet 2320 may comprise three magnets. The first magnet 2320 may comprise first-first to first-third magnets 2321, 2322, and 2323. The first-first magnet 2321 may be used for OIS driving in the X direction. The first-second magnet 2322 and the first-third magnet 2323 may be used for AF driving and OIS driving in the Y direction. The first-first magnet 2321 may face the second-first coil 2431-1 of the second coil 2431. The first-second magnet 2322 may face the first-first coil 2221 of the first coil 2220 and the second-second coil 2431-2 of the second coil 2431. The first-third magnet 2323 may face the first-second coil 2222 of the first coil 2220 and the second-third coil 2431-3 of the second coil 2431. In the first embodiment, the first magnet 2320 may not be disposed at a position corresponding to the first lateral plate of the cover 2100. That is, the first magnet 2320 may not be disposed in the first side portion of the housing 2310. In other words, in the first embodiment, the driving magnet adjacent to the first camera module 1000 and at a position where magnetic force is expected to be generated may be omitted.

The first-first magnet 2321 may be a 2-pole magnet. The first-first magnet 2321 may be a 2-pole magnetized magnet. The first-first magnet 2321 may be a 2-pole magnet in which the inner and outer surfaces have different polarities. As an example, the inner surface of the first-first magnet 2321 may be an N pole, and the outer surface of the first-first magnet 2321 may be an S pole. Conversely, the inner surface of the first-first magnet 2321 may be an S pole, and the outer surface of the first-first magnet 2321 may be an N pole. However, as a modified embodiment, the first-first magnet 2321 may be a 4-pole magnet.

Each of the first-second magnet 2322 and the first-third magnet 2323 may be a 4-pole magnet. The 4-pole magnet may comprise a neutral portion 2324 disposed in a horizontal direction in the central portion. Here, the neutral portion 2324 may be a void. The first-second magnet 2322 and the first-third magnet 2323 may be positively magnetized. As the first-second magnet 2322 and the first-third magnet 2323 are positively magnetized, the AF electromagnetic force may be maximized. Each of the first-second magnet 2322 and the first-third magnet 2323 may be a 4-pole magnetized magnet. Each of the first-second magnet 2322 and first-third magnet 2323 may be a 4-pole magnet having an upper portion of the inner surface having a polarity different from that of a lower portion of the inner surface and an upper portion of the outer surface, and the same polarity as the lower portion of the outer surface. An upper portion of an inner surface and a lower portion of an outer surface of the first-second magnet 2322 may be an N-pole, and a lower portion of the inner surface and an upper portion of the outer surface of the first-second magnet 2322 may be an S-pole. Conversely, an upper portion of the inner surface and a lower portion of the outer surface of the first-second magnet 2322 may be an S-pole, and a lower portion of the inner surface and an upper portion of the outer surface of the first-second magnet 2322 may be an N-pole. An upper portion of the inner surface and a lower portion of the outer surface of the first-third magnet 2323 may be an N pole, and a lower portion of the inner surface and an upper portion of the outer surface of the first-third magnet 2323 may be an S pole. Conversely, an upper portion of the inner surface and a lower portion of the outer surface of the first-third magnet 2323 may be an S pole, and a lower portion of the inner surface and an upper portion of the outer surface of the first-third magnet 2323 may be an N pole.

In a first embodiment, the inner surface of the first-first magnet 2321, the lower portion of the inner surface of the first-second magnet 2322, and the lower portion of the inner surface of the first-third magnet 2323 may have the same polarity. Accordingly, an upper portion of an outer surface of the first-first magnet 2321 and an inner surface of the first-second magnet 2322 and an upper portion of the inner surface of the first-third magnet 2323 may have the same polarity.

Each of the first-second magnet 2322 and the first-third magnet 2323 may comprise a first facing surface (inner surface) facing the first coil 2220. The first facing surface may comprise a neutral portion 2324 disposed in the central portion in a horizontal direction. The first facing surface may have different polarities between the upper and lower portions based on the neutral portion 2324. That is, the upper side of the neutral portion 2324 may have an S pole, and the lower side of the neutral portion 2324 may have an N pole. As a modified embodiment, the upper side of the neutral portion 2324 may have an N-pole, and the lower side of the neutral portion 2324 may have an S-pole.

Each of the first-first to first-third magnets 2321, 2322, and 2323 may comprise a second facing surface facing the second coil 2431. The second facing surface may have a different polarity at an inner side of the central side of the second camera module 2000 and at an outer side opposite to the inner side. That is, the inner side of the second facing surface may have an N pole, and the outer side of the second facing surface may have an S pole. As a modified embodiment, the inner side of the second facing surface may have an S pole, and the outer side of the second facing surface may have an N pole.

The second camera module 2000 may comprise a stator 2400. The stator 2400 may be disposed below the first and second movers 2200 and 2300. The stator 2400 may movably support the second mover 2300. The stator 2400 may move the second mover 2300. At this time, the first mover 2200 may also move together with the second mover 2300.

The second camera module 2000 may comprise a base 2410. The base 2410 may be disposed below the housing 2310. The base 2410 may be disposed below the bobbin 2210. The base 2410 may be spaced apart from the housing 2310 and the bobbin 2210. The base 2410 may be disposed below the second substrate 2420. The base 2410 may be coupled to the cover 2100. The base 2410 may be disposed on a printed circuit board. The base 2410 may be disposed between the housing 2310 and the printed circuit board.

The base 2410 may comprise a hole 2411. The hole 2411 may have a base 2410 formed in the central portion. The hole 2411 may penetrate through the base 2410 in the optical axis direction. The hole 2411 may be formed between the lens and the image sensor. The base 2410 may comprise a first protruded portion 2412. The first protruded portion 2412 may be extended from the inner circumference of the base 2410. The first protruded portion 2412 may be inserted into a first hole 2422 of the second substrate 2420. The outer circumference of the first protruded portion 2412 may correspond to the inner circumference of the second substrate 2420. The upper surface of the first protruded portion 2412 may be in contact with a lower surface of a third substrate 2430. The base 2410 may comprise a protrusion 2413 being protruded from an upper surface of the first protruded portion 2412 and inserted into a first hole 2433 of the third substrate 2430. The base 2410 may comprise a recess 2414. The recess 2414 may be formed on a side surface of the base 2410. An extension portion 2425 of the second substrate 2420 may be disposed in the recess 2414. The recess 2414 may be formed to have a width corresponding to the width of the second substrate 2420. The recesses 2414 may be formed in two side surfaces among plurality side surfaces of the base 2410 that are disposed at the sides opposite to each other, respectively. The base 2410 may comprise a groove 2415. The groove 2415 may be formed on an upper surface of the base 2410. A Hall sensor 2750 may be disposed in the groove 2415. The base 2410 may comprise a second protruded portion 2416. The second protruded portion 2416 may be formed adjacent to an outer circumference of the base 2410. The second protruded portion 2416 may be in contact with a side surface of the second substrate 2420. The second protruded portion 2416 may be formed in two side surfaces of the base 2410 that that are disposed at the sides opposite to each other, respectively. The second substrate 2420 may be disposed between the two second protruded portions 2416. The base 2410 may comprise a cutout portion 2417. The cutout portion 2417 may have a shape in which a portion of the second protruded portion 2416 is omitted. A ground portion 2424 of the second substrate 2420 may be disposed in the cutout portion 2417. The base 2410 may comprise a step portion 2418. The step portion 2418 may be formed in a side surface of the base 2410. The step portion 2418 may be formed in the outer circumferential surface of the base 2410. The step portion 2418 may be formed as a lower portion of the side surface of the base 2410 is protruded. The lower end of the lateral plate 2120 of the cover 2100 may be disposed in the stepped portion 2418.

The second camera module 2000 may comprise a second substrate 2420. The second substrate 2420 may be disposed in the base 2410. The second substrate 2420 may be disposed in an upper surface of the base 2410. The second substrate 2420 may be disposed between the housing 2310 and the base 2410. A support member 2530 may be coupled to the second substrate 2420. The second substrate 2420 may supply power to the second coil 2431. The second substrate 2420 may be coupled with the third substrate 2430. The second substrate 2420 may be coupled with the second coil 2431. The second substrate 2420 may be coupled with a printed circuit board disposed at the lower side of the base 2410. The second substrate 2420 may comprise a flexible printed circuit board (FPCB). The second substrate 2420 may be partially bent.

The second substrate 2420 may comprise a body portion 2421. The body portion 2421 may be disposed in an upper surface of the base 2410. The second substrate 2420 may comprise a first hole 2422 formed in the central portion of the body 2421. The first hole 2422 may be formed between the lens and the image sensor. The second substrate 2420 may comprise a second hole 2423. The second hole 2423 may vertically penetrate through the second substrate 2420. The wire of the support member 2530 may pass through the second hole 2423 of the second substrate 2420. The second substrate 2420 may comprise a ground portion 2424. The ground portion 2424 may be extended from the side surface of the body portion 2421 to be bent. The ground portion 2424 may be disposed in a cutout portion 2417 of the base 2410 to be in contact with an inner surface of the lateral plate 2120 of the cover 2100. Through this, the cover 2100 may be electrically connected to the second substrate 2420 and grounded. The second substrate 2420 may comprise an extension portion 2425. The extension portion 2425 may be bent downward from the body portion 2421 to be extended. The extension portion 2425 may be disposed in two side surfaces among four side surfaces of the second substrate 2420 that are disposed at the sides opposite to each other. A terminal 2426 may be disposed in an outer surface of the extension portion 2425. The terminal 2426 may comprise a plurality of terminals. The terminals 2426 of the second substrate 2420 may be coupled with the terminals of the printed circuit board by soldering.

The second substrate 2420 may comprise a second coil 2431. That is, the second coil 2431 may be one component of the second substrate 2420. However, the second coil 2431 may be disposed on a third substrate 2430 separate from the second substrate 2420.

The second camera module 2000 may comprise a third substrate 2430. The third substrate 2430 may be disposed on the base 2410. The third substrate 2430 may be disposed in the second substrate 2420. The third substrate 2430 may be disposed between the first magnet 2320 and the base 2410. Here, although the third substrate 2430 is described as a separate configuration from the second substrate 2420, the third substrate 2430 may be understood as a configuration comprised in the second substrate 2420.

The second camera module 2000 may comprise a second coil 2431. The second coil 2431 may be an 'OIS coil'. The second coil 2431 may be formed in the third substrate 2430. The second coil 2431 may be disposed in the second substrate 2420. The second coil 2431 may face the first magnet 2320. The second coil 2431 may electromagnetically interact with the first magnet 2320. In this case, when a current is supplied to the second coil 2431 and a magnetic field is formed around the second coil 2431, the first magnet 2320 may move with respect to the second coil 2431 by an electromagnetic interaction between the second coil 2431 and the first magnet 2320. The second coil 2431 may move the housing 2310 and the bobbin 2210 in a direction perpendicular to the optical axis with respect to the base 2410 through electromagnetic interaction with the first magnet 2320. The second coil 2431 may be a fine pattern coil (FP coil) integrally formed in the substrate portion 2432 of the third substrate 2430.

The second coil 2431 may comprise a plurality of coils. The second coil 2431 may comprise three coils. The second coil 2431 comprises a second-first coil 2431-1 facing the first-first magnet 2321, a second-second coil 2431-2 facing the first-second magnet 2322, and a second-third coil 2431-3 facing the first-third magnet 2323. The number of times the coil is wound in the second-first coil 2431-1 may be greater than the number of times the coil is wound in the second-second coil 2431-2. The number of times the coil is wound in the second-third coil 2431-3 may correspond to the number of times the coil is wound in the second-second coil 2431-2. In the first embodiment, during OIS driving, the movement in the X-axis direction is performed through the second-first coil 2431-1, and the movement in the Y-axis direction is performed by the second-second coil 2431-2 and the second-third coil 2431-3. Therefore, in the first embodiment, in order to compensate for the insufficient propulsion force in the X-axis direction, the number of turns of the second-first coil 2431-1 may be set to be higher than the number of turns of the second-second coil 2431-2 and the second-third coil 2431-3. For an example, the ratio of the number of turns of the second-first coil 2431-1 to the number of turns of the second-second and second-third coils 2431-2 and 2431-3 may be 1.5:2.0 to 1:1. Ideally, the ratio of the number of turns of the second-first coil 2431-1 to the number of turns of the second-second and second-third coils 2431-2 and 2431-3 is 1:1 but it can be disposed up to 1.5:2.0 due to space constraints.

The third substrate 2430 may comprise a substrate portion 2432. The substrate portion 2432 may be a circuit board. The substrate portion 2432 may be an FPCB. The second coil 2431 may be integrally formed in the substrate portion 2432 as a fine pattern coil (FP coil). A first hole 2433 penetrating through the substrate portion 2432 in the optical axis direction may be formed in the central portion of the substrate portion 2432. A second hole 2434 through which the support member 2530 passes may be formed in the substrate portion 2432.

The second camera module 2000 may comprise an elastic member 2500. The elastic member 2500 may be coupled with the bobbin 2210 and the housing 2310. The elastic member 2500 may elastically connect the bobbin 2210 and the housing 2310. The elastic member 2500 may have elasticity at least in portion. The elastic member 2500 may elastically support the movement of the bobbin 2210 during AF driving. The elastic member 2500 may comprise an upper elastic member 2510 and a lower elastic member 2520.

The second camera module 2000 may comprise an upper elastic member 2510. The upper elastic member 2510 may be coupled with an upper portion of the bobbin 2210 and an upper portion of the housing 2310. The upper elastic member 2510 may be coupled to an upper surface of the bobbin 2210 and an upper surface of the housing 2310. The upper elastic member 2510 may be formed of a plate spring.

The upper elastic member 2510 may be used as a conductive line connecting the second substrate 2420 and the first substrate 2710. The upper elastic member 2510 may comprise a plurality of upper elastic units. The upper elastic member 2510 may comprise four upper elastic units. The four upper elastic units may be electrically connected with the four terminals on an upper portion of the first substrate 2710, respectively. The upper elastic member 2510 may comprise first to fourth upper elastic units 2510-1, 2510-2, 2510-3, and 2510-4.

The upper elastic member 2510 may comprise an inner side portion 2511. The inner side portion 2511 may be coupled to the upper portion of the bobbin 2210. The inner side portion 2511 may comprise a hole inserted into the first protrusion 2212 of the bobbin 2210. The upper elastic member 2510 may comprise an outer side portion 2512. The outer side portion 2512 may be coupled to an upper portion of the housing 2310. The outer side portion 2512 may comprise a hole inserted into the first protrusion 2312 of the housing 2310. The upper elastic member 2510 may comprise a connection portion 2513. The connection portion 2513 may connect the inner side portion 2511 and the outer side portion 2512. The connection portion 2513 may have elasticity. The upper elastic member 2510 may comprise a coupling portion 2514. The coupling portion 2514 may be extended from the outer side portion 2512 and coupled to the support member 2530. The coupling portion 2514 may comprise a hole through which the wire of the support member 2530 passes. A solder ball connecting the coupling portion 2514 and the wire may be disposed on an upper surface of the coupling portion 2514. The upper elastic member 2510 may comprise a terminal portion 2515. The terminal portion 2515 is extended from the outer side portion 2512 and may be coupled to an upper terminal of the first substrate 2710 by soldering.

The second camera module 2000 may comprise a lower elastic member 2520. The lower elastic member 2520 may be coupled to a lower portion of the bobbin 2210 and a lower portion of the housing 2310. The lower elastic member 2520 may be coupled to a lower surface of the bobbin 2210 and a lower surface of the housing 2310. The lower elastic member 2520 may be formed of a plate spring.

The lower elastic member 2520 may be used as a conductive line connecting the first coil 2220 and the first substrate 2710. The lower elastic member 2520 may comprise a plurality of lower elastic units. The lower elastic member 2520 may comprise two lower elastic units. The two lower elastic units may electrically connect the first coil 2220 and the two terminals in the lower portion of the first substrate 2710. The lower elastic member 2520 may comprise first and second lower elastic units 2520-1 and 2520-2. In addition, the lower elastic member 2520 may comprise a third lower elastic unit 2520-3 electrically connects the first-first coil 2221 and the first-second coil 2222 separately from the first and second lower elastic units 2520-1 and 2520-2.

The second camera module 2000 may comprise a support member 2530. The support member 2530 may connect the upper elastic member 2510 to the second substrate 2420 or the third substrate 2430. The support member 2530 may be coupled to an upper surface of the upper elastic member 2510 and a lower surface of the second substrate 2420. The support member 2530 may movably support the housing 2310. The support member 2530 may elastically support the housing 2310. The support member 2530 may have elasticity at least in portion. The support member 2530 may elastically support the movement of the housing 2310 and the bobbin 2210 during OIS driving.

The support member 2530 may comprise a plurality of wires. The plurality of wires may comprise four wires. The plurality of wires may comprise four wires connecting the four upper elastic units and the second substrate 2420. The four wires may be paired with four upper elastic units to be coupled therewith. Through this, the four wires and the four upper elastic units may form four conductive lines between the second substrate 2420 and the first substrate 2710. As a modified embodiment, the support member 2530 may be formed of a plate spring.

The second camera module 2000 may comprise a dummy member 2600. The dummy member 2600 may be a 'second dummy member'. The dummy member 2600 may be disposed at a position corresponding to the first lateral plate of the cover 2100. The dummy member 2600 may be disposed in the first side portion of the housing 2310. The dummy member 2600 may have a weight corresponding to the weight of the first-first magnet 2321. However, the dummy member 2600 may have a lighter weight than the weight of the first-first magnet 2321. Alternatively, the dummy member 2600 may have a heavier weight than the weight of the first-first magnet 2321. The dummy member 2600 may be within 80% of the weight of the first-first magnet 2321 to 120% of the weight of the first-first magnet 2321. If the weight of the dummy member 2600 is less than the lower limit or exceeds the upper limit of the above-mentioned value, the weight balancing of the OIS driving unit may collapse. The dummy member 2600 may be a non-magnetic material. The dummy member 2600 may comprise a non-magnetic material. The magnetic strength of the dummy member 2600 may be weaker than that of the first-first magnet 2321. The dummy member 2600 may be disposed at the opposite side of the first-first magnet 2321 to balance the center of gravity. The dummy member 2600 may be made of 95% or more of tungsten as a material. That is, the dummy member 2600 may be a tungsten alloy. For example, the specific gravity of the dummy member 2600 may be 18000 or more. The dummy member 2600 may be disposed between the first-first magnet 2321 and the first camera module 1000. The dummy member 2600 may be disposed at a position symmetrical to the first-first magnet 2321 with respect to the central axis of the housing 2310. In this case, the central axis of the housing 2310 may correspond to the optical axis. The dummy member 2600 may be overlapped with the first-first magnet 2321 in a horizontal direction. The dummy member 2600 may have a height corresponding to the first-second magnet 2322 and the first-third magnet 2323. The dummy member 2600 may have a thickness corresponding to the first-first magnet 2321 in a direction perpendicular to the optical axis. The dummy member 2600 may not be overlapped with the second magnet 2730 in a direction perpendicular to the optical axis.

The dummy member 2600 may comprise a plurality of dummy members. The dummy member 2600 may comprise two dummy members 2600 spaced apart from each other. The two dummy members 2600 may be formed in sizes and shapes corresponding to each other. That is, the two dummy members 2600 may be the same. In a modified embodiment, the dummy member 2600 is provided as one dummy member and has a groove formed in the central portion thereof to accommodate the driver IC 2720.

The second camera module 2000 may comprise a first substrate 2710. At least a portion of the first substrate 2710 may be disposed between the two dummy members 2600. The first substrate 2710 may be an FPCB. The first substrate 2710 may be disposed in the housing 2310. The first substrate 2710 may be disposed in the first side portion of the housing 2310. The first substrate 2710 may be disposed between the driver IC 2720 and the housing 2310.

The first substrate 2710 may comprise a plurality of terminals. The first substrate 2710 may comprise four upper terminals formed in an upper portion of the outer surface of the first substrate 2710. The four upper terminals of the first substrate 2710 may be coupled with the four upper elastic units by soldering. The first substrate 2710 may comprise two lower terminals formed in a lower portion of the first substrate 2710. The two lower terminals of the first substrate 2710 may be coupled with the two lower elastic units by soldering. The first substrate 2710 may comprise an extension portion 2717. The extension portion 2717 may be extended toward the both sides and be disposed on an upper surface of the dummy member 2600. The first substrate 2710 may be disposed so that the both sides of the extension portion 2717 are laid on the dummy member 2600. The first substrate 2710 may comprise a groove 2718. The groove 2718 may be formed on an upper surface of the first substrate 2710. The groove 2718 may be formed between the upper terminals of the first substrate 2710.

The second camera module 2000 may comprise a driver IC 2720. The driver IC 2720 may be disposed between the two dummy members 2600. The driver IC 2720 may be overlapped with the two dummy members 2600 in the horizontal direction. The driver IC 2720 may be disposed in an inner surface of the first substrate 2710. The driver IC 2720 may be electrically connected to the first coil 2220. The driver IC 2720 may supply current to the first coil 2220.

The driver IC 2720 may comprise a sensor. In this case, the sensor may be a Hall IC or a Hall sensor. Alternatively, the driver IC 2720 may be a sensor. The sensor may detect the second magnet 2730. The sensor may be disposed between the two dummy members 2600. The sensor may be overlapped with the two dummy members 2600 in the horizontal direction. The sensor may be disposed in an inner surface of the first substrate 2710. The position of the second magnet 2730 detected by the sensor may be used for AF feedback. The sensor of the second camera module 2000 may be a 'second sensor'.

The second camera module 2000 may comprise a second magnet 2730. The second magnet 2730 may be a 'sensing magnet'. The second magnet 2730 may be disposed in the bobbin 2210. The second magnet 2730 may be disposed adjacent to the sensor of the driver IC 2720. The second magnet 2730 may be disposed to face the sensor of the driver IC 2720. The second magnet 2730 may be inserted into the groove of the bobbin 2210 from below. The second magnet 2730 may be seen through the cutout portion of the bobbin 2210. The second magnet 2730 may be a 4-pole magnet. The second magnet 2730 may comprise a neutral portion disposed in a horizontal direction.

The second camera module 2000 may comprise a Hall sensor 2750. The Hall sensor 2750 may be disposed between the base 2410 and the second substrate 2420. The Hall sensor 2750 may detect the movement of the second mover 2300. The Hall sensor 2750 may detect the magnetic force of the first magnet 2320 to detect movement of the housing 2310 and the first magnet 2320. The detection value detected by the Hall sensor 2750 may be used for OIS feedback control. The Hall sensor 2750 may comprise a plurality of Hall sensors. Hall sensor 2750 may comprise two Hall sensors. The Hall sensor 2750 may comprise a first Hall sensor detecting the movement in the x-axis direction in the horizontal direction and a second Hall sensor detecting the movement in the y-axis direction in the horizontal direction.

The second camera module 2000 may comprise a damper. The damper may be disposed in the support member 2530. The damper may be disposed in the support member 2530 and the housing 2310. The damper may be disposed in the elastic member. The damper may be disposed in the elastic member and/or the support member 2530 to inhibit a resonance phenomenon occurring in the elastic member and/or the support member 2530.

The second camera module 2000 may comprise a printed circuit board. The printed circuit board may be a PCB (printed circuit board). The printed circuit board is formed in a plate shape and may comprise an upper surface and a lower surface. An image sensor may be disposed on an upper surface of the printed circuit board. A lens driving apparatus may be disposed on an upper surface of the printed circuit board. The printed circuit board may be electrically connected to the image sensor. The printed circuit board may be electrically connected to the lens driving apparatus. The printed circuit board may comprise a terminal on the extension portion 2425 of the second substrate 2420 and a terminal coupled by soldering. A connector connected to the outside may be disposed on the printed circuit board.

The second camera module 2000 may comprise an image sensor. The image sensor may be disposed on a printed circuit board. The image sensor may be electrically connected to the printed circuit board. For example, the image sensor may be coupled to a printed circuit board by surface mounting technology (SMT). As another example, the image sensor may be coupled to a printed circuit board by flip chip technology. The image sensor may be disposed so that the lens and the optical axis coincide. That is, the optical axis of the image sensor and the optical axis of the lens may be aligned. The image sensor may convert light irradiated to the effective image area of the image sensor into an electrical signal. The image sensor may be any one of a charge coupled device (CCD), a metal oxide semi-conductor (MOS), a CPD, and a CID.

The second camera module 2000 may comprise a lens module. The lens module may be coupled to the bobbin 2210. The lens module may be screw-coupled with the bobbin 2210. The lens module may be fixed to the bobbin 2210 by an adhesive. The lens module may comprise a barrel and a lens coupled to the inside of the barrel. The lens may comprise a plurality of lenses. The lens may comprise 5 or 6 pieces of lenses.

The second camera module 2000 may comprise a filter. The filter may comprise an infrared filter. The infrared filter may block the light in the infrared wavelength band among the light that has been passed through the lens. Alternatively, the infrared filter may absorb light in an infrared wavelength band among the light that has been passed through the lens. The filter can be placed between the lens and the image sensor. The filter may be disposed in the base 2410. Alternatively, as a modified embodiment, the filter may be disposed in a sensor base disposed between the base 2410 and the printed circuit board.

The 'handshake correction function' applied to a small camera module of a mobile device such as a smartphone or tablet PC, may be a function of moving the lens in a direction perpendicular to the optical axis direction or tilting the lens with respect to the optical axis so as to cancel the vibration (or movement) caused by the handshake of a user.

In addition, the 'auto focusing function' may be a function of automatically focusing on the subject by moving the lens in the optical axis direction according to the distance of the subject in order to obtain a clear image of the subject on an image sensor.

Hereinafter, the lens driving apparatus may mean "voice coil motor (VCM)", "lens driving motor", or an actuator, and may be represented by this.

Figure 20:
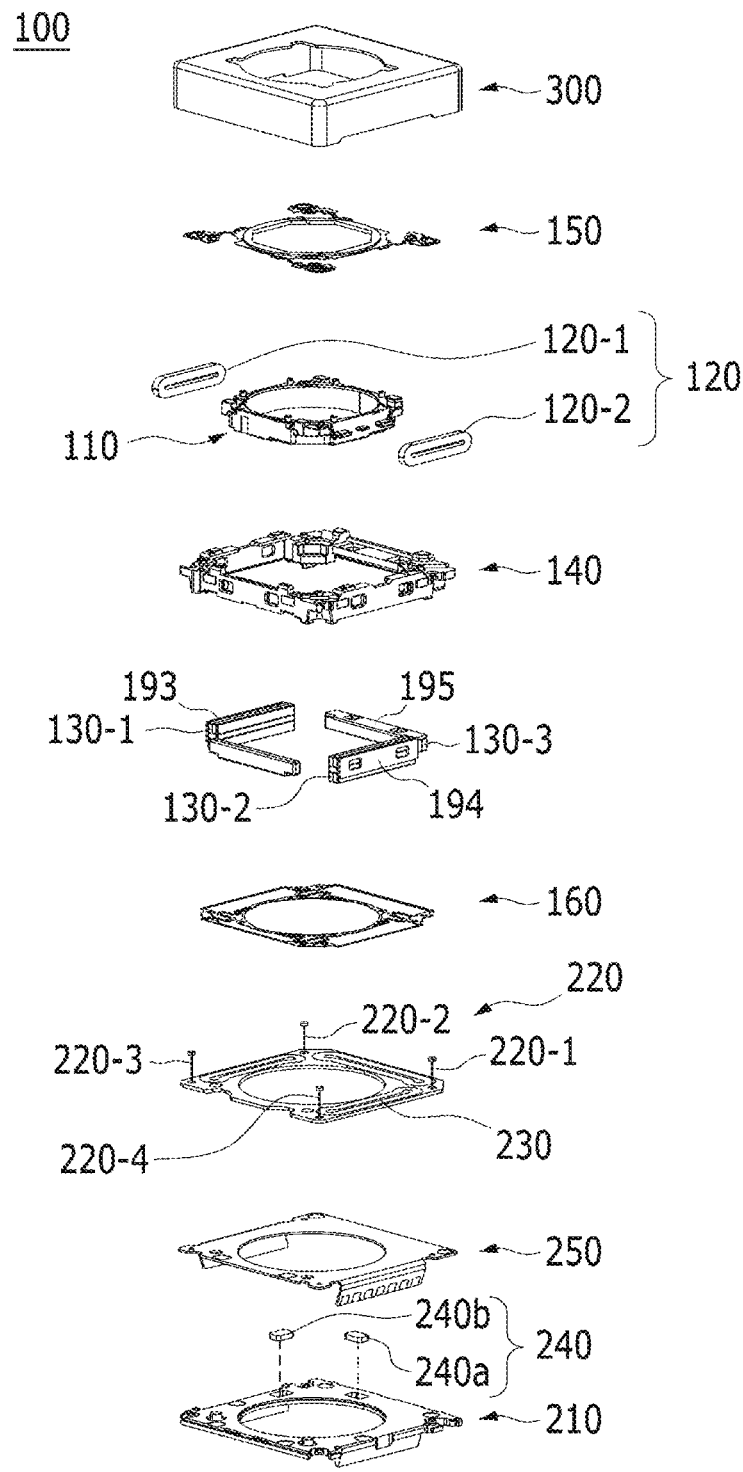
FIG. 20 is an exploded view of a lens driving apparatus according to a second embodiment.
Figure 21:
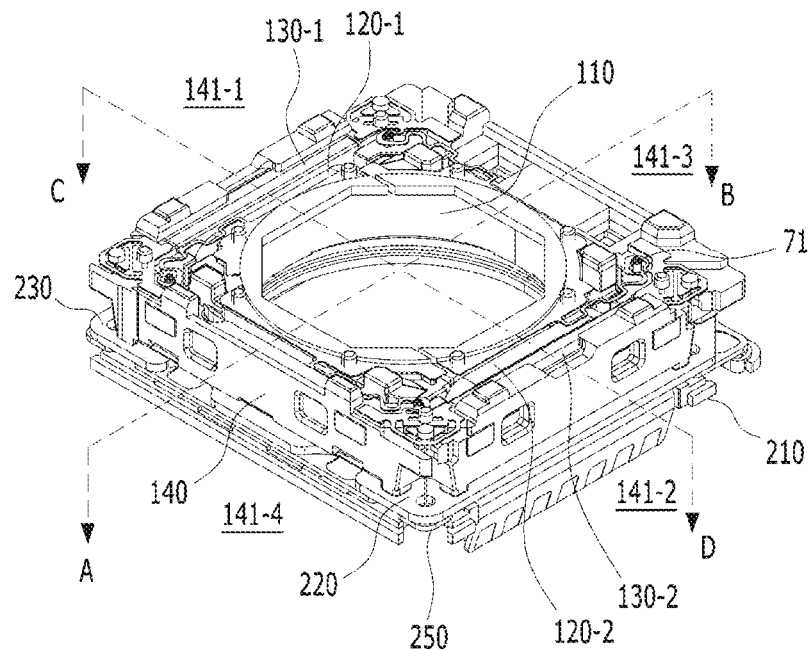
FIG. 21 is a plan view of a lens driving apparatus excluding a cover member.

FIG. 20 is an exploded view of a lens driving apparatus 100 according to a second embodiment, and FIG. 21 is a plan view of a lens driving apparatus 100 excluding a cover member 300.

Referring to FIGS. 20 and 21, the lens driving apparatus 100 may comprise a bobbin 110, a first coil 120, a first magnet 130-1, a second magnet 130-2, a third magnet 130-3, a first yoke 193, a second yoke 194, and a housing 140.

The lens driving apparatus 100 may further comprise a dummy member 135. In addition, the lens driving apparatus 100 may further comprise a third yoke 195. The lens driving apparatus 100 may further comprise at least one of an upper elastic member 150, a lower elastic member 160, a second coil 230, a circuit board 250, and a support member 220.

In addition, the lens driving apparatus 100 may further comprise a position sensor 240 (refer to FIG. 27) to drive an optical image stabilizer (OIS) feedback. The lens driving apparatus 100 may further comprise at least one of a base 210 and a cover member 300.

In addition, the lens driving apparatus according to another embodiment may be further provided with a circuit board 190 (refer to FIG. 37b), a first position sensor 170 (refer to FIG. 37b), and a sensing magnet 180 (refer to FIGS. 37a, 37b) for detecting magnetic force of the position sensor 170 for AF driving feedback. In addition, the lens driving apparatus according to another embodiment may further comprise a balancing magnet for attenuating the influence of the magnetic field of the sensing magnet.

In the second embodiment, the electromagnetic force between the first and second magnets 130-1 and 130-2 and the two coil units 120-1 and 120-2 of the first coil 120 can be enhanced by the first and second yokes 193 and 194. In addition, according to the second embodiment, the electromagnetic force between the third magnet 130-3 and the third coil unit 230-3 of the second coil 230 may be enhanced by the third yoke 195.

The second embodiment may provide a lens driving apparatus comprising an OIS function capable of reducing or suppressing magnetic interference between magnets comprised in adjacent two lens driving apparatuses mounted on a dual camera module.

In addition, the second embodiment can balance the electromagnetic force generated in the X-axis direction and the electromagnetic force generated in the Y-axis direction in order to perform the OIS function.

In addition, the second embodiment reduces the number of magnets for OIS and the size of the magnets for OIS, thereby reducing the weight of an OIS movable unit, thereby reducing the amount of current consumption.

First, the bobbin 110 will be described.

The bobbin 110 is disposed inside the housing 140 and may be moved in an optical axis OA direction or the first direction (e.g., the Z axis direction) due to the electromagnetic interaction between the first and second coil units 120-1 and 120-2 of the first coil 120 and the first and second magnets 130-1 and 130-2.

Figure 22A:
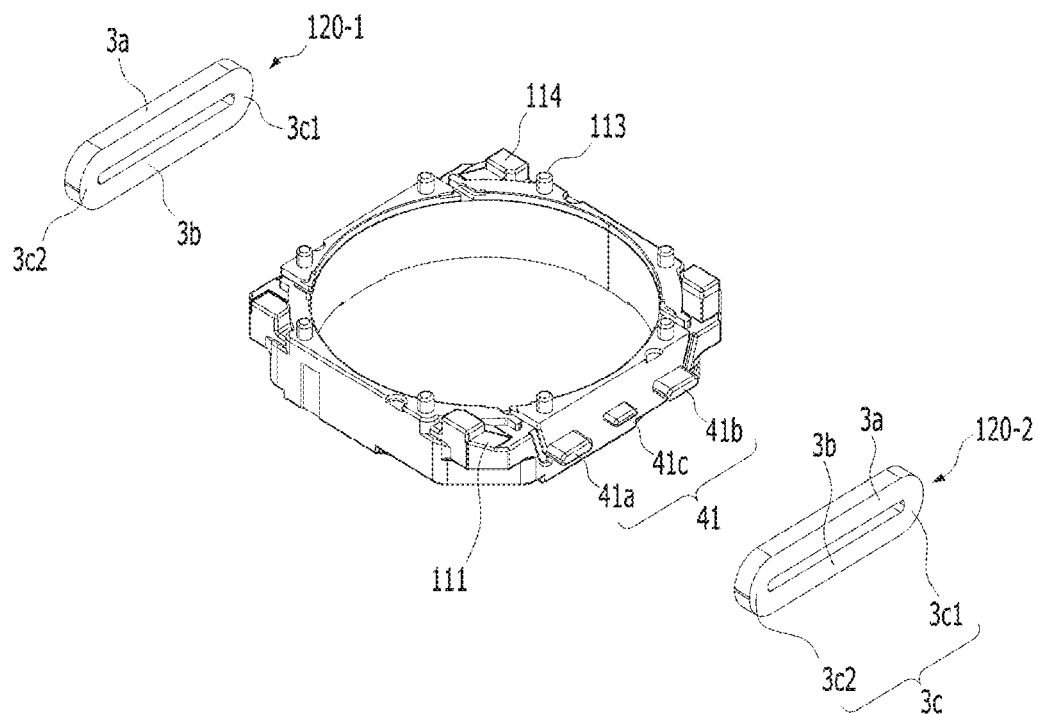
FIG. 22a is an exploded perspective view of a bobbin, a first coil unit, and a second coil unit.
Figure 22B:
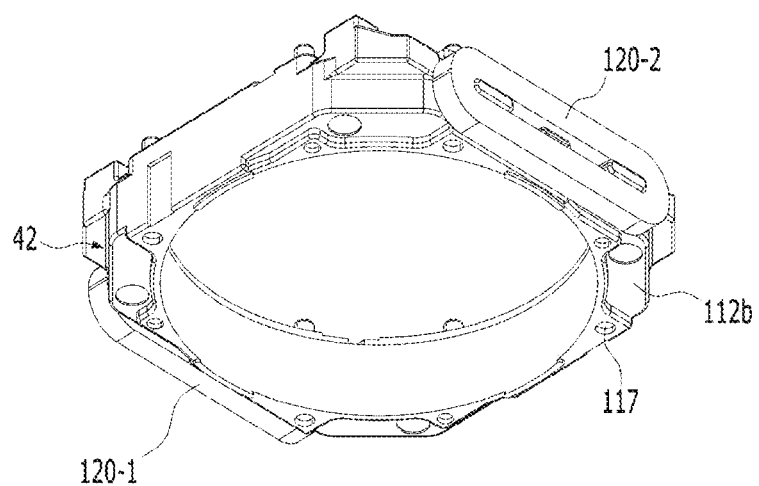
FIG. 22b is a coupled perspective view of a bobbin, a first coil unit, and a second coil unit.

FIG. 22a is an exploded perspective view of a bobbin 110, a first coil unit 120-1, and a second coil unit 120-2, and FIG. 22b is a coupled perspective view of a bobbin 110, a first coil unit 120-1, and a second coil unit 120-2.

Referring to FIGS. 22a and 22b, the bobbin 110 may have an opening for mounting a lens or a lens barrel. For example, the opening of the bobbin 110 may be in the form of a through hole penetrating through the bobbin 110, and the opening of the bobbin 110 may be circular, elliptical, or polygonal, but is not limited thereto.

A lens may be directly mounted in the opening of the bobbin 110, but is not limited thereto, and in another embodiment, a lens barrel for mounting or coupling at least one lens may be coupled or mounted to the opening of the bobbin 110. The lens or lens barrel may be coupled to the inner circumferential surface 110a of the bobbin 110 in various ways.

The bobbin 110 may comprise first side portions spaced apart from each other and second side portions spaced apart from each other. Each of the second side portions may connect two adjacent first side portions to each other. For example, first side portions of the bobbin 110 may be expressed as side portions, and second side portions of the bobbin 110 may be expressed as corner portions or corners.

A first protrusion unit 41 for mounting, coupling, or fixing the first coil unit 120-1 may be provided in the first side portion (or first outer side surface) of the bobbin 110, and a second protrusion unit for mounting, coupling, or fixing the second coil unit 120-2 may be provided in the second side portion (or second outer side surface) of the bobbin 110.

For example, the first protrusion unit 41 and the second protrusion unit may be provided in two side portions (or two outer side surfaces) of the bobbin 110 that are opposite to each other. The first protrusion unit 41 may comprise at least one protrusion 41a to 41c protruding from the first outer side surface of the bobbin 110. The second protrusion unit may comprise at least one protrusion protruding from the second outer side surface of the bobbin 110. The first protrusion unit 41 and the second protrusion unit may be implemented in the same shape, structure, or shape, but are not limited thereto, and may be implemented in different shapes, structures or shapes in other embodiments.

In another embodiment, instead of the first protrusion unit 41 and the second protrusion unit, the bobbin 110 may comprise a first seating portion in the form of a groove recessed from the first outer side surface of the bobbin 110 and a second seating portion in the shape of a groove recessed from the second outer side surface of the bobbin 110.

The bobbin 110 may comprise protruded portions 111 provided at corner portions. The protruded portion 111 may be protruded in a direction perpendicular to the optical axis and parallel to a direction from the center of the opening of the bobbin 110 toward the corner portion of the bobbin 110, but is not limited thereto.

The protruded portion 111 of the bobbin 110 corresponds to a groove portion 145 of the housing 140, and may be disposed or seated in the groove portion 145 of the housing 140, and it is possible to suppress or inhibit the bobbin 110 from moving or rotating over a certain range around the optical axis.

An escape groove for avoiding spatial interference with a first frame connection portion 153 of the upper elastic member 150 may be provided on an upper surface of the corner portion of the bobbin 110. In addition, an escape groove 112b for avoiding spatial interference with a second frame connection portion 163 of the lower elastic member 160 may be provided on a lower surface of the corner portion of the bobbin 110.

The bobbin 110 may comprise a first stopper 114 being protruded from an upper surface and a second stopper (not shown) being protruded from a lower surface. When the bobbin 110 moves in the first direction for the auto-focusing function, the first stopper 114 and the second stopper of the bobbin 110 may inhibit the upper surface of the bobbin 110 from directly colliding with the inner side of the upper plate of the cover member 300 even if the bobbin 110 moves beyond the specified range due to an external impact and the like, and may inhibit the lower surface of the bobbin 110 from directly colliding with the base 210, the second coil 230, or/and the circuit board 250. A first coupling portion 113 may be provided in an upper surface of the bobbin 110 for coupling and fixing to the upper elastic member 150, and a second coupling portion 117 may be provided in the lower surface of the bobbin 110 for coupling and fixing to the lower elastic member 160.

For example, in FIGS. 22a and 22b, the first coupling portion 113 of the bobbin 110 has a protrusion shape, and the second coupling portion 117 is a groove shape, but is not limited thereto, and in another embodiment, the first and second coupling portions of the bobbin 110 may have the shapes of a groove, a protrusion, or a plane.

Next, the first coil 120 will be described.

The first coil 120 may comprise a first coil unit 120-1 and a second coil unit 120-2 disposed on two side portions (or two outer side surfaces) being disposed at the opposite sides of the bobbin 110. Here, the "coil unit" may be represented by replacing it with a coil portion, a coil block, or a coil ring and the like.

The first coil unit 120-1 may be coupled to the first protrusion unit 41 of the bobbin 110, and the second coil unit 120-2 may be coupled to the second protrusion unit of the bobbin 110. For example, the first coil unit 120-1 may be wound or mounted on at least one protrusion of the first protrusion unit of the bobbin 110, and the second coil unit 120-2 may be wound or mounted on at least one protrusion of the second protrusion unit of the bobbin 110.

Each of the first coil unit 120-1 and the second coil unit 120-2 may comprise at least one of an oval shape, a trance shape, and a closed curve shape. For example, each of the first coil unit 120-1 and the second coil unit 120-2 may have a coil ring shape wound to rotate with respect to a reference straight line. Here, the reference straight line may be a straight line perpendicular to the optical axis and parallel to a direction from the optical axis toward the first outer side surface (or second outer side surface) of the bobbin 110.

For example, each of the first coil unit 120-1 and the second coil unit 120-2 may comprise a first portion 3a, a second portion 3b disposed below the first portion 3a, and a connection portion 3c connecting the a first portion 3a and the second portion 3b to each other, wherein a closed curve may be formed by the first to third portions 3a and 3c.

The third portion 3c may comprise a first connecting portion 3c1 connecting one end of the first portion 3a and one end of the second portion 3b, and a second connection portion 3c2 connecting the other end of the first portion 3a and the other end of the second portion 3b.

For example, the first portion 3a may be expressed as a "first straight portion", the second portion 3b may be expressed as a "second straight portion", the third portion 3c may be expressed as a "curved portion", the first connecting portion 3c1 may be expressed as a first curved portion, and the second connecting portion 3c2 may be expressed as a second curved portion.

The first coil 120 is disposed between the first coil unit 120-1 and the second coil unit 120-2, and may comprise a connection portion (or connection line, connection coil) (not shown) connecting the first coil unit 120-1 and the second coil unit 120-2 each other.

One end of the connection portion of the first coil 120 may be connected to one end of the first coil unit 120-1, and the other end of the connection portion of the first coil 120 may be connected to one end of the second coil unit 120-2. That is, the first coil unit 120-1 and the second coil unit 120-2 may be connected in series by the connection portion of the first coil 120.

For example, the connection portion of the first coil 120 may face the third magnet 130-1 and may be disposed between the third magnet 130-1 and the bobbin 110.

According to another embodiment, the connection portion of the first coil 120 may face the dummy member 135 and may be disposed between the dummy member 135 and the bobbin 110.

In another embodiment, the first coil unit 120-1 and the first coil unit 120-2 may be a separated type or a type spaced apart from each other.

When a driving signal (e.g., a driving current) is supplied to the first coil 120, an electromagnetic force may be formed through an electromagnetic interaction between the first coil 120 and the first and second magnets 130-1 and 130-2, and the bobbin 110 may be moved in the direction of the optical axis OA by the electromagnetic force that has been formed.

Due to the electromagnetic interaction between the first coil 120 and the first and second magnets 130-1 and 130-2, the bobbin 110 may be moved toward the upper side or lower side direction (e.g., Z-axis direction) with respect to the initial position of an AF movable unit, which is referred to as bidirectional driving of the AF movable unit.

Alternatively, at the initial position of the AF movable unit, the bobbin 110 may be moved toward the upper direction, which is referred to as unidirectional driving of the AF movable unit.

Figure 29:
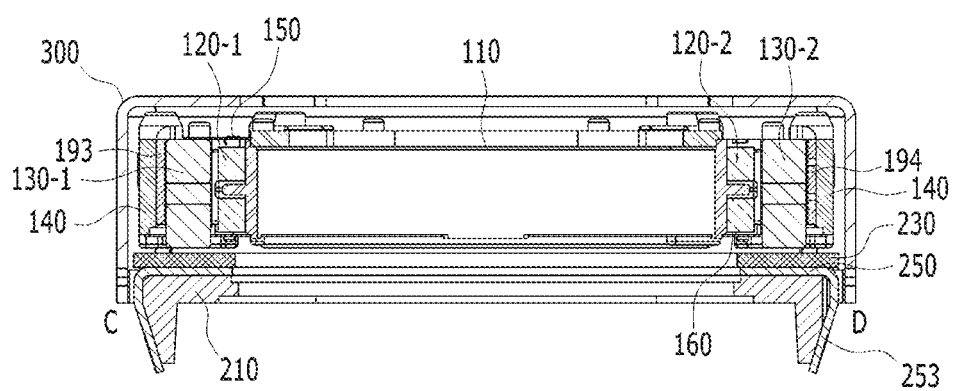
FIG. 29 is a cross-sectional view of a lens driving apparatus 100 in the CD direction of FIG. 21.

Referring to FIG. 29, at the initial position of the AF movable unit, the first coil unit 120-1 is perpendicular to the optical axis and may be facing or being overlapped with the first magnet 130-1 in a direction directed from the optical axis toward the first coil unit 120-1 (or the center of the first coil unit 120-1), but does not face or overlap with the third magnet 130-3.

At the initial position of the AF movable unit, the second coil unit 120-2 is perpendicular to the optical axis and may be facing or being overlapped with the second magnet 130-2 in a direction directed from the optical axis toward the second coil unit 120-2 (or the center of the second coil unit 120-2), but does not face or overlap with the third magnet 130-3.

The AF movable unit may comprise a bobbin 110 and components coupled to the bobbin 110. For example, the AF movable unit may comprise a bobbin 110, a first coil 120, a sensing magnet 180, or/and a balancing magnet. In addition, the AF movable unit may further comprise a lens mounted on the bobbin 110.

And the initial position of the AF movable unit is the initial position of the AF movable unit in a state where power is not applied to the first coil 120, or it may be a position where the AF movable unit is placed as the upper and lower elastic members 150 and 160 are elastically deformed only by the weight of the AF movable unit.

In addition to this, the initial position of the bobbin 110 may be a position where the AF movable unit is placed when gravity acts from the base 210 toward the bobbin 110, or on the contrary to this, when gravity acts in the direction of the base 210 from the bobbin 110.

Next, the housing 140 will be described.

The housing 140 accommodates at least a portion of the bobbin 110 at an inner side, and supports a first magnet 130-1, a second magnet 130-2, a third magnet 130-3, and a dummy member 135.

The OIS movable unit may be moved in a direction perpendicular to the optical axis by an interaction between the first to third magnets 130-1 to 130-4 and the second coil 230. The 'OIS movable unit' may comprise an AF movable unit and a housing 140.

Figure 23A:
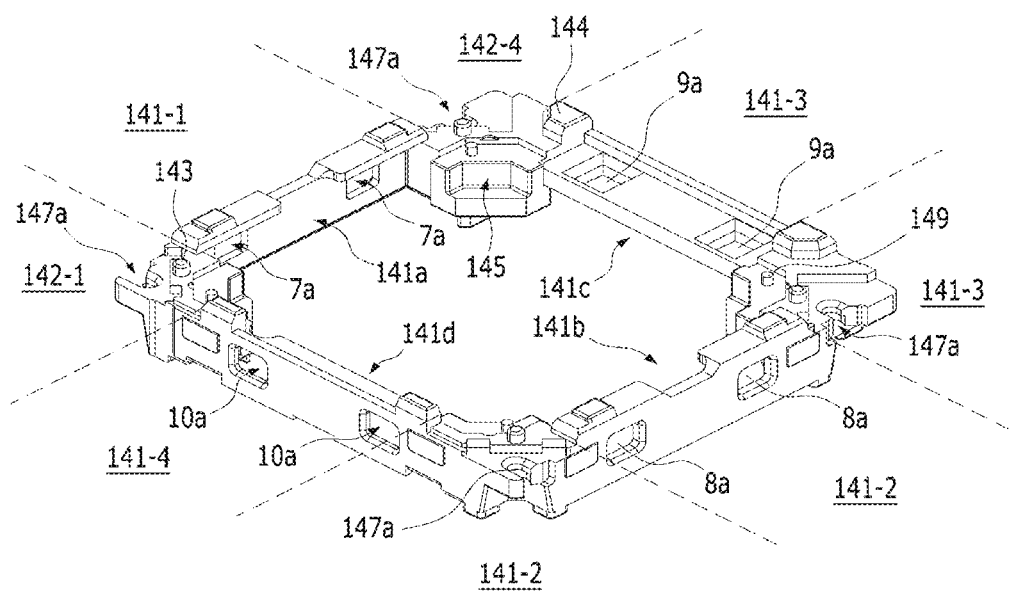
FIG. 23a is an exploded perspective view of a housing, first to third magnets, and a dummy member.
Figure 23A:
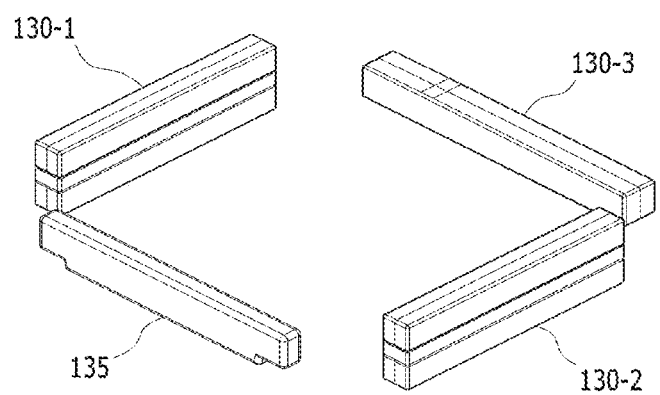
Figure 23B:
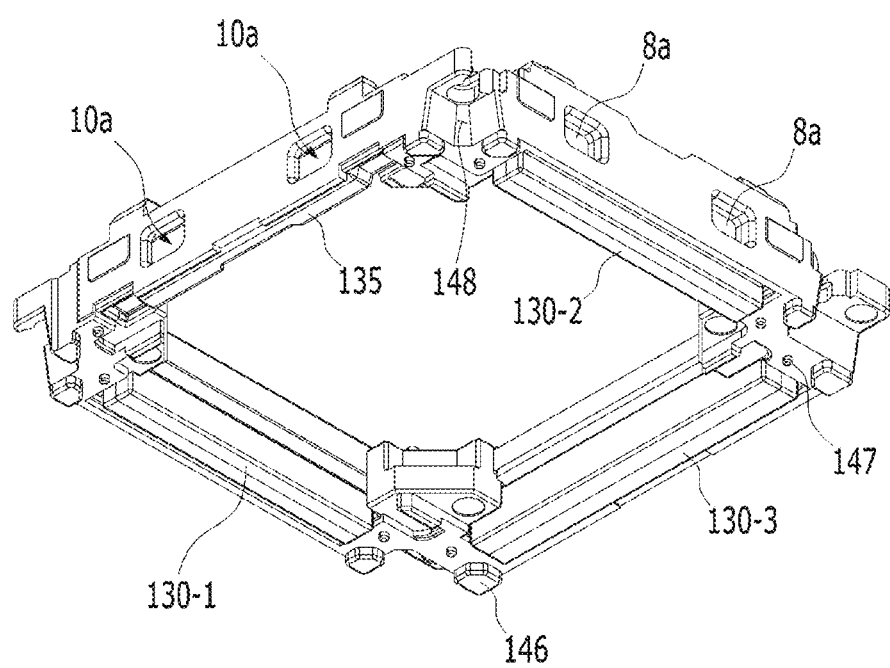
FIG. 23b is a perspective view illustrating a housing, first to third magnets, and a dummy member.

FIG. 23a is an exploded perspective view of a housing 140, first to third magnets 130-1 to 130-3, and a dummy member 135; FIG. 23b is a coupled perspective view of a housing 140, first to third magnets 130-1 to 130-3, and a dummy member 135.

Referring to FIGS. 23a and 23b, the housing 140 may be disposed at the inner side of the cover member 300, and may be disposed between the cover member 300 and the bobbin 110. The housing 140 may accommodate the bobbin 110 at the inner side thereof.

The outer side surface of the housing 140 may be spaced apart from the inner surface of the lateral plate of the cover member 300, and the housing 140 may be moved by OIS driving due to the separation space between the housing 140 and the cover member 300.

The housing 140 may have a hollow pillar shape comprising an opening or a hollow. For example, the housing 140 may be provided with a polygonal (e.g., square or octagonal) or circular opening.

The housing 140 may comprise a plurality of side portions 141-1 to 141-4 and a plurality of corner portions 142-1 to 142-4.

For example, the housing 140 may comprise first to fourth side portions 141-1 to 141-4 and first to fourth corner portions 142-1 to 142-4.

The first to fourth side portions 141-1 to 141-4 may be spaced apart from each other. Each of the corner portions 142-1 to 142-4 of the housing 140 may be disposed or positioned between two adjacent side portions (141-1 and 141-2, 141-2 and 141-3, 141-3 and 141-4, and 141-4 and 141-1), and may connect the side portions 141-1 to 141-4 to each other.

For example, the corner portions 142-1 to 142-4 may be located at a corner or edge of the housing 140. For example, the number of side portions of the housing 140 is four, and the number of corner portions is four, but is not limited thereto.

Each of the side portions 141-1 to 141-4 of the housing 140 may be disposed in parallel with a corresponding one of the lateral plates of the cover member 300.

The length of each of the side portions 141-1 to 141-4 of the housing 140 in the horizontal direction may be greater than the length of each of the corner portions 142-1 to 142-4 in the horizontal direction, but is not limited thereto.

The first side portion 141-2 and the second side portion 141-2 of the housing 140 may be located at an opposite side from each other, and the third side portion 141-3 and the fourth side portion 141-4 may be located at an opposite side from each other. Each of the third side portion 141-3 and the fourth side portion 141-4 of the housing 140 may be positioned between the first side portion 141-2 and the second side portion 141-2.

In order to inhibit the cover member 300 from directly colliding with the inner side surface of the upper plate, a stopper 144 may be provided on an upper portion, upper end, or upper surface of the housing 140.

At least one first coupling portion 143 coupled to a first outer frame 152 of the upper elastic member 150 may be provided on an upper portion, upper end, or upper surface of the housing 140. In addition, at least one second coupling portion 147 coupled to and fixed to a second outer frame 162 of the lower elastic member 160 may be provided at the lower portion, lower end, or lower surface of the housing 140.

Each of the first coupling portion 143 and the second coupling portion 147 of the housing 140 may have a protrusion shape, but is limited thereto. In another embodiment, it may be a flat surface or a groove shape.

The first coupling portion 143 of the housing 140 and a hole 152a of the first outer frame 152 of the upper elastic member 150 may be coupled using heat fusion bonding or an adhesive, and the second coupling portion 147 of the housing 140 and a hole 162a of the second outer frame 162 of the lower elastic member 160 may be coupled.

The housing 140 is provided on any of the two side portions (e.g., the first side portion 141-1) positioned opposite each other, and provided on the first seating portion 141a in which the first magnet 130-1 is to be disposed, and provided on the remaining one of the two side portions 141-2, and it may comprise a second mounting portion 141b in which the second magnet 130-2 is to be disposed.

In addition, the is provided on any of the two side portions (e.g., the third side portion 141-3) positioned opposite each other, and provided on the third seating portion 141c in which the third magnet 130-3 is to be disposed, and provided on the remaining one of the two side portions 141-4, and it may comprise a fourth seating portion 141d in which the dummy member 135 is to be disposed.

Each of the first to third seating portions 141a to 141c of the housing 140 may be provided on an inner side surface of a corresponding one of the side portions of the housing 140, but is not limited thereto, and in other embodiments it may be provided on the outer side surface of the housing 140.

Each of the first to third seating portions 141a to 141c of the housing 140 is a groove having a shape corresponding or identical to any one of the first to third magnets 130-1 to 130-3, for example, may be formed as a concave groove, but is not limited thereto.

The fourth seating portion 141d of the housing 140 may be formed as a groove having a shape corresponding or identical to the dummy member 135, but is not limited thereto.

For example, the first seating portion 141a (or the second mounting portion 141b) of the housing 140 may be formed with a first opening facing the first coil unit 120-1 (or the second coil unit 120-2) and a second opening facing the third coil unit 230-1 (or the fourth coil unit 230-2), and this is to facilitate mounting of the magnet 130.

The third seating portion 141c of the housing 140 may have a first opening facing the outer side surface of the bobbin 110 and a second opening facing the fifth coil unit 230-3.

The fourth seating portion 141d of the housing 140 may comprise at least one of a first opening facing the outer side surface of the bobbin 110 and a second opening which is open in a downward direction, but is not limited thereto.

For example, one side surface of the magnets 130-1, 130-2, and 130-3 fixed or disposed on the seating portions 141a, 141b, 141c of the housing 140 may be exposed through the first opening of the seating portions 141a, 141b, and 141c. In addition, the lower surface of the magnets 130-1, 130-2, and 130-3 fixed or disposed on the seating portions 141a, 141b, and 141c of the housing 140 may be exposed through the second opening of the seating portions 141a, 141b, and 141c.

The dummy member 135 fixed or disposed on the seating portion 141d of the housing 140 may be exposed at least partially through the first opening or/and the second opening formed in the seating portion 141d, but is not limited thereto.

For example, the first to third magnets 130-1 to 130-3 and the dummy member 135 may be fixed to the seating portions 141a to 141d by an adhesive.

The housing 140 may comprise at least one first hole 7a penetrating through the first side portion 141-1 of the housing 140. For example, the first hole 7a of the housing 140 may pass through the outer side surface of the first side portion 141-1 of the housing 140 and may be open toward the inner side (e.g., the first seating portion 141a) of the housing 140.

The housing 140 may comprise at least one second hole 8a penetrating through the second side portion 141-2 of the housing 140. For example, the second hole 8a of the housing 140 may pass through the outer side surface of the second side portion 141-2 of the housing 140 and may be open toward the inner side (e.g., the second seating portion 141b) of the housing 140.

The housing 140 may comprise at least one third hole 9a penetrating through the third side portion 141-3 of the housing 140. For example, the third hole 9a of the housing 140 may pass through the upper surface of the third side portion 141-3 of the housing 140 and may be open toward the inner side (e.g., the third seating portion 141c) of the housing 140.

The housing 140 may comprise at least one fourth hole 10a penetrating through the fourth side portion 141-4 of the housing 140. For example, the fourth hole 10a of the housing 140 may pass through the upper surface of the fourth side portion 141-4 of the housing 140 and may be open toward the inner side (e.g., the fourth seating portion 141d) of the housing 140.

The first to fourth holes 7a to 10a may be adhesive injection holes for injecting an adhesive for fixing or attaching the first to third magnets 130-1 to 130-3, and the dummy member 135 to the seating portions 141a to 141d of the housing 140.

Support members 220-1 to 220-4 may be disposed at the corner portions 142-1 to 142-4 of the housing 140, and in the corner portions 142-1 to 142-4 of the housing 140, a groove 147 or a hole forming a pathway through which the support members 220-1 to 220-4 pass may be provided.

For example, the groove 147 may be a structure being recessed from the outer side surface of the corner portion of the housing 140, and at least a portion of the groove 147 may be opened to the outer side surface of the corner portion. The number of holes 147 of the housing 140 may be the same as the number of support members.

In another embodiment, instead of the groove 147, the housing 140 may have a through hole passing through the upper portions of the corner portions 142-1 to 142-4.

The housing 140 may comprise at least one stopper (not shown) being protruded from the outer side surface of the side portions 141-1 to 141-4, and at least one stopper may inhibit collision with the cover member 300 when the housing 140 moves in a direction perpendicular to the optical axis direction.

In order to inhibit the lower surface of the housing 140 from colliding with the base 210 and/or the circuit board 250, the housing 140 may comprise a stopper 146 being protruded from the lower surface.

In order to secure a pathway through which the support members 220-1 to 220-4 pass, as well as to secure a space for filling silicon that can serve as a damping function, the housing 140 may comprise a groove 148 provided at a lower portion or lower end of the corner portions 142-1 to 142-4.

The housing 140 may comprise a damper guide 149 in the shape of a protrusion being protruded from an upper surface of the housing 140 provided on an upper surface of the housing 140.

For example, the damper guide 149 may be disposed on an upper surface of at least one of the corner portions of the housing 140. The damper guide 149 may be disposed closer to the center of the housing 140 than the first coupling portion 143 of the housing 140.

A damper 71 may be disposed between the damper guide 149 and the connection portion 153 of the upper elastic member 150. The damper 71 may be adhered to the connection portion 153 and the damper guide 147, and may suppress the oscillation of the lens driving apparatus, for example, the AF movable unit during AF driving.

Next, the first magnet 130-1, the second magnet 130-2, and the third magnet 130-3 will be described.

The first magnet 130-1, the second magnet 130-2, and the third magnet 130-3 may be spaced apart from one another and disposed in the housing 140. For example, each of the first to third magnets 130-1 to 130-3 may be disposed between the bobbin 110 and the housing 140.

The first magnet 130-1, the second magnet 130-2, and the third magnet 130-3 may be disposed on a side portion of the housing 140.

The first magnet 130-1 and the second magnet 130-2 may be disposed on two side portions 141-1 and 141-2 positioned at the opposite side from each other among the side portions 141-1 to 141-4 of the housing 140.

For example, the first magnet 130-1 may be disposed on the first side portion 141-1 of the housing 140, and the second magnet 130-2 may be disposed on the second side portion 141-2 of the housing 140 facing the first side portion 141-1. For example, the third magnet 130-3 may be disposed on the third side portion 141-3 of the housing 140.

Since the first and second coil units 120-1 and 120-2 for AF driving are disposed on two side portions of the bobbin 110 facing each other, a coil unit for AF driving is not disposed between the bobbin 110 and the third magnet 130-3. In addition, a coil unit for AF driving is not disposed between the bobbin 110 and the dummy member 135.

In addition, for OIS driving, since the third to fourth coil units 230-1 to 230-4 and the first to third magnets 130-1 to 130-3 correspond to each other, the second coil 230 for OIS driving is not disposed between the dummy member 135 and the circuit board 250.

For example, the first magnet 130-1 may comprise a first surface facing the first coil unit 120-1, and a first surface of the first magnet 130-1 may comprise a first non-magnetic barrier wall (refer to 11*c* of FIG. 30*a*) located between the two polarities of the N and S poles and the two polarities.

For example, the first magnet 130-1 may comprise a second surface facing the third coil unit 230-1, and the second surface of the first magnet 130-1 may comprise two polarities of an N pole and an S pole.

For example, the second magnet 130-2 may comprise a first surface facing the second coil unit 120-2, and the first surface of the second magnet 130-2 may comprise two polarities of an N-pole and an S-pole, and a second non-magnetic partition wall (refer to 12*c* of FIG. 30*a*) located between the two polarities.

For example, the second magnet 130-2 may comprise a second surface facing the fourth coil unit 230-2, and the second surface of the second magnet 130-2 may comprise two polarities of an N pole and an S pole.

For example, the third magnet 130-3 may comprise a first surface facing the side portion of the bobbin 110 facing the side portion of the housing 140 in which the third magnet 130-3 is disposed, and the first surface of the third magnet 130-3 may comprise two polarities of an N pole and an S pole.

For example, the third magnet 130-3 may comprise a second surface facing the fifth coil unit 230-3, and the second surface of the third magnet 130-3 may comprise two polarities of the N pole and the S pole and a third nonmagnetic partition wall (refer to 13*c* of FIG. 30*a*) located between the two polarities.

At the initial position of the AF movable unit, the first magnet 130-1 may be overlapped with the first coil unit 120-1 in a direction perpendicular to the optical axis and directed from the optical axis toward the first coil unit 120-1 (or the center of the first coil unit 120-1).

At the initial position of the AF movable unit, the second magnet 130-2 may be overlapped with the second coil unit 120-2 in a direction perpendicular to the optical axis and directed from the optical axis toward the second coil unit 120-2 (or the center of the second coil unit 120-2).

At the initial position of the AF movable unit, the third magnet 130-3 does not face or being overlapped with the first coil unit 120-1 and the second coil unit 120-2 in a direction perpendicular to the optical axis and from the third side portion 141-3 of the housing 140 toward the fourth side portion 141-4.

For example, each of the first to third magnets 130-1 to 130-3 may be disposed at one of the first to third seating portions 141*a* to 141*c* of the housing 140.

The first magnet 130-1 may be overlapped with the second magnet 130-2 in a direction perpendicular to the optical axis and from the first side portion 141-1 of the housing 140 toward the second side portion 141-2.

The shape of each of the first to third magnets 130-1 to 130-3 may be a polyhedral shape that is easy to be seated or disposed on any corresponding one among the first to third side portions 141-1 to 141-3 of the housing 140. For example, each of the first to third magnets 130-1 to 130-3 may have a flat plate shape, but is not limited thereto.

Each of the first to third magnets 130-1 to 130-3 may be a 4-pole magnet comprising two N poles and two S poles. Here, the 4-pole magnet may be expressed as a 2-pole magnetized magnet. The first to third magnets 130-1 to 130-3 will be described later.

The dummy member 135 may be disposed on the fourth side portion 141-4 of the housing 140. The dummy member 135 may be a non-magnetic material, but is not limited thereto, and in other embodiments may comprise a magnetic material.

The dummy member 135 may have the same mass (or weight) as the third magnet 130-3, but is not limited thereto. For example, in another embodiment, the mass (or weight) of the dummy member 135 may be larger or smaller than the mass (or weight) of the third magnet 130-3.

For weight balance, the dummy member 135 may be disposed at the side portion 141-4 of the housing 140 located at the opposite side of the side portion 141-3 of the housing 140 in which the third magnet 130-3 is disposed.

At the initial position of the AF movable unit, the dummy member 135 does not face or being overlapped with the first coil unit 120-1 and the second coil unit 120-2 in a direction perpendicular to the optical axis and from the third side 141-3 toward the fourth side portion 141-4 of the housing 140.

The dummy member 135 may be overlapped with the third magnet 130-3 in a direction perpendicular to the optical axis and from the third side portion 141-3 of the housing 140 toward the fourth side portion 141-4.

For example, when the dummy member 135 comprises a magnetic material, the magnetic intensity of the dummy member 135 may be less than that of the third magnet 130-3.

The dummy member 135 may comprise tungsten, and tungsten may occupy 95% or more of the total weight. For example, the dummy member 135 may be a tungsten alloy, but is not limited thereto.

The dummy member 135 may have a polyhedral shape, for example, a rectangular parallelepiped shape, but is not limited thereto and may be formed in various shapes.

For example, grooves 35a and 35b may be formed in at least one of one end of the dummy member 135 and the other end of the dummy member 135. In addition, for example, a groove 35c may be formed on one side of the dummy member 135 facing the outer side surface of the bobbin 110. In addition, for example, the dummy member 135 may comprise a rounded portion or a curved surface at an edge of a side surface thereof.

The first yoke 193 may be disposed between the first magnet 130-1 and an outer side surface of the first side portion 141-1 of the housing 140. The first yoke 193 may reduce the leakage magnetic flux of the first magnet 130-1 and may improve an electromagnetic force between the first magnet 130-1 and the first coil unit 120-1.

The second yoke 194 may be disposed between the second magnet 130-2 and the outer side surface of the second side portion 142-2 of the housing 140. The second yoke 194 may reduce the leakage magnetic flux of the second magnet 130-2 and may improve an electromagnetic force between the second magnet 130-2 and the second coil unit 120-2.

The third yoke 195 may be disposed between the third magnet 130-3 and the upper surface of the third side portion 141-3 of the housing 140. The third yoke 195 may reduce the leakage magnetic flux of the third magnet 130-3, and enhance the electromagnetic force between the third magnet 130-3 and the fifth coil unit 230-3 of the second coil 230.

Figure 36:
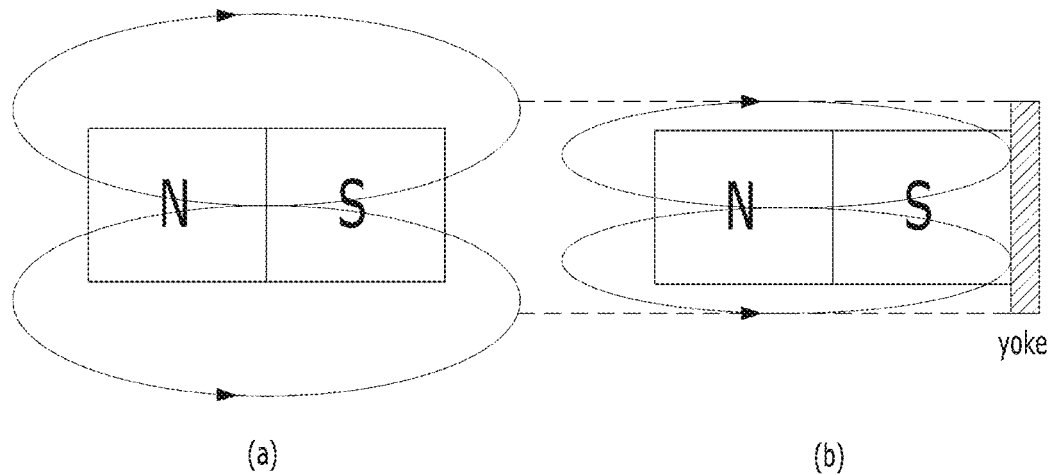
FIG. 36 shows the magnetic field lines of a first magnet when there is no yoke and the magnetic field lines of the first magnet when a yoke 193 is present.

FIG. 36 shows magnetic field lines of the first magnet 130-1 when there is no yoke and magnetic field lines of the first magnet 130-1 when there is a yoke 193.

In FIG. 36, (a) shows the magnetic field lines of the first magnet 130-1 when there is no yoke, and (b) shows magnetic field lines of the first magnet 130-1 when the yoke 193 is present.

Referring to FIG. 36, magnetic field lines of the first magnet 130-1 may be concentrated on the first coil unit 120-1 by a yoke, and thus, a leakage magnetic flux may be reduced.

For example, when comparing the electromagnetic force between the first magnet and the first coil unit in (a) of FIG. 36, the electromagnetic force between the first magnet 130-1 and the first coil unit 120-1 in (b) of FIG. 36 may be increased by 30% by the yoke.

Next, the upper elastic member 150, the lower elastic member 160, the support member 220, the second coil 230, the circuit board 250, and the base 210 will be described.

Figure 24:
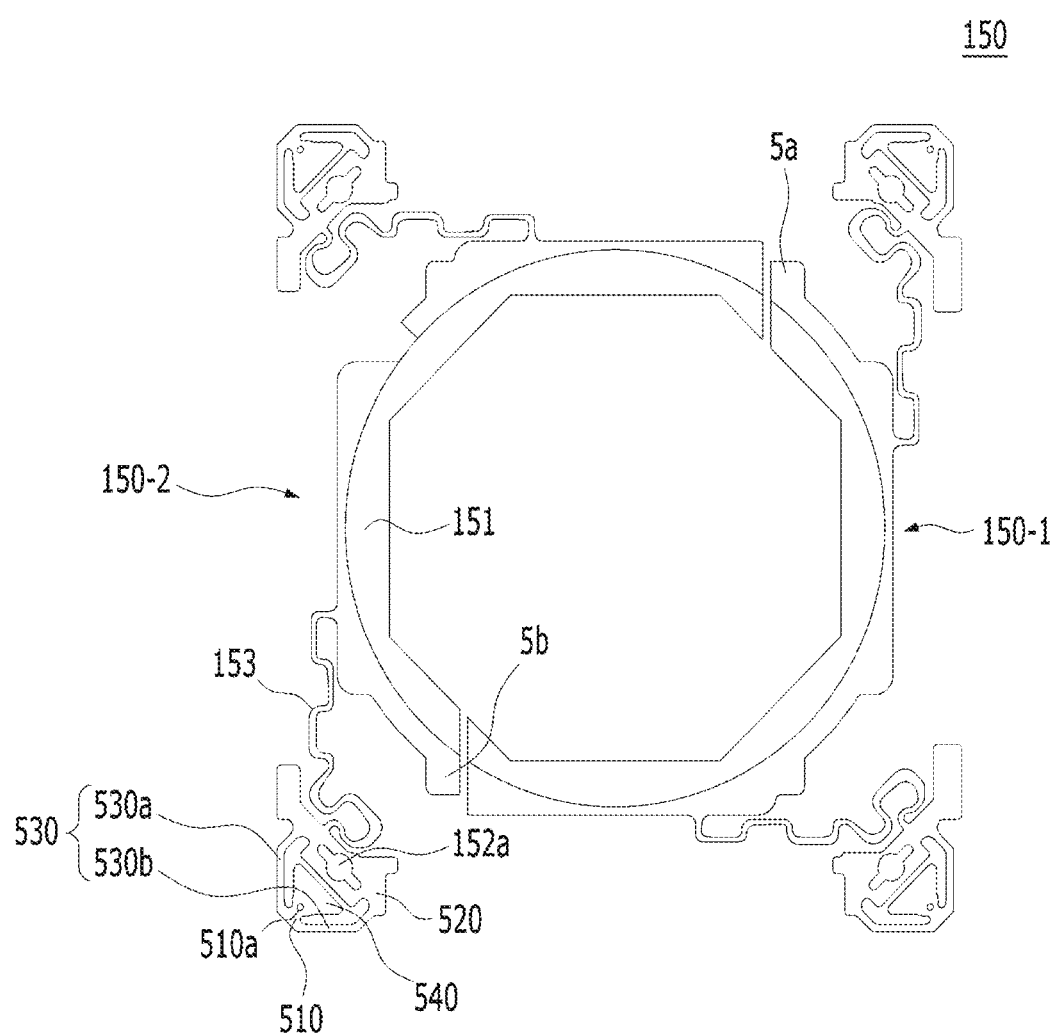
FIG. 24 is a plan view of an upper elastic member.
Figure 25:
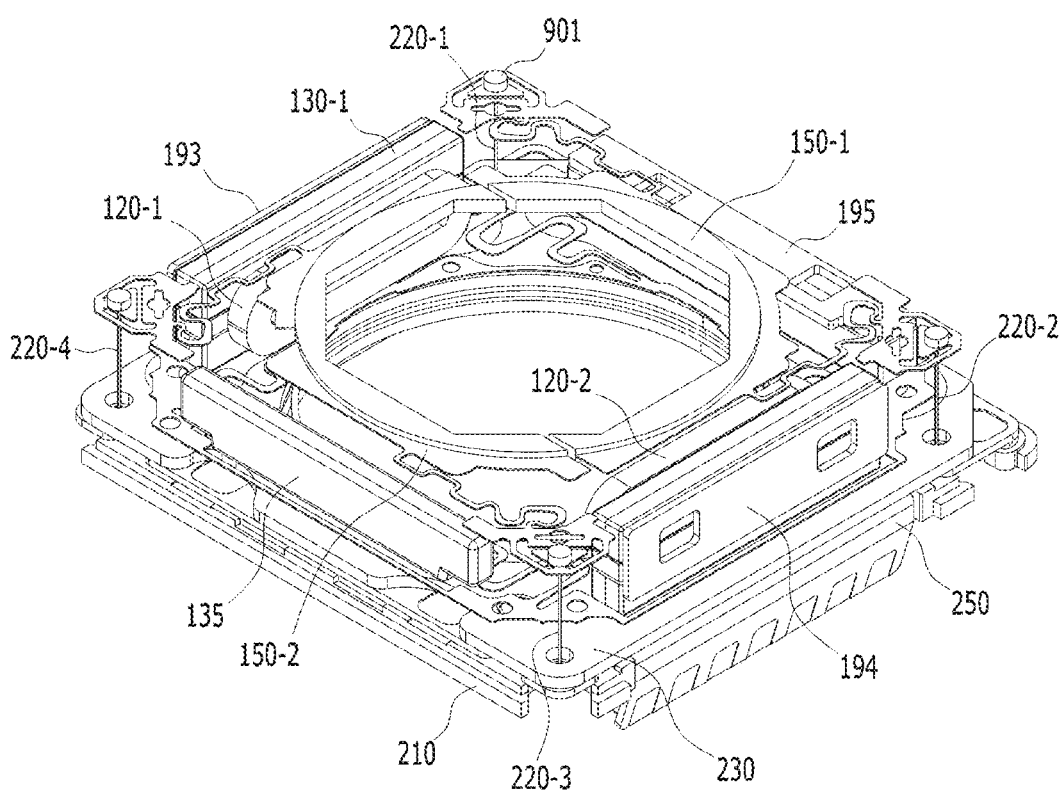
FIG. 25 is a diagram for describing an electrical connection relationship between an upper elastic member, a first coil, and a support member.
Figure 26:
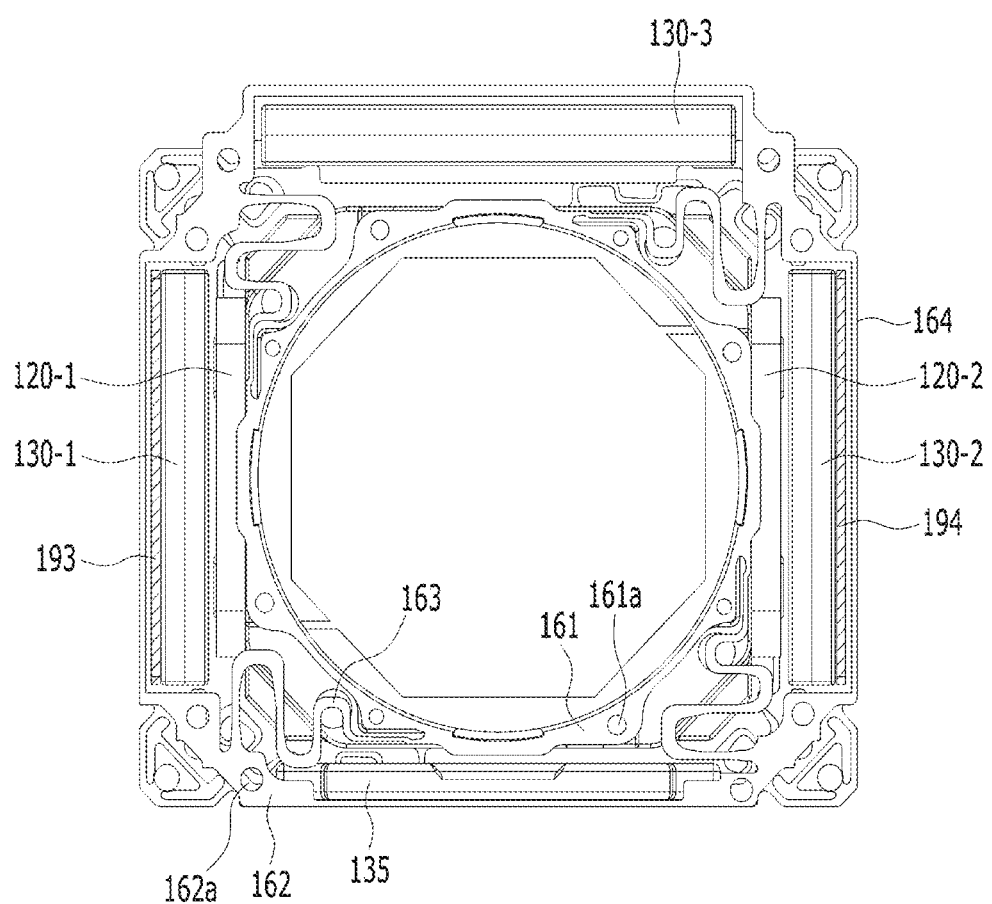
FIG. 26 is a bottom view of a lower elastic member and a housing.
Figure 27:
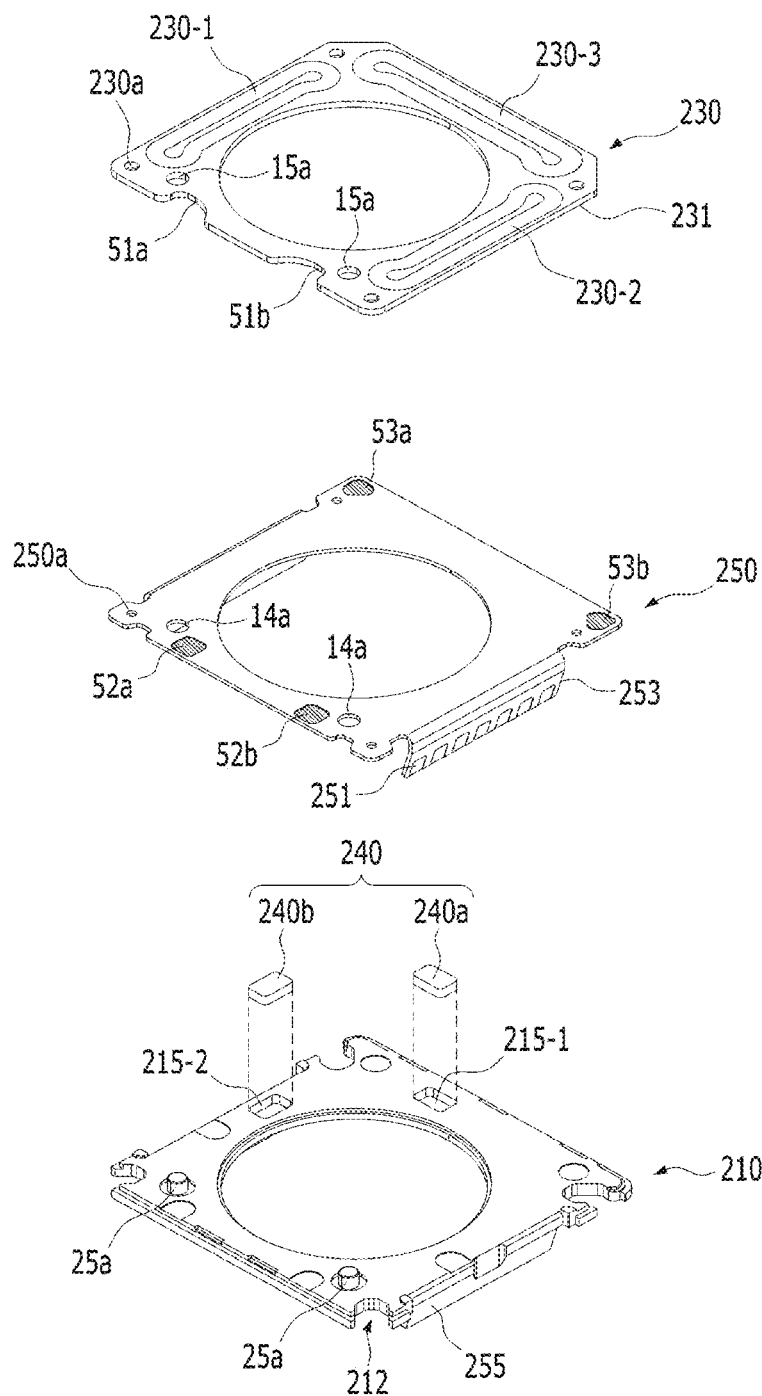
FIG. 27 shows an exploded perspective view of a second coil, a circuit board, and a base.

FIG. 24 is a plan view of the upper elastic member 150, FIG. 25 is a view for explaining the electrical connection relationship between the upper elastic member 150, the first coil 120, and the support member 220, FIG. 26 is a bottom view of the lower elastic member 160 and the housing 140, and FIG. 27 is an exploded perspective view of the second coil 230, the circuit board 250, and the base 210.

Referring to FIGS. 24 to 27, the upper elastic member 150 may be coupled to an upper portion, upper surface, or upper end of the bobbin 110 and an upper portion, upper surface, or upper end of the housing 140. The lower elastic member 160 may be coupled to a lower portion, lower surface, or lower end of the bobbin 110 and a lower portion, lower surface, or lower end of the housing 140.

The upper elastic member 150 and the lower elastic member 160 may constitute an elastic member, the elastic member may be coupled to the bobbin and the housing, and the elastic member may elastically support the bobbin 110 with respect to the housing 140.

The upper elastic member 150 may comprise a plurality of upper springs 150-1 and 150-2 electrically separated from each other. In FIG. 24, two electrically separated upper springs are shown, but the number is not limited thereto, and in other embodiments, three or more may be used.

At least one of the first and second upper springs 150-1 and 150-2 may further comprise a first inner side frame 151 coupled to the bobbin 110, a first outer side frame 152 coupled to the housing 140, and a first frame connection portion 153 connecting the first inner side frame 151 and the first outer side frame 152. In another embodiment, the inner side frame may be represented as "inner side portion" and the outer side frame may be represented as "outer side portion".

For example, the first upper spring 150-1 may comprise two first outer side frames disposed on two among the corner portions 142-1 to 142-4 of the housing 140, and the second upper side spring 150-2 may comprise two first outer side frames disposed on the other two among the corner portions 142-1 to 142-4 of the housing 140.

For example, the first outer side frame 152 may be provided with a hole 152a for coupling with the first coupling portion 143 of the housing 140. In addition, for example, a hole (not shown) for coupling with the first coupling portion 113 of the bobbin 110 may be provided in the first inner side frame 151.

The first outer frame 152 of the first and second upper springs 150-1 and 150-2 may comprise a first coupling portion 510 coupled to the support members 220-1 to 220-4, a second coupling portion 520 coupled to a corresponding one among the corner portions of the housing 140, and a connection portion 530 connecting the first coupling portion 510 and the second coupling portion 520.

For example, the connection portion 530 may comprise a first connection portion 530-1 connecting the first region of the first coupling portion 510 and the second coupling portion 520 and a second connection portion 530-2 connecting the second region of the second coupling portion 520. The connection portion 530 may comprise a portion that is bent or curved at least once.

The first coupling portion 510 may comprise a hole 52 through which the support member 220 penetrating. One end of the support member 220 passing through the hole 52 may be coupled to the first coupling portion 510 by a conductive adhesive member or solder 901, and the first coupling portion 510 and the support member 220 may be electrically connected.

The first coupling portion 510 may comprise an extension portion 540 being extended in a direction from the first coupling portion 510 toward the second coupling portion 520.

The extension portion 540 may comprise a portion whose width increases as it is extending in a direction directed from the first coupling portion 510 toward the second coupling portion 520. For example, a portion in which the width of the extension portion 540 is getting wider may have a fan shape, but is not limited thereto.

A damper may be disposed between the extension portion 540 and the second coupling portion 520, and the extension portion 540 and the second coupling portion 520 may be connected by the damper, and the damper may play the role of absorbing or buffering the vibration of the support member 220 or buffering the movement of the support member 220.

The first upper spring 150-1 may comprise a first bonding portion 5a, provided at one end of the first inner side frame 151 of the first upper spring 150-1, to which one end of the first coil unit 120-1 is coupled or bonded. For example, one end of the first coil unit 120-1 may be coupled to the first bonding portion 5a of the first upper spring 150-1 by soldering or a conductive adhesive member.

The second upper spring 150-2 may comprise a second bonding unit 5b, provided at the other end of the first inner frame 151 of the second upper spring 150-2, to which the other end of the second coil unit 120-2 is coupled or bonded. For example, the other end of the second coil unit 120-2 may be coupled to the second bonding portion 5b of the second upper spring 150-2 by soldering or a conductive adhesive member.

The first coil 120 may be electrically connected to the first and second upper springs 150-1 and 150-2. The first coil 120 may be electrically connected to the two terminals of the circuit board 250 through at least one of the support members 220-1 and 220-2 connected to the first upper spring 150-1, and at least one of the support members 220-3 and 220-4 connected to the second upper spring 150-2.

Referring to FIG. 26, the lower elastic member 160 may comprise at least one lower spring.

For example, the lower elastic member 160 may comprise a second inner side frame 161 coupled or fixed to a lower portion, lower surface, or lower end of the bobbin 110, a second outer side frame 162 coupled or fixed to a lower portion, lower surface, or lower end of the housing 140, and a second frame connection portion 163 connecting the second inner side frame 161 and the second outer side frame 162 to each other.

In addition, the lower elastic member 160 may comprise at least one connection frame 164 that connects the second outer side frames 162 disposed under the corner portions of the housing 140 to each other.

At least one connection frame 164 can be located on the outer side with respect to the coil units 230-1 to 230-3, the magnets 130-1 to 130-3, or/and the dummy member 135 of the second coil 230 in order to avoid spatial interference with the second coil 230, the magnets 130-1 to 130-3, and the dummy member 135. At this time, the outer side may be the opposite side of the area where the center of the bobbin 110 or the center of the housing 140 is located with respect to the coil units 230-1 to 230-3, the magnets 130-1 to 130-3, or/and the dummy member 135.

Also, for example, the connection frame 164 may be positioned so as not to be overlapped with the coil units 230-1 to 230-3, magnets 130-1 to 130-3, or/and the dummy member 135 in the optical axis direction, but are not limited thereto, and in another embodiment, at least a portion of the connection frame 164 may be aligned or overlapped with the coil units 230-1 to 230-3, magnets 130-1 to 130-3, or/and the dummy member 135 in the optical axis direction.

Each of the first frame connection portion 153 of the upper elastic member 150 and the second frame connection portion 163 of the lower elastic member 160 is formed to be bent or curved (or curved) at least one time so that a pattern of a certain shape can be formed. The bobbin 110 can be resiliently (or elastically) supported by an upward and/or downward motion in a first direction through a change in position and fine deformation of the first and second frame connection portions 153 and 163.

The second inner side frame 161 may be provided with a hole 161a to be coupled to the second coupling portion 117 of the bobbin 110, and the second outer side frame 162 may be provided with a hole 162a for coupling with the second coupling portion 147 of the housing 140.

The upper springs 150-1 and 150-2 and the lower spring may be formed of a plate spring, but are not limited thereto, and may be implemented with a coil spring or the like. The term "upper spring" may be expressed by replacing the upper elastic unit, and the lower spring may be represented by replacing it with the lower elastic unit.

In order to absorb and buffer the vibration of the bobbin 110, the lens driving apparatus 100 may be further provided with a first damper (not shown) disposed between each of the upper springs 150-1 and 150-2 and the bobbin 110 (or the housing 140).

For example, a first damper (not shown) may be disposed in a space between the first frame connection portion 153 of each of the upper springs 150-1 and 150-2 and the bobbin 110.

Also, for example, the lens driving apparatus 100 may be further provided with a second damper (not shown) disposed between the second frame connection portion 163 of the lower elastic member 160 and the bobbin 110 (or the housing 140).

In addition, for example, the lens driving apparatus 100 may further comprise a third damper (not shown) disposed between the support member 220 and the hole 147a of the housing 140.

In addition, for example, the lens driving apparatus 100 may further comprise a first coupling portion 510 and a fourth damper (not shown) disposed at one end of the support member 220, and a fifth damper (not shown) disposed on the other end of the support member 220 and the circuit board 250 may be further comprised.

In addition, for example, a damper (not shown) may be further disposed between the inner side surface of the housing 140 and the outer circumferential surface of the bobbin 110.

Next, the support member 220 will be described.

The support member 220 may movably support the housing 140 in a direction perpendicular to the optical axis with respect to the base 210, and the support member 220 may electrically connect at least one of the upper or lower elastic members 150 and 160 to the circuit board 250.

The support member 220 may comprise a plurality of support members 220-1 to 220-4.

For example, it may comprise first to fourth support members 220-1 to 220-4 corresponding to the corner portions 142-1 to 142-4 of the housing 140.

Each of the first to fourth support members 220-1 to 220-4 may be disposed at any one of the first to fourth corner portions 142-1 to 142-4 of the housing 140.

At least two of the first to fourth support members 220-1 to 220-4 may connect the first and second upper springs 150-1 and 150-2 to the circuit board 250.

For example, the first support member 220-1 may electrically connect the first upper spring 150-1 and any one terminal of the circuit board 250, and the third support member 220-3 may electrically connect the second upper spring 150-2 and any other terminal of the circuit board 250. For example, one driving signal may be provided to the first coil unit 120-1 and the second coil unit 120-2 through the circuit board 250.

The first to fourth support members 220-1 to 220-4 may be spaced apart from the housing 140, and one end of each of the first to fourth support members 220-1 to 220-4 may be directly connected or coupled to any one of the first coupling portions 510 through soldering and the like instead of being fixed to the housing 140.

In addition, the other end of each of the first to fourth support members 220-1 to 220-4 may be directly connected or coupled to the circuit board 250 through soldering and the like. For example, the other end of each of the first to fourth support members 220-1 to 220-4 may be directly connected or coupled to the lower surface of the circuit board 250. In another embodiment, the other end of each of the support members 220-1 to 220-4 may be coupled to the circuit member 231 or the base 210 of the second coil 230.

For example, each of the first to fourth support members 220-1 to 220-4 may pass through the groove 147 provided in one of the corresponding ones among the corner portions 142-1 to 142-4 of the housing 140, but is not limited thereto. In another embodiment, the support members may be disposed adjacent to the boundary between the side portions 141-1 to 141-4 and the corner portions 142 of the housing 140, and may not pass through the corner portions 142-1 to 142-4 of the housing 140.

The support member 220 may be implemented by a member capable of supporting by elasticity, for example, a suspension wire, a plate spring, or a coil spring. In addition, in another embodiment, the support member 220 may be integrally formed with the upper elastic member 150.

Next, the base 210, the circuit board 250, and the second coil 230 will be described.

Referring to FIG. 27, the base 210 is disposed below the bobbin 110 (or the housing 140).

The base 210 may have an opening corresponding to the opening of the bobbin 110 or/and the opening of the housing 140, and may have a shape that matches or corresponds to the cover member 300, for example, a rectangular shape.

A support section 255 or a support portion may be provided in a region of the base 210 of the circuit board 250 facing the terminal 251. The support section 255 of the base 210 may support the terminal surface 253 of the circuit board 250 on which the terminal 251 is formed.

The base 210 may have a groove 212 in a corner region in order to avoid spatial interference with the other ends of the support members 220-1 to 220-4 coupled to the circuit board 250.

In addition, at least one protruded portion 25a may be provided on the upper surface around the opening of the base 210 for coupling with at least one coupling hole 14a of the circuit board 250 and at least one coupling hole 15a of the circuit member 231.

In addition, a seating portion (not shown) on which the filter 610 of the camera module 200 is installed may be formed on a lower surface of the base 210.

The circuit board 250 is disposed on an upper surface of the base 210 and may have an opening corresponding to an opening of the bobbin 110, an opening of the housing 140, or/and an opening of the base 210. The shape of the circuit board 250 may be a shape that matches or corresponds to the upper surface of the base 210, for example, a square shape.

The circuit board 250 may comprise a plurality of terminals 251 that are bent from an upper surface and receive electrical signals from the outside, or at least one terminal surface 253 on which pins are provided. For example, the circuit board 250 may comprise two terminal surfaces disposed on two sides facing each other among the sides of the upper surface, but is not limited thereto.

A driving signal may be provided to each of the first coil 120 and the second coil 230 through a plurality of terminals 251 provided on the terminal surface 253 of the circuit board 250.

The circuit board 250 may be provided as an FPCB, but is not limited thereto, and terminals of the circuit board 250 may be directly formed on the surface of the base 210 using a surface electrode method or the like.

The circuit board 250 may comprise a hole 250a through which the support members 220-1 to 220-4 pass in order to avoid spatial interference with the support members 220-1 to 220-4. In another embodiment, the circuit board 250 may have escape grooves in the corners instead of the holes 250a.

For example, the support members 220-1 to 220-4 may pass through the hole 250a of the circuit board 250 and be electrically connected to a circuit pattern disposed on the lower surface of the circuit board 250 through solder and the like, but is not limited thereto.

In another embodiment, the circuit board 250 may not have a hole, and the support members 220-1 to 220-4 may also be electrically connected a circuit pattern or pad being formed on the upper surface of the circuit board 250 through solder and the like.

Alternatively, in another embodiment, the support members 220-1 to 220-4 may be electrically connected to the circuit member 231, and the circuit member 231 may electrically connect the support members 220-1 to 220-4 and the substrate 250.

The second coil 230 may be disposed below the bobbin 110 (or the housing), and may be disposed on an upper surface of the circuit board 250.

The second coil 230 may comprise a third coil unit 230-1 corresponding to the first magnet 130-1 disposed in the housing 140, a fourth coil unit 230-2 corresponding to the second magnet 130-2, and a fifth coil unit 230-3 corresponding to the third magnet 130-3.

For example, the third coil unit 230-1 may be facing or overlapped with the first magnet 130-1 in the optical axis direction, the fourth coil unit 230-2 may be facing or overlapped with the second magnet 130-2 in the optical axis direction, and the fifth coil unit 230-3 may be facing or overlapped the third magnet 130-3 in the optical axis direction.

Each of the third to fifth coil units 230-1 to 230-5 may have a closed curve having a central hole, for example, a ring shape, and the central hole may be formed to face the optical axis direction.

For example, the third coil unit 230-1 and the fourth coil unit 230-2 may be disposed to face each other in a direction directed from the first magnet 130-1 toward the second magnet 130-2.

Also, for example, each of the third coil unit 230-1 and the fourth coil unit 230-2 may not be overlapped with the fifth coil unit 230-3 in a direction directed from the first magnet 130-1 toward the second magnet 130-2.

For example, the second coil 230 may further comprise a rectangular circuit member 231 in which the third to fifth coil units 230-1 to 230-3 are formed.

Here, the circuit member 231 may be represented by replacing it with a "substrate", and the substrate 231 may comprise a second coil 230. Also, for example, the first coil unit 120-1 may be represented by replacing it with the first coil, the second coil unit 120-2 may be expressed by replacing it with the second coil, and the second coil 230 may be expressed by replacing it with a third coil, and at this time, the substrate 231 may comprise a third coil.

For example, the circuit member 231 may comprise four sides, and each of the third to fifth coil units 230-1 to 230-3 may be disposed on any one of the three sides of the circuit member 231, and the coil unit may not be disposed on the remaining other side of the circuit member 231.

For example, each of the third coil unit 230-1 and the fourth coil unit 230-2 may be disposed parallel to any corresponding one of first and second sides facing each other of the circuit member 231, and the fifth coil unit 230-3 may be disposed parallel to the third or fourth side of the circuit member 231.

In order to avoid spatial interference with the support members 220-1 to 220-4, a hole 230a may be provided at the edge of the circuit member 231, and the support members 220-1 to 220-4 may pass through the hole 230a of the circuit member 231. In another embodiment, the circuit member may have a groove provided at the edge of the circuit member instead of the hole in order to avoid spatial interference with the support members.

The third to fifth coil units 230-1 to 230-3 may be electrically connected to the circuit board 250. For example, the third to fifth coil units 230-1 to 230-3 may be electrically connected to terminals of the circuit board 250.

The circuit board 250 may comprise bonding portions or pads 52a, 52b, 53a, and 53b to be electrically connected to the third to fifth coil units 230-1 to 230-3.

For example, the circuit board 250 may comprise two pads 52a and 52b electrically connected to the third and fourth coil units 230-1 and 230-2, and two pads 53a and 53b electrically connected to the fifth coil unit 230-3.

In FIG. 27, the third to fifth coil units 230-1 to 230-3 may be formed on the circuit board 250 and a separate circuit member 231, but are not limited thereto, and in other embodiments, the third to fifth coil units 230-1 to 230-3 may be implemented in the form of ring-shaped coil blocks, or may be implemented in the form of FP coils. In another embodiment, the third to fifth coil units may be implemented in the form of a circuit pattern formed on the circuit board 250.

The circuit board 250 and the circuit member 231 are expressed as separate components, but are not limited thereto, and in other embodiments, the circuit board 250 and the circuit member 231 may be bundled together and expressed as a term "circuit member". In this case, the other ends of the support members may be coupled to the "circuit member (e.g., the lower surface of the circuit member)".

The position sensor 240 may comprise a first sensor 240a and a second sensor 240b.

Each of the first sensor 240a and the second sensor 240b may be a Hall sensor, and any sensor capable of detecting the magnetic field strength may be used. For example, each of the first and second sensors 240a and 240b may be implemented in the form of a driver comprising a Hall sensor, or may be implemented alone as a position detection sensor such as a Hall sensor and the like.

In addition, seating grooves 215-1 and 215-2 for disposing the first and second sensors 240a and 240b may be provided on an upper surface of the base 210.

The first sensor 240a may be disposed to face or to be overlapped with one of the first magnet 130-1 and the second magnet 130-2 in the optical axis direction.

The second sensor 240b may be disposed to face or to be overlapped with the third magnet 130-3 in the optical axis direction.

The first sensor 240a and the second sensor 240b may be electrically connected to terminals of the circuit board 250. For example, a driving signal may be provided to each of the first sensor 240a and the second sensor 240b through terminals of the circuit board 250, and a first output of the first sensor 240a and a second output of the second sensor 240b may be outputted through the terminals of the circuit board 250.

A control unit 830 of the camera module 200 or a control unit 780 of the portable terminal 200A can sense or detect the displacement of the OIS movable unit using the first output of the first sensor 240a and the second output of the second sensor 240b.

For example, the first sensor 240a and the second sensor 240b may be disposed or mounted on a lower surface of the circuit board 250, and may be disposed within the seating grooves 215-1 and 215-2 of the base 210, but are not limited thereto.

The first sensor 240a and the second sensor 240b may sense the displacement of the OIS movable unit in a direction perpendicular to the optical axis OA. The OIS movable unit may comprise an AF movable unit and components mounted on the housing 140.

For example, the "OIS movable unit" may comprise an AF movable unit and a housing 140, and according to the second embodiment, the first to third magnets 130-1 to 130-3, the dummy member 135, and first to third yokes 193 to 195 may be further comprised.

By the interaction between the first to third magnets 130-1 to 130-3 and the third to fifth coil units 230-1 to 230-5, the OIS movable unit (e.g., the housing 140) may move in a direction perpendicular to the optical axis, for example, in the x-axis and/or y-axis direction, and as a result, handshake correction can be performed.

Next, the cover member 300 will be described.

The cover member 300 can accommodate an OIS movable unit, an upper elastic member 150, a lower elastic member 160, a second coil 230, a base 210, a circuit board 250, a support member 220, and a position sensor 240 inside the accommodation space formed with the base 210.

The cover member 300 has an open lower portion and may be in a box shape comprising an upper plate and lateral plates, and the lower portion of the cover member 300 may be coupled to an upper portion of the base 210. The shape of the upper plate of the cover member 300 may be a polygon, for example, a square or an octagon.

The cover member 300 may have an opening in the upper plate that exposes a lens (not shown) coupled to the bobbin 110 to external light. The material of the cover member 300 may be a non-magnetic material such as SUS to inhibit sticking with the magnet 130. The cover member 300 may be formed of a metal plate, but is not limited thereto, and may be formed of plastic. In addition, the cover member 300 may be connected to the ground of the second holder 800 of the camera module 200. The cover member 300 may block electromagnetic interference (EMI).

Figure 28:
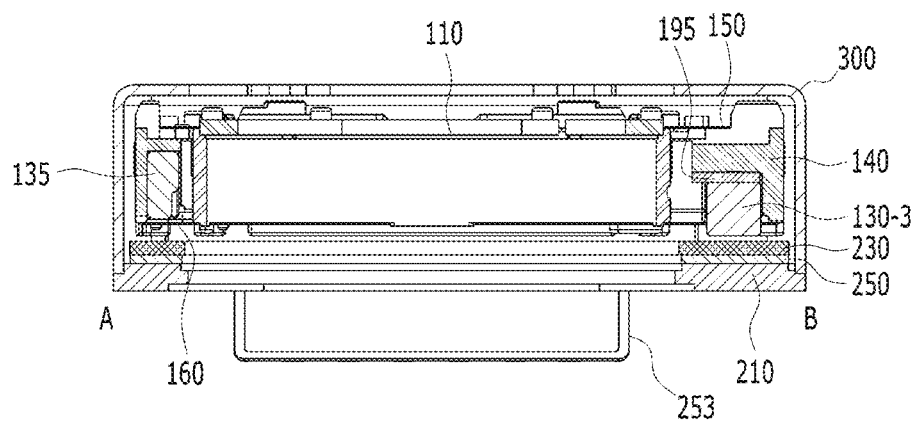
FIG. 28 is a cross-sectional view of a lens driving apparatus in the AB direction of FIG. 21.
Figure 30A:
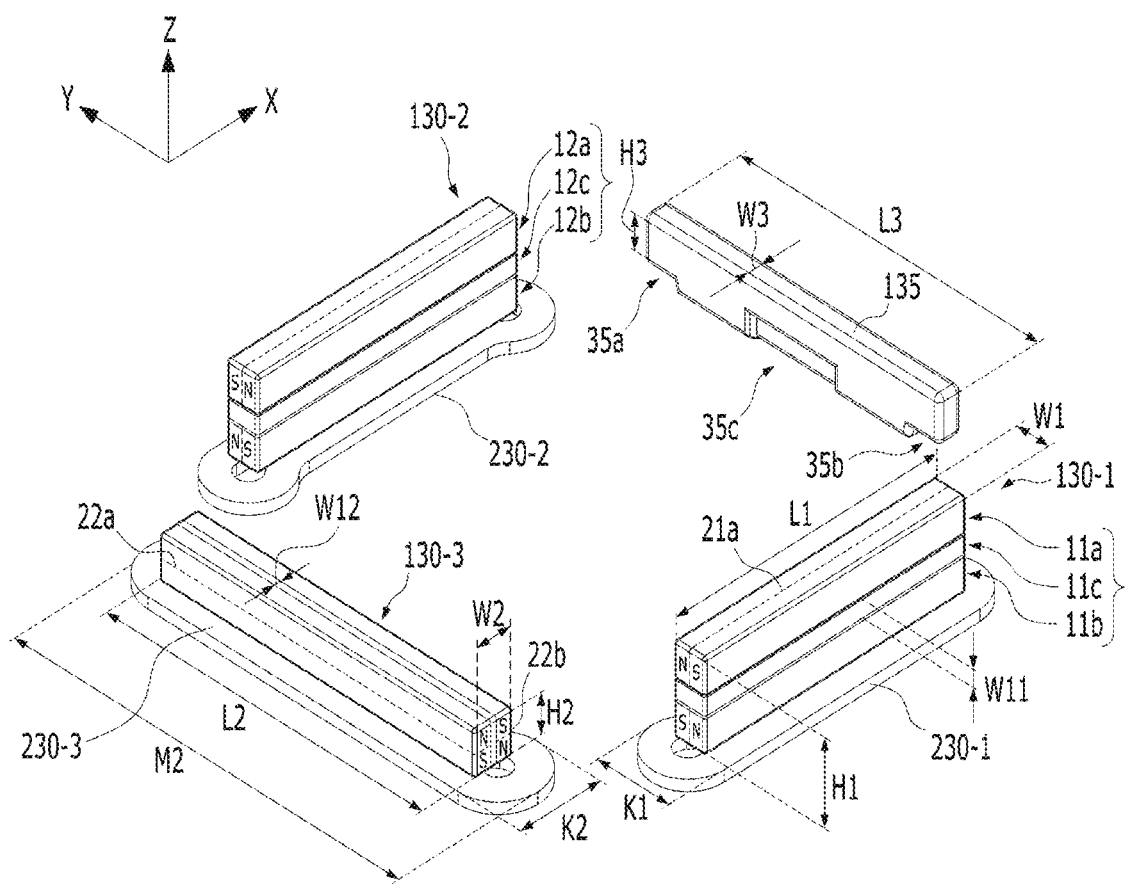
FIG. 30a illustrates a second embodiment of first to third magnets, dummy members, and third to fifth coil units.
Figure 31:
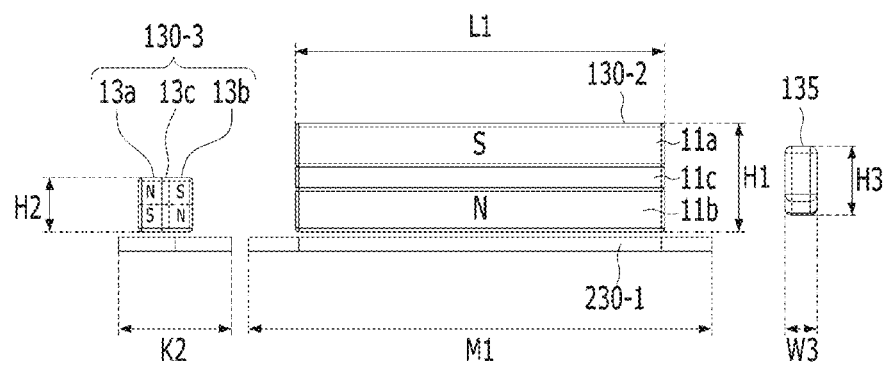
Figure 32:
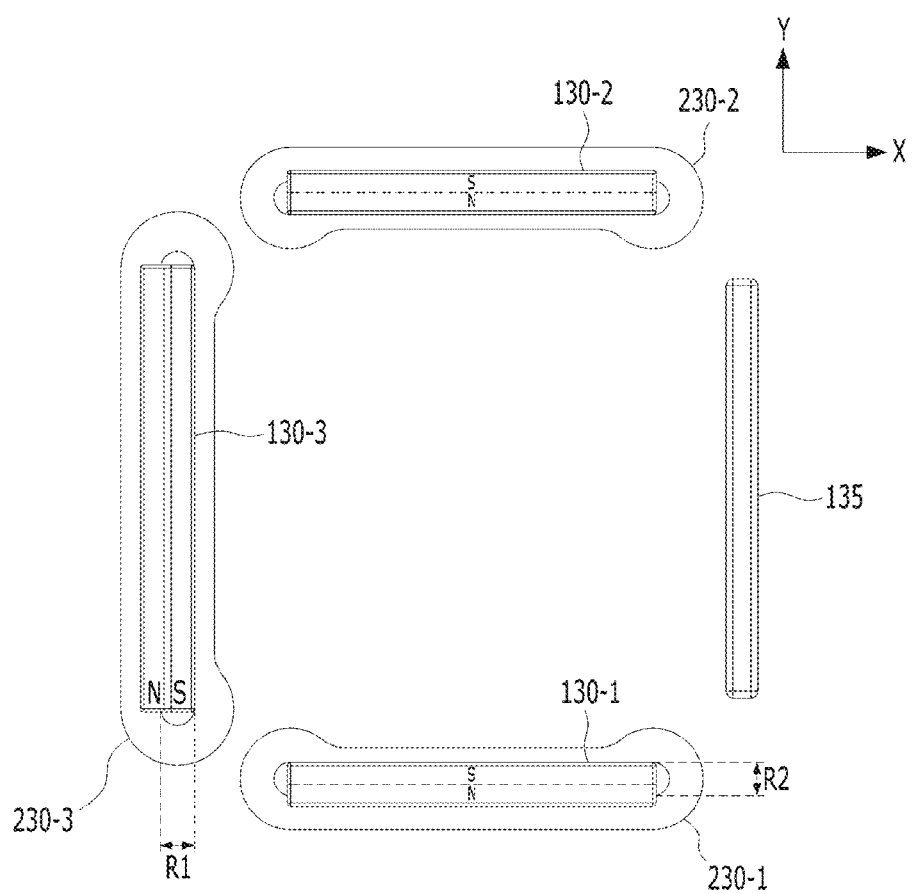

FIG. 28 is a cross-sectional view of a lens driving apparatus 100 in the AB direction of FIG. 21, FIG. 29 is a cross-sectional view of a lens driving apparatus 100 in the CD direction of FIG. 21, FIG. 30a illustrates a second embodiment of first to third magnets 130-1 to 130-3, dummy members 135, and third to fifth coil units 230-1 to 230-5, FIG. 31 is a side view of the configurations 130-1, 130-3, 230-1, 230-5, and 135 illustrated in FIG. 30a, and FIG. 32 is a plan view of the configurations 130-1, 130-3, 230-1, 230-5, and 135 illustrated in FIG. 30a.

Referring to FIGS. 28 to 32, the first magnet 130-1 may comprise a first magnet portion 11a, a second magnet portion 11b, and a first nonmagnetic partition wall 11c disposed between the first magnet portion 11a and the second magnet portion 11b. Here, the first nonmagnetic partition wall 11c may be represented by replaced it with a "first partition wall".

For example, the first magnet portion 11a and the second magnet portion 11b may be spaced apart from each other in the optical axis direction, and the first partition wall 11c may be positioned between the first magnet portion 11a and the second magnet portion 11b.

The first magnet portion 11a may comprise an N pole, an S pole, and a first interface 21a between the N pole and the S pole. The first interface 21a may comprise a section that has almost no polarity as a portion that does not substantially have magnetism, and may be a portion naturally generated to form a magnet composed of one N-pole and one S-pole.

The second magnet portion 11b may comprise an N pole, an S pole, and a second interface 21b between the N pole and the S pole. The second interface 21b may comprise a section that has almost no polarity as a portion that does not substantially have magnetism, and may be a portion naturally generated to form a magnet composed of one N-pole and one S-pole.

The first non-magnetic partition wall 11c separates or isolates the first magnet portion 11a and the second magnet portion 11b, and may be a portion that does not substantially have magnetism and has almost no polarity. For example, the first nonmagnetic partition wall 11c may be a nonmagnetic material or air. The non-magnetic partition wall may be expressed as a "Neutral Zone" or a "Neutral region".

The first nonmagnetic partition wall $11_c$ is a portion artificially formed when magnetizing the first magnet portion 11a and the second magnet portion 11b, and the width W11 of the first nonmagnetic partition wall 11c may be greater than the widths of each of the first and second interfaces 21a and 21b.

Here, the width W11 of the first nonmagnetic barrier 11c may be a length of the nonmagnetic barrier 11c in a direction directed from the first magnet portion 11a toward the second magnet portion 11b. Alternatively, the width W11 of the first nonmagnetic barrier 11c may be the length of the first nonmagnetic barrier 11c in the optical axis direction.

The first magnet portion 11a and the second magnet portion 11b may be disposed so that the opposite polarities are facing each other in the optical axis direction.

For example, the N pole of the first magnet portion 11a and the S pole of the second magnet portion 11b may be disposed to face the first coil unit 120-1, but are not limited thereto, and it can be disposed in reverse.

The second magnet 130-2 may comprise a third magnet portion 12a, a fourth magnet portion 12b, and the second nonmagnetic partition wall 12c disposed between the third magnet portion 12a and the fourth magnet portion 12b. Here, the second nonmagnetic partition wall 12c may be represented by replacing it with a "second partition wall".

For example, the third magnet portion 12a and the fourth magnet portion 12b may be spaced apart from each other in the optical axis direction, and the second partition wall 12c may be positioned between the third magnet portion 12a and the fourth magnet portion 12b.

Each of the third magnet portion 12a and the fourth magnet portion 12b may comprise an N-pole, an S-pole, and an interface between the N-pole and the S-pole.

Descriptions of the interfaces 21a and 21b of the first and second magnet portions 11a and 11b may be applied to the interfaces of the third magnet portion 12a and the fourth magnet portion 12b.

The description of the first nonmagnetic partition wall 11c described above may be applied to the second partition wall 12c.

Each of the first nonmagnetic partition wall 11c and the second nonmagnetic partition wall 12c may be extended in a horizontal direction or a direction perpendicular to the optical axis.

The first magnet portion 11a, the first nonmagnetic partition wall 11c, and the second magnet portion 11b may be sequentially disposed in the optical axis direction. The third magnet portion 12a, the second non-magnetic partition wall 12c, and the fourth magnet portion 12b may be sequentially disposed in the optical axis direction.

For example, the first magnet portion 11a may be disposed on the first nonmagnetic partition wall 11c, and the second magnet portion 11b may be disposed below the first nonmagnetic partition wall 11c. In addition, the third magnet portion 12a may be disposed on the second nonmagnetic partition wall 12c, and the fourth magnet portion 12b may be disposed below the second nonmagnetic partition wall 12c.

For example, each of the first nonmagnetic partition wall 11c and the second nonmagnetic partition wall 12c may be parallel to a straight line perpendicular to the optical axis, and the interfaces 21a and 21b of each of the first and second magnet portions 11a and 11b may be parallel to the optical axis.

For example, each of the first magnet 130-1 and the second magnet 130-2 may have a 2-pole magnetized N-pole and an S-pole disposed in the optical axis direction.

The third magnet 130-3 may comprise a fifth magnet portion 13a, a sixth magnet portion 13b, and a third nonmagnetic partition wall 13c disposed between the fifth magnet portion 13a and the sixth magnet portion 13b. Here, the third non-magnetic partition wall may be replaced with "third partition wall".

The fifth magnet portion 13a and the sixth magnet portion 13b may be spaced apart in a direction perpendicular to the optical axis direction, and the third partition wall 13c may be located between a fifth magnet portion 13a and a sixth magnet portion 13b.

The fifth magnet portion 13a may comprise an N pole, an S pole, and a first interface 22a between the N pole and the S pole. The first interface 22a may comprise a section that has almost no polarity as a portion that does not substantially have magnetism, and may be a portion that is naturally generated to form a magnet composed of one N-pole and one S-pole.

The sixth magnet portion 13b may comprise an N pole, an S pole, and a second interface 22b between the N pole and the S pole. The second interface 22b may comprise a section that has almost no polarity as a portion that does not substantially have magnetism, and may be a portion that is naturally generated to form a magnet composed of one N-pole and one S-pole.

The third nonmagnetic partition wall 13c separates or isolates the fifth magnet portion 13a and the sixth magnet portion 13b, and may be a portion that does not substantially have magnetism and has almost no polarity. For example, the third nonmagnetic partition wall 13c may be made of a nonmagnetic material or air.

The third nonmagnetic partition wall 13c is a portion artificially formed when the fifth magnet portion 13a and the sixth magnet portion 13b are magnetized, and the width W12 of the third nonmagnetic partition wall 13c may be larger than the width of each of the first and second boundary surfaces 22a and 22a.

Here, the width W12 of the third nonmagnetic partition wall 13c may be the length of the third nonmagnetic partition wall 13c in a direction directed from the fifth magnet portion 13a toward the sixth magnet portion 13b.

The fifth magnet portion 13a and the sixth magnet portion 13b may be disposed so that opposite polarities are facing each other in a direction perpendicular to the optical axis OA and directed from the optical axis OA toward the third magnet 130-3.

For example, the N pole and S pole of the sixth magnet portion 13b may be disposed to face the outer side surface of the bobbin 110 corresponding to the third side surface 141-3 of the housing 140, but is not limited thereto, and it can be disposed in reverse.

The third nonmagnetic partition wall 13c may be extended in the optical axis direction or in a vertical direction.

The fifth magnet portion 13a, the third non-magnetic partition wall 13c, and the sixth magnet portion 13b can be disposed sequentially in a direction perpendicular to the optical axis OA and directed from the third magnet 130-3 toward the optical axis OA.

For example, the fifth magnet portion 13a may be disposed on a left side (or right side) of the third nonmagnetic partition wall 13c, and the sixth magnet portion 13b may be disposed on a right side (or left side) of the third nonmagnetic partition wall 13c.

For example, the third nonmagnetic partition wall 13c may be parallel to the optical axis, and the interface surfaces 22a and 22b of each of the fifth and sixth magnet portions 13a and 13b may be parallel to a direction perpendicular to the optical axis.

The first magnet 130 may be located inside the region of the third coil unit 230-1 and may be overlapped with the third coil unit 230-1 in the optical axis direction.

The second magnet 130 may be positioned inside the region of the fourth coil unit 230-2 and may be overlapped with the fourth coil unit 230-2 in the optical axis direction.

The third magnet 130 may be located at an inner side of the region of the fifth coil unit 230-3 and may be overlapped with the fifth coil unit 230-3 in the optical axis direction.

The separation or isolation direction of the third nonmagnetic partition wall 13c may be perpendicular to the separation or isolation direction of each of the first and second nonmagnetic partition walls 11c and 12c.

For example, while each of the first and second nonmagnetic partition walls 11c and 12c isolates or separates the two magnet portions 11a and 11b, and 12a and 12b from each other in the optical axis direction, the third non-magnetic partition walls 13c may isolate or separate two magnet parts 13a and 13b in a direction perpendicular to the optical axis and directed from the optical axis OA toward the third magnet 130-3.

Any one portion of the third coil unit 230-1 may be simultaneously overlapped with a first polar portion of the first magnet portion 11a, the first nonmagnetic partition wall 11c, and a second polar portion of the second magnet portion 11b in the direction of the optical axis. Here, the first polar portion may be an N-pole or S-pole, and the second polar portion may be an opposite polar portion of the first polar portion.

Any one portion of the fourth coil unit 230-2 may be simultaneously overlapped with a first polar portion of the third magnet portion 12a, a second nonmagnetic partition wall 12c, and a second portion of the fourth magnet portion 12b in the optical axis direction.

Any one portion of the fifth coil unit 230-3 may be overlapped together with the N pole and S pole of the fifth magnet portion 13a in the optical axis direction. Alternatively, any other portion of the fifth coil unit 230-3 may be overlapped with the N pole and S pole of the sixth magnet portion 13b in the optical axis direction.

The first magnet 130-1 and the second magnet 130-2 may have the same length, width, and height, but are not limited thereto.

In addition, the length, width, and height of the third coil unit 230-1 and the fourth coil unit 230-2 may be the same, but are not limited thereto.

The lengths L1, L2, and L3, widths W1, W2, and W3, and the heights H1, H2, and H3 of the first magnet 130-1, the third magnet 130-3, and the dummy member 135 will be described with reference to FIGS. 30a and 31. In addition, lengths M1 and M2, widths K1 and K2, and heights (length in the optical axis direction) of the third to fifth coil units 230-1 to 230-3 will also be described together.

Here, the lengths L1 and L2 of each of the first to third magnets 130-1 to 130-3 may be lengths in the lengthwise direction of each of them, and the length L3 of the dummy member 135 may be a length in the lengthwise direction of the dummy member 135.

In addition, the widths W1 and W2 of each of the first to third magnets 130-1 to 130-3 may be the lengths in the widthwise direction of each of them, and the width W3 of the dummy member 135 may be a length of the dummy member 135 in the widthwise direction. Here, the widthwise direction may be perpendicular to the lengthwise direction, and the length may be a shorter direction in each of the components 130-1 to 130-3, and 135. In addition, the width of each of the components 130-1 to 130-3, and 135 may be represented by replacing it with the "thickness" of each of the components 130-1 to 130-3 and 135.

For example, the lengths L1 and L2 of the first to third magnets 130-1 to 130-3 may be a length of the first surface of each of the first to third magnets 130-1 to 130-3 facing the bobbin 110 in the horizontal direction. In addition, the length L3 of the dummy member 135 may be the length of the first surface of the dummy member 135 facing the bobbin 110 in the horizontal direction.

Also, for example, the widths L1, L2, and L3 of the first to third magnets 130-1 to 130-3, and the dummy member 135 may be a distance from the first surface of each component 130-1 to 130-3, and 135 facing the bobbin 110 to a second surface which is an opposite surface of the first surface.

In addition, for example, the heights H1, H2, and H3 of each of the first to third magnets 130-1 to 130-3 and the dummy member 135 may be lengths in the optical axis direction of each component. Alternatively, for example, the heights H1, H2, and H3 may be the length of the first surface of each component 130-1 to 130-3 and 135 facing the bobbin 110 in the vertical direction. Alternatively, for example, the heights H1, H2, and H3 may be the distance from the lower surface to the upper surface of each component.

The lengths M1 and M2 of each of the third to fourth coil units 230-1 to 230-3 may be a length in a length direction of any corresponding one among the first to third magnets 130-1 or in a direction parallel thereto.

In addition, the widths K1 and K2 of each of the third to fourth coil units 230-1 to 230-3 may be a length in any corresponding one of the width directions or in a direction parallel thereto among the first to third magnets 130-1. The height of each of the third to fourth coil units 230-1 to 230-3 may be a length in the optical axis direction, and the heights of the third to fourth coil units 230-1 to 230-3 may be the same, but are not limited thereto, and in another embodiment, at least one of the heights among the third to fourth coil units 230-1 to 230 may be different from the others.

The length L1 of the first magnet 130-1 in the lengthwise direction may be smaller than the length M1 of the third coil unit 230-1 in the lengthwise direction (L1<M1).

The length W1 of the first magnet 130-1 in the widthwise direction may be smaller than the length K1 of the third coil unit 230-1 in the widthwise direction (W1<K1).

In addition, the length of the second magnet 130-2 in the lengthwise direction may be smaller than the length of the fourth coil unit 230-2 in the lengthwise direction. The length of the second magnet 130-2 in the widthwise direction may be smaller than the length of the fourth coil unit 230-2 in the widthwise direction.

The length L2 in the lengthwise direction of the third magnet 130-3 may be smaller than the length M2 in the lengthwise direction of the fifth coil unit 230-3 (L2<M2). The length W2 in the widthwise direction of the third magnet 130-3 may be smaller than the length K2 in the widthwise direction of the fifth coil unit 230-3 (W2<K2). In another embodiment, W2 and K2 may be the same.

The length M2 in the lengthwise direction of the fifth coil unit 230-3 is the length M1 in the lengthwise direction of the third coil unit 230-1 or/and the lengthwise direction of the fourth coil unit 230-2 may be longer than the length of (M2>M1).

The length L2 of the lengthwise direction of the third magnet 130-3 may be larger than the length L1 of the lengthwise direction of the first magnet 130-1 or/and the length of the lengthwise direction of the second magnet 130-2 (L2>L1).

Since M2>M1 and L2>L1, the first electromagnetic force generated by the fifth coil unit 230-3 and the third magnet 130-3 may be greater than each of a second electromagnetic force generated by the third coil unit 230-1 and the first magnet 130-1, and a third electromagnetic force generated by the fourth coil unit 230-2 and the second magnet 130-2. Due to this, the second embodiment can reduce the difference between the sum of the first electromagnetic force in the X-axis direction and the second and third electromagnetic forces in the Y-axis direction, and inhibit the tilt of the OIS movable unit due to the difference between the electromagnetic force in the X-axis direction and the electromagnetic force in the Y-axis direction, thereby improving the reliability of OIS operation.

In another embodiment, M2 may be M1, and L2 may be L1.

For example, L1:L2 may be 1:1 to 1:1.5. Alternatively, for example, L1:L2 may be 1:1.2 to 1:1.4.

In addition, although the length K2 of the widthwise direction of the fifth coil unit 230-3 may be greater than the length K1 of the third coil unit 230-1 in the widthwise direction or/and the length of the fourth coil unit 230-2 in the widthwise direction (K2>K1), it is not limited thereto, and in other embodiments, both may be identical to each other.

Although the length W2 of the widthwise direction of the third magnet 130-3 may be greater than the length W1 of the first magnet 130-1 in the widthwise direction, or/and the length of the second magnet 130-2 the widthwise direction (W2>W1), it is not limited thereto, and in other embodiments, both may be identical to each other.

For example, W1 may be a length in a direction perpendicular to the optical axis and one surface of the first magnet 130-1 (or the second magnet 130-2), and W2 may be a length in a direction perpendicular to the optical axis and one surface of the third magnet 130-3.

Since W2>W1, the second embodiment can reduce the difference between the electromagnetic force in the X-axis direction and the electromagnetic force in the Y-axis direction, and it is possible to inhibit the tilt of the OIS movable unit due to the difference between the electromagnetic force in the X-axis direction and the electromagnetic force in the Y-axis direction, thereby improving the reliability of OIS operation.

The height H2 of the third magnet 130-3 may be smaller than the height H1 of the first magnet 130-1, or/and the height of the second magnet 130-2 (H2<H1). Here, H1 and H2 may be lengths of the magnets 130-1 to 130-3 in the optical axis direction. Alternatively, H1 may be the distance from the lower surface of the first magnet 130-1 (or the second magnet 130-2) to the upper surface, and H2 may be the distance from the lower surface to the upper surface of the third magnet 130-3.

That is, the length of the third magnet 130-3 in the direction of the optical axis may be shorter than the length of the first magnet 130-1 in the optical axis direction and/or the length of the second magnet 130-2 in the optical axis direction.

For example, the length of the first magnet 130-1 in the optical axis direction and the length of the second magnet 130-2 in the optical axis direction may be the same.

Figure 35:
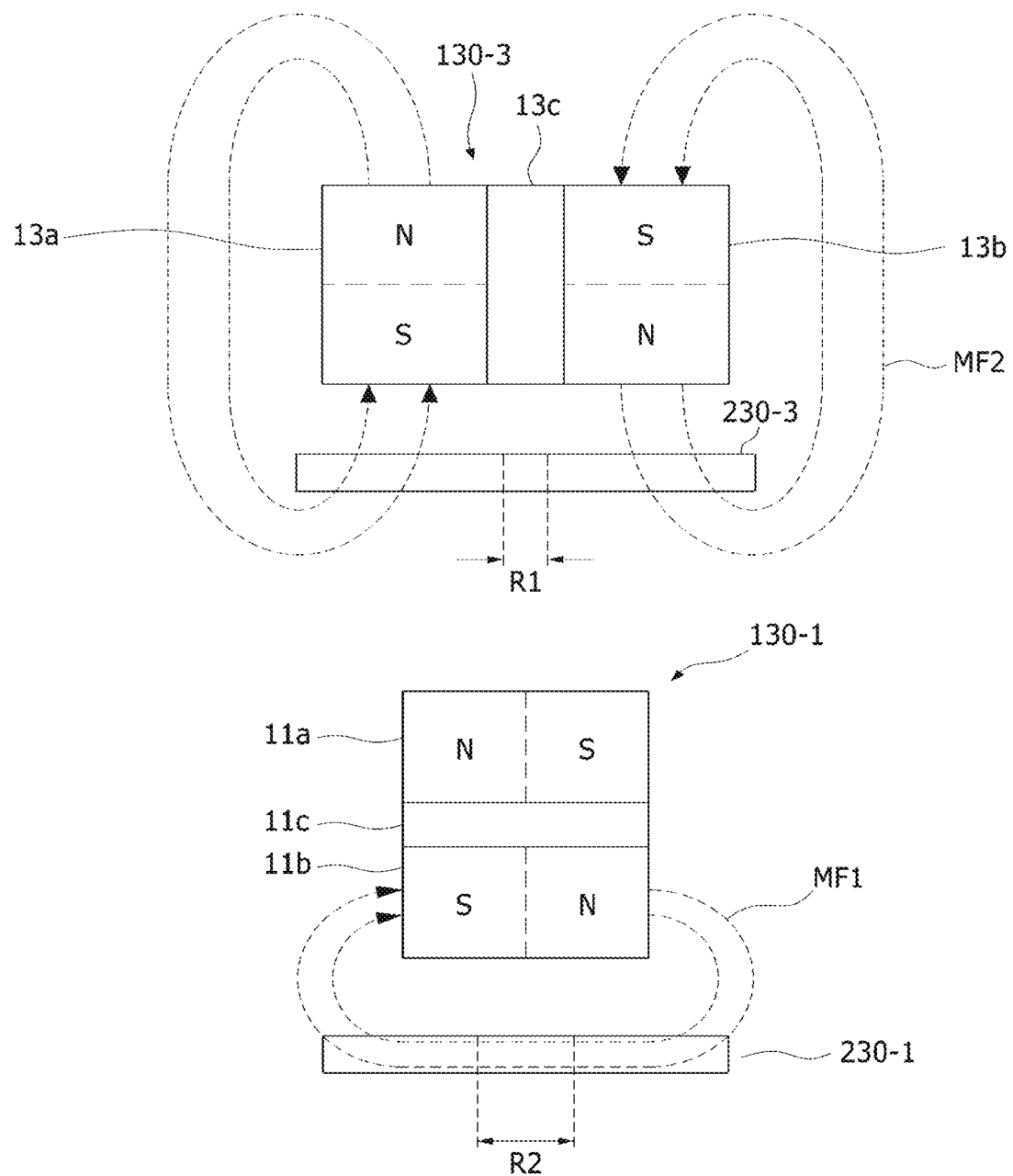
FIG. 35 shows magnetic field lines of a third magnet with respect to a fifth coil unit and magnetic field lines of a first magnet with respect to a third coil unit.

As illustrated in FIG. 35, according to the direction of the magnetic field lines of the third magnet 130-3, even if the height H2 of the third magnet 130-3 decreases (e.g., H2<H1), the magnetic flux provided from the third magnet 130-3 toward the fifth coil unit 230-3 is not greatly reduced, and accordingly, the amount of reduction of the electromagnetic force generated by the third magnet 130-3 and the fifth coil unit 230-3 is small enough not to significantly affect the OIS operation.

Since H2<H1, the second embodiment can reduce the weight of the lens driving apparatus, thereby reducing power consumption for AF driving and/or OIS driving.

In another embodiment, H2 may be H1.

For example, the upper surface of the third magnet 130-3 may have a height equal to or higher than the boundary line between the second magnet portion 11b of the first magnet 130-1 and the first nonmagnetic partition wall 11c, and may have a height lower than or equal to the upper surface of the first magnet portion 11a.

Also, for example, H2:H1 may be 0.3:1 to 1:1.

When H2/H11 is less than 0.3, the first electromagnetic force generated by the fifth coil unit 230-3 and the third magnet 130-3 is too reduced, and as a result, the difference between the electromagnetic force in the X-axis direction and the electromagnetic force in the Y-axis direction may increase, and thus the reliability of OIS driving may be deteriorated.

When H2/H1 is greater than 1, the first electromagnetic force in the X-axis direction increases, and as a result, the difference between the electromagnetic force in the X-axis direction and the electromagnetic force in the Y-axis direction increases, and thus the reliability of OIS driving may be deteriorated.

Alternatively, for example, H2:H1 may be 0.5:1 to 0.8:1.

Referring to FIG. 35, each of the third to fifth coil units 230-1 to 230-3 may have a ring shape having a hole open toward the optical axis direction.

The length R1 of the hole of the fifth coil unit 230-3 in a direction perpendicular toward the lengthwise direction of the fifth coil unit 230-3 may be smaller than the length R2 of the hole of the third coil unit 230-1 in a direction perpendicular to the lengthwise direction of the third coil unit 230-1 (R1<R2). In addition, R1 may be smaller than the length of the hole of the fourth coil unit 230-2 in a direction perpendicular to the lengthwise direction of the fourth coil unit 230-2.

This is because the first magnet 130-1 and the third magnet 130-3 have different magnetization directions from each other, and thus distributions of magnetic field lines between them are also different. In consideration of such distribution of magnetic field lines, by making R2>R1, all of the electromagnetic force between the first magnet 130-1 and the third coil unit 230-1, the electromagnetic force between the second magnet 130-2 and the fourth coil unit 230-2, and the electromagnetic force between the third magnet 130-3 and the fifth coil unit 230-3 can be enhanced.

In another embodiment, R1 and R2 may be identical to each other.

The length L3 in the lengthwise direction of the dummy member 135 may be smaller than the length L2 in the lengthwise direction of the third magnet 130-3 (L3<L2), and the length (W3) in the widthwise direction of the dummy member 135 may be smaller than the length (W2) of the widthwise direction of the third magnet 130-3 (W3<W2). In another embodiment, W3 may be W2.

In addition, the first separation distance in the optical axis direction between the first magnet 130-1 and the third coil unit 230-1, a second separation distance in the optical axis direction between the second magnet 130-2 and the fourth coil unit 230-2, and the third separation distance in the optical axis direction between the third magnet 130-3 and the fifth coil unit 230-3 may be the same, but is not limited thereto.

In another embodiment, the third separation distance may be smaller than the first separation distance or/and the second separation distance. And since the third separation distance is smaller than the first separation distance or/and the second separation distance, when compared with the case where the first to third separation distances are all the same, in another embodiment, the difference between the electromagnetic force generated in the X-axis direction and the electromagnetic force generated in the Y-axis direction may be further reduced.

The height H3 of the dummy member 135 may be greater than or equal to the height H2 of the third magnet 130-3, but is not limited thereto. In another embodiment, the height H3 of the dummy member 135 may be smaller than the height H2 of the third magnet 130-3.

Referring to FIG. 28, for example, the height of the upper surface of the dummy member 135 may be higher than or equal to the height of the upper surface of the third magnet 130-3, but is not limited thereto. In another embodiment, the height of the upper surface of the dummy member 135 may be lower than the upper surface of the third magnet 130-3.

The height of the lower surface of the dummy member 135 may be higher than the height of the lower surface of the third magnet 130-3, but is not limited thereto. In another embodiment, the height of the lower surface of the dummy member 135 may be lower than or equal to the height of the lower surface of the third magnet 130-3.

In addition, for example, the height of the upper surface of the dummy member 135 may be lower than the height of the upper surface of the second magnet 130-2 (or the first magnet 130-1), and the height of the lower surface of the second magnet 130-2 (or the first magnet 130-1) may be higher, but is not limited thereto. In another embodiment, the height of the upper surface of the dummy member 135 may be higher than or equal to the height of the upper surface of the second magnet 130-2 (or the first magnet 130-1).

In addition, the height of the lower surface of the dummy member 135 may be lower than the height of the lower surface of the second magnet 130-2 (or the first magnet 130-1), but is not limited thereto. In another embodiment, the height of the lower surface of the dummy member 135 may be higher or equal to the height of the lower surface of the second magnet 130-2 (or the first magnet 130-1).

The second embodiment comprises three magnets 130-1 to 130-3 and three OIS coil units 230-1 to 230-3 corresponding thereto in order to reduce magnetic field interference between magnets comprised in adjacent lens driving apparatuses in a dual or higher camera module.

Two magnets 130-1 and 130-2 among the three magnets 130-1 to 130-3 perform AF operation by interaction with the first and second coil units 120-1 and 120-2, and at the same time, may perform the OIS operation in the Y-axis direction by interacting with the third and fourth coil units 230-1 and 230-4.

The other magnet 130-3 among the three magnets 130-1 to 130-3 may only perform an OIS operation in the X-axis direction by interacting with the fifth coil unit 230-3.

Since all of each of the first to third magnets 130-1 to 130-3 are composed of 4-pole magnets, the second embodiment can enhance the electromagnetic force with any of the corresponding ones among the third to fifth coil units 230-1 to 230-3, and as a result, the amount of current consumption can be reduced.

Since the dummy member 135 is disposed on the opposite side of the third magnet 130-3, the second embodiment can inhibit oscillation due to weight eccentricity during OSI operation.

Each of the first and second magnets 130-1 and 130-2 may have magnetization direction in which two magnet portions 11a and 11b, 12a and 12b are disposed in the vertical direction with respect to the non-magnetic partition wall 11c and 12c. And the first and second portions 3a and 3b of each of the first and second coil units 120-1 and 120-2 may be disposed to face the two magnet portions 11a and 11b, 12a and 12b each other. Due to this arrangement, the electromagnetic force between the first magnet 130-1 and the first coil unit 120-1 and the electromagnetic force between the second magnet 130-2 and the second coil unit 120-2 can be improved, and the current consumption can be reduced.

In general, the electromagnetic force in the X-axis direction due to the interaction between one magnet and one coil unit is smaller than the electromagnetic force in the Y-axis direction due to the interaction between the two magnets and the two coil units. And the difference between the electromagnetic force in the X-axis direction and the electromagnetic force in the Y-axis direction may cause a malfunction of OIS driving.

In order to reduce the difference between the electromagnetic force generated in the X-axis direction and the electromagnetic force generated in the Y-axis direction, the second embodiment may be configured as follows.

The magnetization direction of the two magnet portions 13a and 13b of the third magnet 130-3 is set to be perpendicular to the magnetization directions of the two magnet portions 11a and 11b, 12a and 12b of the first and second magnets 130-1 and 130-2.

For example, a third nonmagnetic partition wall 13c separating the two magnet portions 13a and 13b of the third magnet 130-3 may be disposed on the fifth coil unit 230-3 so that it is perpendicular to the fifth coil unit 230-3.

For example, the third magnet 130-3 may be disposed so that the third nonmagnetic partition wall 13c is parallel to the optical axis direction.

Alternatively, for example, a third magnet 130-3 may be disposed in a way that any one N pole and the other S pole among the two magnet portions 13a and 13b of the third magnet 130-3 faces the fifth coil unit 230-3 in the optical axis direction.

On the other hand, the first magnet 130-1 may be disposed on the third coil unit 230-1 so that the first non-magnetic partition wall 11c is horizontal with the third coil unit 230-1, and the second nonmagnetic partition wall 12c may be disposed on the fourth coil unit 230-2 so that the second magnet 130-2 is horizontal with the fourth coil unit 230-2.

In addition, for example, the first and second magnets 130-3 may be disposed so that each of the first nonmagnetic partition wall 11c and the second nonmagnetic partition wall 12c is parallel to the optical axis direction.

Alternatively, for example, the N pole and S pole of any one of the two magnet portions 11a and 11b of the first magnet 130-1 are all can face the third coil unit 230-1 in the optical axis direction, and the N pole and S pole of any one of the two magnet portions 12a and 12b of the second magnet 130-2 are all can face the fourth coil unit 230-2 in the optical axis direction.

In addition, the number of windings of the coil in the fifth coil unit 230-3 (hereinafter "the number of first windings") may be larger than the number of windings of the coil in the third coil unit 230-1 (hereinafter "the number of second winding") or/and the number of winding the coil in the fourth coil unit 230-2 (hereinafter "the number of third winding"), thereby reducing the difference between the electromagnetic force generated in the X-axis direction and the electromagnetic force generated in the Y-axis direction.

Also, for example, the number of second winding and the number of third winding may be the same, but are not limited thereto. In another embodiment, the number of first winding and the number of second winding (or the third winding number) may be the same.

In addition, the length L2 of the lengthwise direction of the third magnet 130-3 is greater than the length L1 of the lengthwise direction of the first magnet 130-1 or/and the length of the lengthwise direction of the second magnet 130-2, The length M2 of the lengthwise direction of the fifth coil unit 230-3 is larger than the length of the length M1 of the lengthwise direction of the third coil unit 230-1 or/and the lengthwise direction of the fourth coil unit 230-2, thereby reducing the difference between the electromagnetic force generated in the X-axis direction and the electromagnetic force generated in the Y-axis direction.

FIG. 35 shows magnetic field lines of the third magnet 130-3 with respect to the fifth coil unit 230-3, and magnetic field lines of the first magnet 130-1 with respect to the third coil unit 230-1.

Since the arrangement of the second magnet 130-2 is the same or similar to the arrangement of the first magnet 130-1, the magnetic field lines of the second magnet 130-2 for the fourth coil unit 230-2 may be the same as or similar to the magnetic field lines of the first magnet 130-1 for the third coil unit 230-1.

Referring to FIG. 35, a first electromagnetic force generated by magnetic field lines MF2 of the fifth coil unit 230-3 and the third magnet 130-3 may be greater than the second electromagnetic force generated by the magnetic field lines MF1 of the third coil unit 230-1 and the first magnet 130-1.

In addition, the first electromagnetic force generated by the magnetic field lines MF2 of the fifth coil unit 230-3 and the third magnet 130-3 may be greater than the third electromagnetic force generated by the magnetic field lines MF1 of the fourth coil unit 230-2 and the second magnet 130-2.

Since the first electromagnetic force is greater than each of the second electromagnetic force and the third electromagnetic force, the sum of the second electromagnetic force and the third electromagnetic force can be designed to be approximately similar to the first electromagnetic force, and accordingly, the second embodiment can reduce the difference between the electromagnetic force in the X-axis direction and the electromagnetic force in the Y-axis direction during OIS driving, and it is possible to inhibit the tilt of the OIS movable unit due to the difference between the electromagnetic force in the X-axis direction and the electromagnetic force in the Y-axis direction, thereby improving the reliability of OIS driving.

Figure 30B:
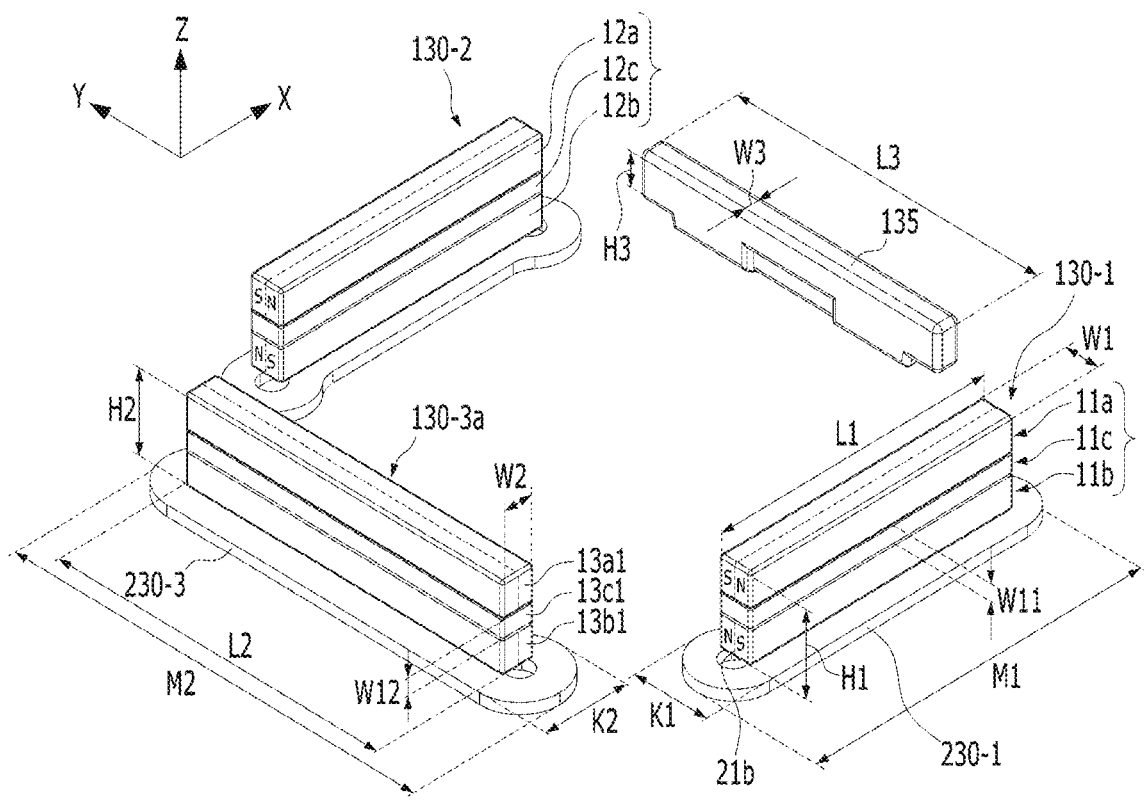
FIG. 30b shows a third magnet according to another embodiment

FIG. 30b shows a third magnet 130-3a according to another embodiment. In FIG. 30b, the same reference numerals as in FIG. 30a denote the same configuration, and the description of the same configuration is simplified or omitted.

Referring to FIG. 30b, the third magnet 130-3a may be a 2-pole magnetized magnet or a 4-pole magnet having the same shape as the first magnet 130-1 and the second magnet 130-2.

The third magnet 130-3a may comprise a fifth magnet portion 13a1, a sixth magnet portion 13b1, and a third partition wall 13c1 disposed between the fifth magnet portion 13a1 and the sixth magnet portion 13b1. The fifth magnet portion 13a1 and the sixth magnet portion 13b1 may be spaced apart from each other in the optical axis direction. For example, the third partition wall 13c1 may be extended in a horizontal direction or a direction perpendicular to the optical axis.

The fifth magnet portion 13a1, the third partition wall 13c1, and the sixth magnet portion 13b1 may be sequentially disposed in the optical axis direction. For example, the fifth magnet portion 13a1 may be disposed on the third partition wall 13c1, and the sixth magnet part 13b1 may be disposed below the third partition wall 13c1.

For example, the third partition wall 13c1 may be parallel to a straight line perpendicular to the optical axis, and an interface of each of the fifth and fifth magnet portions 13a1 and 13b1 may be parallel to the optical axis.

For example, in the third magnet 130-3a, the N pole and S pole of 2-pole magnetization may be disposed in the optical axis direction.

The third magnet 130-3 may be positioned at the inner side of the region of the fifth coil unit 230-3 and may be overlapped with the fifth coil unit 230-3 in the optical axis direction.

Any one portion of the fifth coil unit 230-3 may be simultaneously overlapped with a first polar portion of the fifth magnet portion 13a1, a third partition wall 13c1, and a second polar portion of the sixth magnet portion 13b1 in the optical axis direction.

Dual or triple cameras are being developed as functions of optical devices (e.g., mobile phones) are reinforced, and actuators mounted on optical devices may be subject to magnetic field interference from each other due to the influence of magnets mounted on each actuator.

In order to inhibit such magnetic field interference, the second embodiment comprises three magnets, but due to a decrease in the number of magnets and a decrease in the size of the magnet, the electromagnetic force for AF driving and the electromagnetic force for OIS driving may be reduced, and power consumption or current consumption for AF and OIS driving may be increased.

In a second embodiment, first to third yokes 193 to 195 are provided in order to reduce such current consumption and electromagnetic force reduction.

Figure 33A:
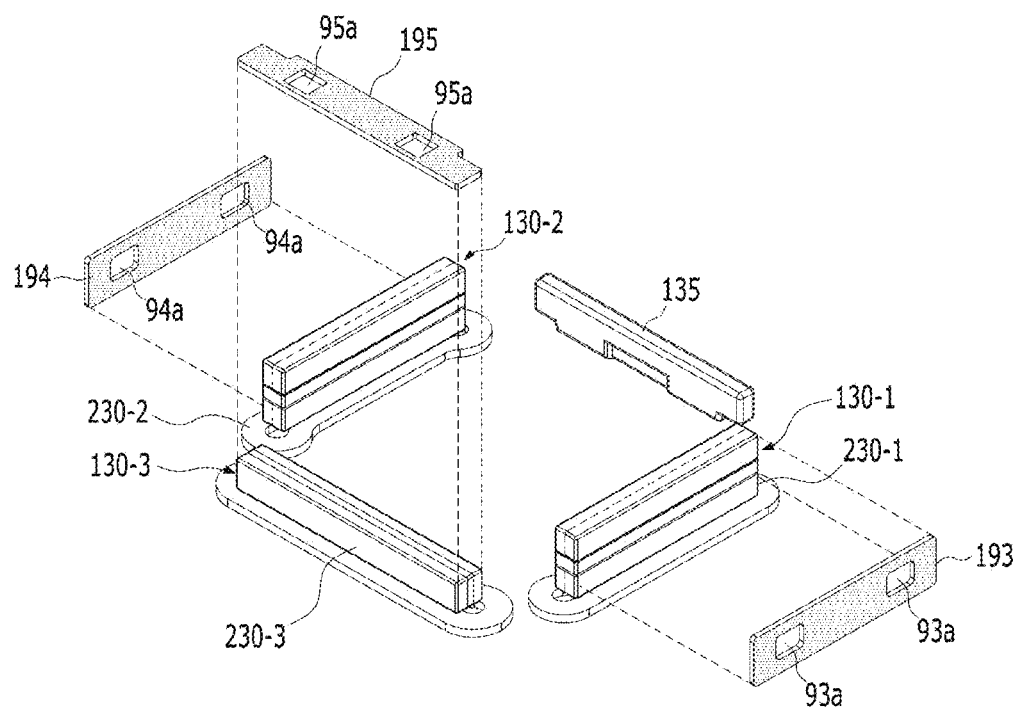
FIG. 33a is a first perspective view illustrating first to third magnets, dummy member, and first to third yokes.
Figure 33B:
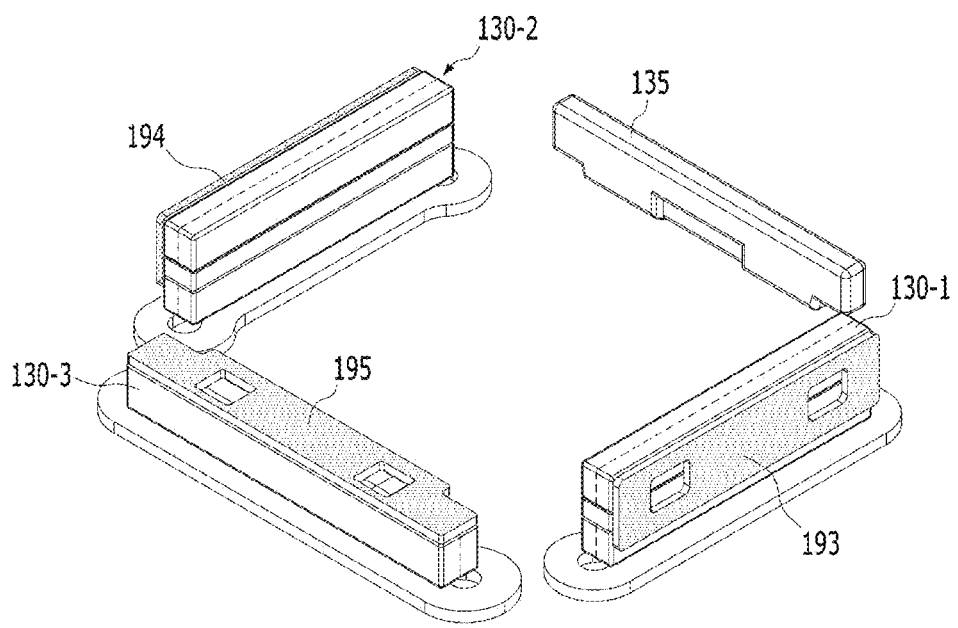
FIG. 33b is a second perspective view illustrating first to third magnets, dummy member, and first to third yokes.

FIG. 33a a first perspective view illustrating first to third magnets 130-1 to 130-3, dummy member 135, and first to third yokes, and FIG. 33b is a second perspective view illustrating first to third magnets 130-1 to 130-3, dummy member 135, and first to third yokes.

Referring to FIGS. 28, 29, 33a and 33b, the first yoke 193 may be disposed between the first magnet 130-1 and the outer side surface of the first side portion 141-1 of the housing 140.

In addition, the first yoke 193 may be disposed between the first magnet 130-1 and the first lateral plate of the cover member 300. Here, the first lateral plate of the cover member 300 may be a lateral plate facing the first magnet 130-1.

The first yoke 193 may be disposed at an outer side of the first magnet 130-1. Here, the outer side of the first magnet 130-1 may be the opposite side of the side on which the first coil unit 120-1 is disposed with respect to the first magnet 130-1.

The first yoke 193 may be disposed on a first side surface of the first magnet 130-1, and the first side surface of the first magnet 130-1 may be the opposite surface of the second side surface of the first magnet 130-1 facing the first coil unit 120-1. The first yoke 193 may enhance the electromagnetic force between the first magnet 130-1 and the first coil unit 120-1.

The second yoke 194 may be disposed between the second magnet 130-2 and an outer side surface of the second side portion 141-2 of the housing 140.

In addition, the second yoke 194 may be disposed between the second magnet 130-2 and the second lateral plate of the cover member 300. Here, the second lateral plate of the cover member 300 may be a lateral plate facing the second magnet 130-2 or a lateral plate facing the first lateral plate of the cover member 300.

The second yoke 194 may be disposed at the outer side of the second magnet 130-2. Here, the outer side of the second magnet 130-2 may be an opposite side of the second coil unit 120-2 with respect to the second magnet 130-2.

The second yoke 194 may be disposed on a first side surface of the second magnet 130-2, and the first side surface of the second magnet 130-2 may be a surface opposite to the second side surface of the second magnet 130-2 facing the second coil unit 120-2. The second yoke 194 may enhance the electromagnetic force between the second magnet 130-2 and the second coil unit 120-2.

The third yoke 195 may be disposed on the third magnet 130-3. For example, the third yoke 195 may be disposed on an upper surface of the third magnet 130-3.

For example, the third yoke 195 may be disposed between an upper surface of the third side portion of the housing 140 and an upper surface of the third magnet 130-3.

Alternatively, the third yoke 195 may be disposed between the third magnet 130-3 and an upper plate of the cover member 300.

The first yoke 193 may comprise at least one first hole 93a (or a first through hole) corresponding or facing to at least one first hole 7a of the housing 140.

The second yoke 194 may comprise at least one second hole 94a (or a second through hole) corresponding or facing to at least one second hole 8a of the housing 140.

The third yoke 195 may comprise at least one third hole 95a (or a third through hole) corresponding or facing to at least one third hole 9a of the housing 140.

The holes 7a, 8a, and 9a of the housing 140 and the holes 93a, 94a, and 95a of the first to third yokes 193, 194, and 195 may be holes for injecting an adhesive, the first to third magnets 130-1 to 130-3 and the yokes 193, 194, and 195 may be adhered to each other by an adhesive, the first to third magnets 130-1 to 130-3 may be adhered or fixed to the housing 140, and the yokes 193, 194, and 195 may be adhered or fixed to the housing 140.

At the initial position of the AF movable unit, the first yoke 193 may be overlapped with first coil unit 120-1 in a direction perpendicular to the optical axis OA and directed from the optical axis toward the first coil unit 120-1 (or the center of the first coil unit 120-1).

At the initial position of the AF movable unit, the second yoke 194 may be overlapped with the second coil unit 120-2 in a direction perpendicular to the optical axis OA and directed from the optical axis toward the second coil unit 120-2 (or the center of the second coil unit 120-2).

At the initial position of the AF movable unit, the third yoke 195 is not facing or being overlapped with the first and second coil units 120-1 and 120-2 in the first axis (e.g., X-axis) direction. Here, the first axis direction is a direction perpendicular to the optical axis OA and directed from the third magnet 130-1 toward the dummy member 135 or a direction directed from the third side portion 141-3 of the housing 140 toward the fourth side portion 141-4. The shape of each of the first to third yokes 193 to 195 may have the same or similar shape as a corresponding one of the first to third magnets 130-1 to 130-3 among the first to third magnets 130-1 to 130-3, but are not limited thereto. For example, the shape of each of the first to third yokes 193 to 195 may be a polyhedron or a polygon (e.g., a rectangle), but is not limited thereto.

For example, at least one of the first to third yokes 193 to 195 may have a groove or a groove portion formed in at least one of both ends. For example, the third yoke 195 may have a groove formed at each of both ends. Here, the groove may have a shape in which the edges of both ends of the third yoke 195 are cut off.

The first yoke 193 may be facing or overlapped with the first magnet 130-1 in the second axis (e.g., Y axis) direction, and the second yoke 193 may be facing or overlapped with the second magnet 130-2 in the second axis (e.g., Y axis) direction. Here, the second axis direction may be a direction perpendicular to the optical axis OA and direction directed from the first coil unit 120-1 toward the second coil unit 120-2, or a direction directed from the first side portion 141-1 of the housing 140 toward the second side portion 141-2.

The third yoke 195 may be facing or overlapped with the third magnet 130-3 in the optical axis direction.

For example, the first yoke 193 may be overlapped with the first magnet portion 11a, the first partition wall 11c, and the second magnet portion 11c of the first magnet 130-1 in the second axis direction. In addition, the second yoke 194 may be overlapped with the second magnet portion 12a, the second partition wall 12c, and the fourth magnet portion 12c of the second magnet 130-2 in the second axis direction.

In addition, for example, the third yoke 195 may be overlapped with the fifth magnet portion 13a, the third partition wall 13c, and the sixth magnet portion 13b in the optical axis direction.

Figure 34A:
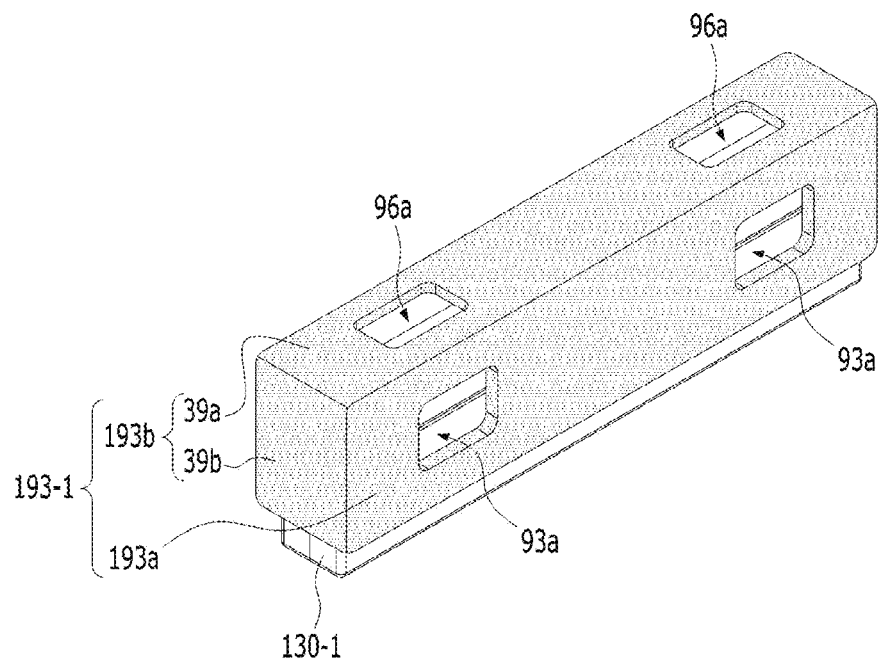
FIG. 34a is a perspective view of a first yoke according to another embodiment.

FIG. 34a is a perspective view of a first yoke 193-1 according to another embodiment.

Referring to FIG. 34a, the first yoke 193-1 may comprise a body 193a facing the first side surface of the first magnet 130-1, and an extension portion 193b being extended from the body 193a.

For example, the body 193a may be disposed on the first side surface of the first magnet 130-1.

The extension portion 193b may be extended from the body 193a toward at least one of a third side surface of the first magnet 130-1 and an upper surface of the first magnet 130-1.

For example, the extension portion 193b may comprise a first extension portion 39a disposed on an upper surface of the first magnet 130-1, and a second extension portion 39b disposed on at least one of a third side portion and a fourth side surface of the first magnet 130-1. In this case, the third side surface of the first magnet 130-1 may be a side surface disposed between the first side surface and the second side surface of the first magnet 130-1, and the fourth side surface of the first magnet 130-1 may be a side that is located at the opposite side of the third side surface of the first magnet 130-1.

At least one hole 96a (or through hole) through which an adhesive is injected may be formed in the first extension portion 39a of the first yoke 193-1. In another embodiment, at least one hole may also be formed in the second extension portion 39b.

The description of the first yoke 193-1 in FIG. 34a may also be applied to the second yoke 194.

Figure 34B:
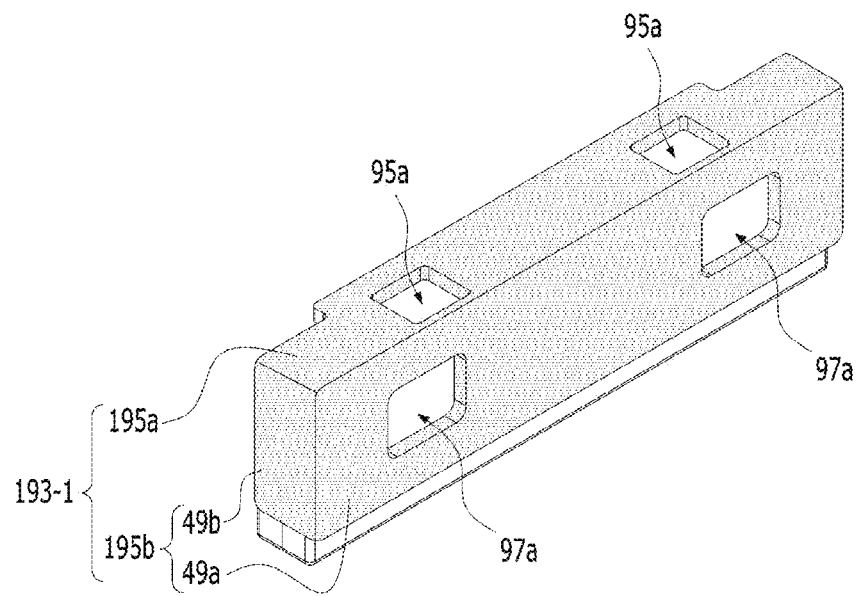
FIG. 34b is a perspective view of a third yoke according to another embodiment.

FIG. 34b is a perspective view of a third yoke 195-1 according to another embodiment. Referring to FIG. 34b, the third yoke 195-1 may comprise a body 195a facing the upper surface of the third magnet 130-3, and an extension portion 195b being extended toward the side surface of the third magnet 130-3 being extended from the body 195a.

The body 195a may be disposed on an upper surface of the third magnet 130-3. The extension portion 195b may be disposed on the side surface of the third magnet 130-3 in the body 195a.

For example, the extension portion 195b may comprise a first extension portion 49a disposed on the first side surface of the third magnet 130-3, and a second extension portion 49b disposed on at least one of the third and fourth side surfaces of the third magnet 130-3. The first side surface of the third magnet 130-3 may be a side surface opposite to the second side surface of the third magnet 130-3 facing the dummy member 135, and the third and fourth side surfaces of the third magnet 130-3 may be disposed between the first side surface and the second side surface of the third magnet 130-3.

At least one hole 97a (or through hole) through which an adhesive is injected may be formed in the first extension portion 49a of the third yoke 195-1. In another embodiment, at least one hole may also be formed in the second extension portion 49b.

In the third yoke according to another embodiment, at least one of the body 195a and the second extension portion 49b may be omitted. For example, a third yoke may be implemented to comprise only the second extension portion 49b.

In addition, in the lens driving apparatus according to another embodiment, the third yoke 195 may be omitted.

Figure 37A:
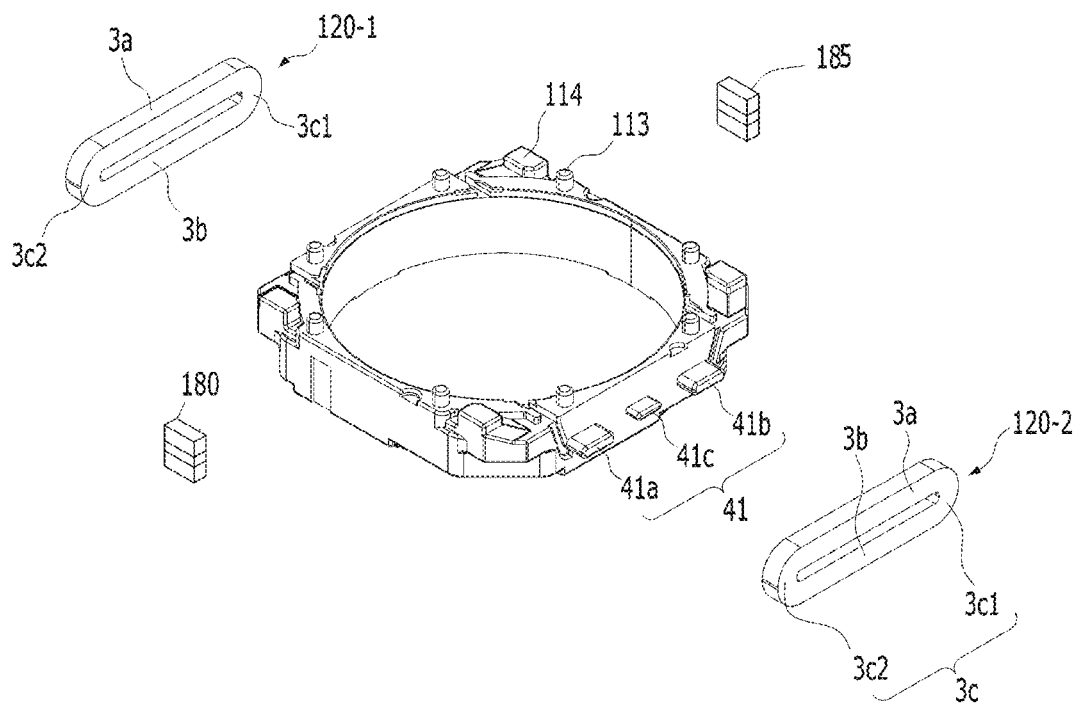
FIG. 37a shows another embodiment comprising a sensing magnet and a balancing magnet.
Figure 37B:
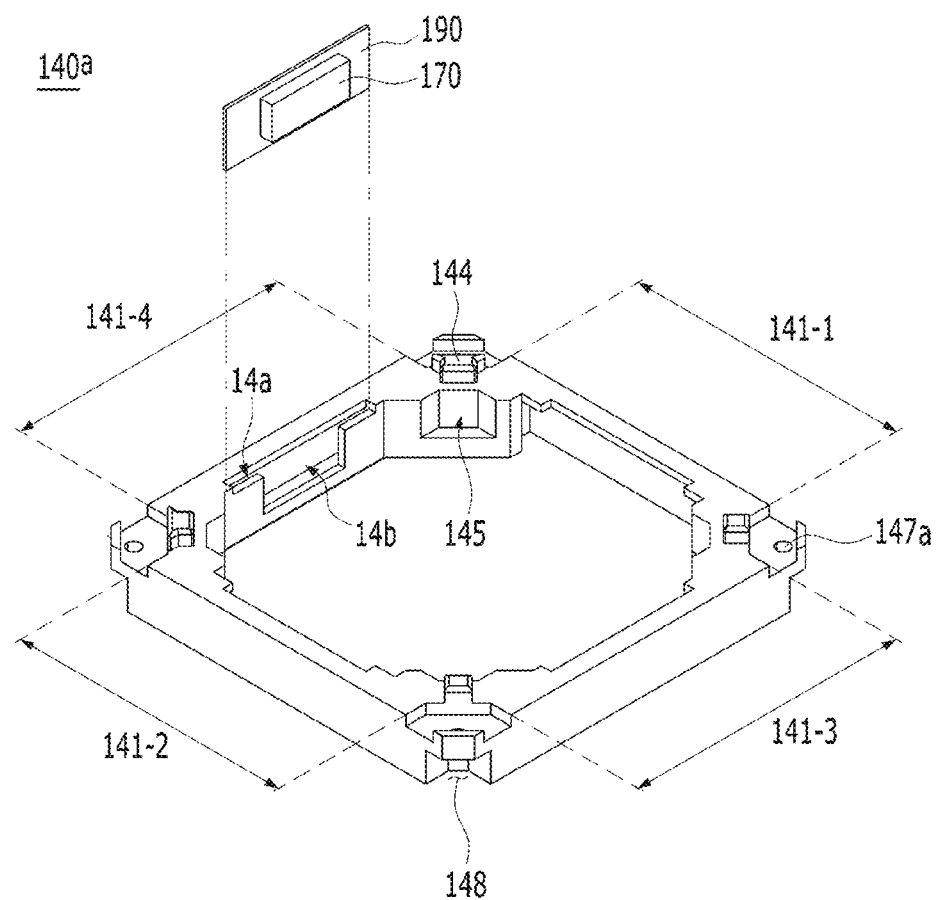
Figure 38A:
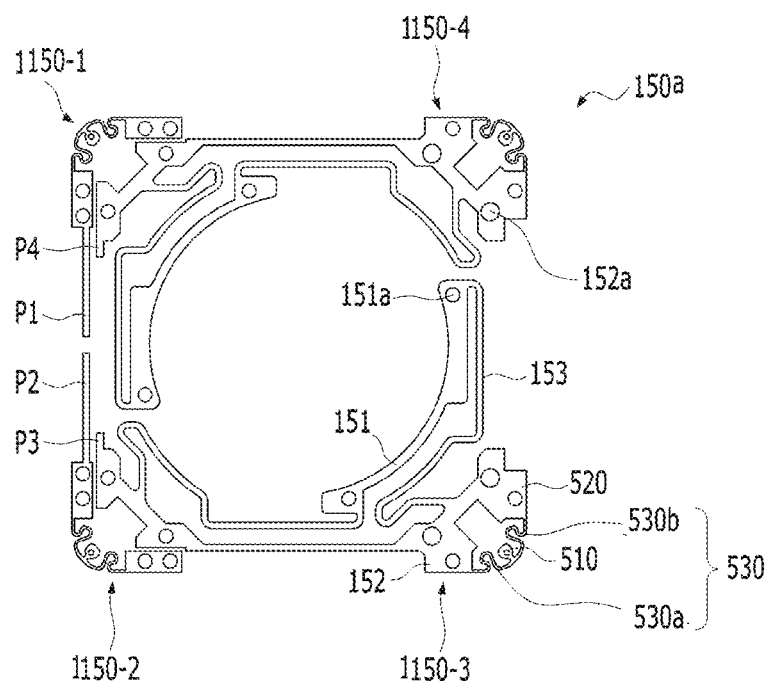
Figure 38B:
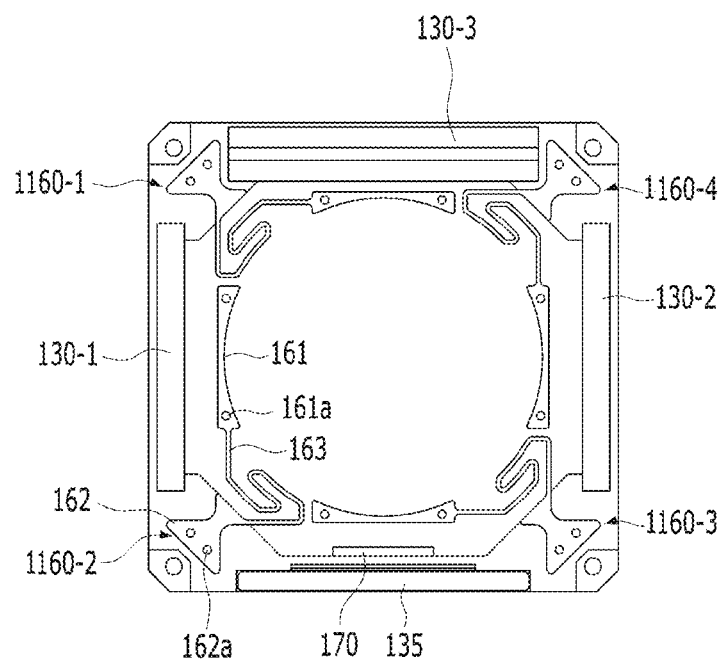

FIG. 37a shows a sensing magnet 180 and a balancing magnet 185 according to another embodiment, FIG. 37b shows a housing 140a, a circuit board 190, and a position sensor 170 according to a second embodiment of FIG. 37a, FIG. 38a shows an upper elastic member 150a according to a second embodiment of FIG. 37a, and FIG. 38b shows a lower elastic member according to a second embodiment of FIG. 37a.

The same reference numerals as in FIG. 23a denote the same configuration, and the description of the housing 140 may be applied to the housing 140a.

Referring to FIGS. 37a-38b, the lens driving apparatus 100 may further comprise a sensing magnet 180, a circuit board 190, and a position sensor 170 for driving AF feedback.

The sensing magnet 180 may be disposed on any one side portion of the bobbin 110 where the first coil unit 120-1 and the second coil unit 120-2 are not disposed. For example, the sensing magnet 180 may be disposed in a groove provided on any one side portion of the bobbin 110.

When the lens driving apparatus 100 comprises a balancing magnet, the balancing magnet may be disposed in any one of the side portions of the bobbin 110 in which the first coil unit 120-1 and the second coil unit 120-2 are not disposed.

The lens driving apparatus 100 may further comprise a balancing magnet 185 to offset the magnetic field influence of the sensing magnet 180 and for weight balancing with the sensing magnet 180.

The balancing magnet 185 may be disposed on any one of the side portions of the bobbin 110 (e.g., a third side portion). For example, the sensing magnet 180 and the balancing magnet 185 may be disposed on side portions of the bobbin facing each other or located at opposite side of each other.

The sensing magnet 180 (and/or the balancing magnet 185) may have an interface between an N pole and S pole parallel to a direction perpendicular to the optical axis direction, but is not limited thereto. For example, in another embodiment, the interface between the N pole and S pole may be parallel to the optical axis direction.

For example, each of the sensing magnet 180 and the balancing magnet 185 may be a single-pole magnetized magnet having one N-pole and one S-pole, but is not limited thereto, and may be a 2-pole magnetized magnet in other embodiments.

The upper elastic member 150a of FIG. 38a may comprise first to fourth upper springs 1150-1 to 1150-4, and the lower elastic member of FIG. 38b may comprise first to fourth lower springs 1160-1 to 1160-4.

At least one of the first to fourth upper springs 1150-1 to 1150-4 is a first inner side frame 151 coupled to the bobbin 110 and a first outer side frame 152 coupled to the housing 140a, a first frame connection portion 153 connecting the first inner side frame 151 and the first outer side frame 152 may be further comprised. In another embodiment, the inner side frame may be expressed as "inner side portion", the outer side frame may be expressed as "outer side portion", and the frame connection portion may be expressed as "connection portion".

For example, each of the first and second upper springs 1150-1 and 1150-2 may comprise a first outer side frame 152 but not comprise the first inner side frame and the first frame connection portion, each of the third and fourth upper springs 150-3 and 150-4 may comprise the first inner side frame 151, the first outer side frame 152, and the first frame connection portion 153, but is not limited thereto.

The first outer side frame 152 of each of the first to fourth upper springs 1150-1 to 1150-4 may comprise a first coupling portion 510 coupled to the support members 220-1 to 220-4, a second coupling portion 520 coupled to a corresponding one of the corner portions of the housing 140, a connection portion 530 connecting the first coupling portion 510 and the second coupling portion 520. Descriptions of the first coupling portion 510, the second coupling portion 520, and the connection portion 530 of FIG. 24 may be applied to FIG. 38a.

A first groove 14a for accommodating the circuit board 190 and a second groove 14b for accommodating the position sensor 170 may be provided in the fourth side portion 141-4 of the housing 140a.

In order to facilitate the mounting of the circuit board 190, the upper portion of the first groove 14a of the housing 140a may be open and may have a shape corresponding or identical to the shape of the circuit board 190.

The second groove 14b may have an opening that is open toward the inner side of the housing 140a, and may be a structure in contact with or connected to the first groove 14a, but is not limited thereto. The second groove 14b may have a shape corresponding or identical to the shape of the position sensor 170.

The position sensor 170 and the circuit board 190 are disposed in any one among the side portions of the housing 140. For example, the position sensor 170 and the circuit board 190 may be disposed in the fourth side portion 141-4 of the housing 140 in which the dummy member 135 is disposed.

For example, the circuit board 190 may be disposed in the first groove 14a of the housing 140, and the position sensor 170 may be disposed or mounted on the circuit board 190.

At the initial position of the AF movable unit, the position sensor 170 may be overlapped with at least a portion of the sensing magnet 180 in a direction perpendicular to the optical axis OA and directed from the optical axis toward the position sensor 170, but is not limited thereto.

The position sensor 170 may be disposed on a first surface of the circuit board 190. Here, the first surface of the circuit board 190 mounted on the housing 140 may be a surface facing the inner side of the housing 140.

The position sensor 170 may be implemented in the form of a driver IC comprising a Hall sensor, or may be implemented alone as a position detection sensor such as a Hall sensor and the like.

For example, the circuit board 190 may be a printed circuit board or a FPCB.

For example, first to fourth terminals of the circuit board 190 may be electrically connected to any corresponding one of the upper springs 1150-1 to 1150-4, it may be electrically connected to the circuit board 250 by the support members 220-1 to 220-4, and the position sensor 170 may be electrically connected to the circuit board 250.

When the position sensor 170 is a driver IC comprising a Hall sensor, it may comprise first to fourth terminals for transmitting and receiving clock signals (SCL), data signals (SDA), and power signals (VCC, GND), and fifth and sixth terminals for providing a driving signal to the first coil 120.

The first to fourth terminals of the position sensor 170 may be electrically connected to the first to fourth terminals of the circuit board 190, and the fifth and sixth terminals of the position sensor 170 may be electrically connected to the fifth and sixth terminals of the circuit board 190.

For example, the first outer side frame 152 of each of the first to fourth upper springs 150-1 to 150-4 may be provided with contact portions P1 to P4 to be electrically connected to any corresponding one among the first to fourth terminals of the circuit board 190.

The first coil 120 may be electrically connected to two lower springs of the lower springs 1160-1 to 1160-4, and the two lower springs electrically connected to the first coil 120 may be electrically connected to the fifth and sixth terminals of the circuit board 190.

When the position sensor 170 is implemented as a Hall sensor alone, the position sensor 170 may comprise two input terminals and two output terminals, each of the input terminals and output terminals of the position sensor 170 may be electrically connected to any corresponding one among the first to fourth terminals of the circuit board 190, the first to fourth terminals of the circuit board 190 may be electrically connected to a corresponding one of the upper springs 1150-1 to 1150-4, the first coil 120 may be electrically connected to two lower springs among the lower springs 1160-1 to 1160-4, and the two lower springs being electrically connected to the first coil 120 may be electrically connected to the circuit board 250.

A driving signal may be provided to the position sensor 170 through the terminals 251 of the circuit board 250, and it can be outputted by receiving the output signal of the position sensor 170.

Since W3 is less than W2, the second embodiment can secure a sufficient space for disposing the circuit board 190 and the position sensor 170, and the spatial interference among the circuit board 190, the position sensor 170, and the dummy member 135 can be inhibited.

The sensing magnet 180 can move in the optical axis direction OA together with the bobbin 110 by the interaction between the first coil unit 120-1 and the first magnet 130-1 and the interaction between the second coil unit and the second magnet 130-2, and the position sensor 170 may detect the strength of the magnetic field of the sensing magnet 180 moving in the optical axis direction, and an output signal according to the result of detection can be outputted.

For example, a control unit 830 of a camera module or a control unit 780 of a terminal may detect a displacement of the bobbin 110 in the optical axis direction based on an output signal outputted from the position sensor 170.

In a dual or triple camera, in order to reduce magnetic field interference between magnets comprised in adjacent actuators, each actuator has a structure comprising three magnets. Compared to an actuator having four magnets, an actuator having three magnets lacks electromagnetic force due to a decrease in the number of magnets for driving AF, and power consumption for driving may be increased.

The second embodiment has a structure comprising three magnets 130-1 to 130-3, but since each of the magnets 130-1 to 130-3 is 2-pole magnetized magnet, it is possible to improve the electromagnetic force for AF driving according to the interaction with the coil units 120-1 and 120-2.

In addition, the second embodiment reduces the leakage magnetic flux of the first and second magnets 130-1 and 130-3 by the first and second yokes 193 and 194, so that it is possible to further enhance the electromagnetic force for AF driving according to the interaction with the coil units 120-1 and 120-2.

In addition, the second embodiment reduces the leakage magnetic flux of the third magnet 130-3 by the third yoke 195, so that it is possible to enhance the electromagnetic force for OIS driving according to the interaction with the second coil unit 230-3 of the coil unit 230.

Meanwhile, the lens driving apparatus 100 according to the second embodiment described above may further comprise a lens or/and a lens barrel mounted on the bobbin 110. In addition, the lens driving apparatus 100 according to the second embodiment may further comprise an image sensor. In addition, the lens driving apparatus 100 may further comprise a circuit board for mounting an image sensor. In addition, the lens driving apparatus 100 may further comprise a filter for filtering light that has passed through the lens and providing the filtered light to the image sensor. In addition, the lens driving apparatus 100 may further comprise a motion sensor or a control unit.

The lens driving apparatus 100 according to the second embodiment described above may be implemented in various fields, for example, a camera module or an optical device, or may be used in a camera module or an optical device.

For example, the lens driving apparatus 100 according to the second embodiment forms an image of an object in space by using the characteristics of light such as reflection, refraction, absorption, interference, and diffraction, and aims to increase the visual power of the eye. Alternatively, it may be comprised in an optical device for the purpose of recording and reproducing an image by a lens, or for optical measurement, image propagation or transmission, and the like. For example, an optical device according to the second embodiment may comprise a portable terminal equipped with a smartphone and a camera.

Figure 39:
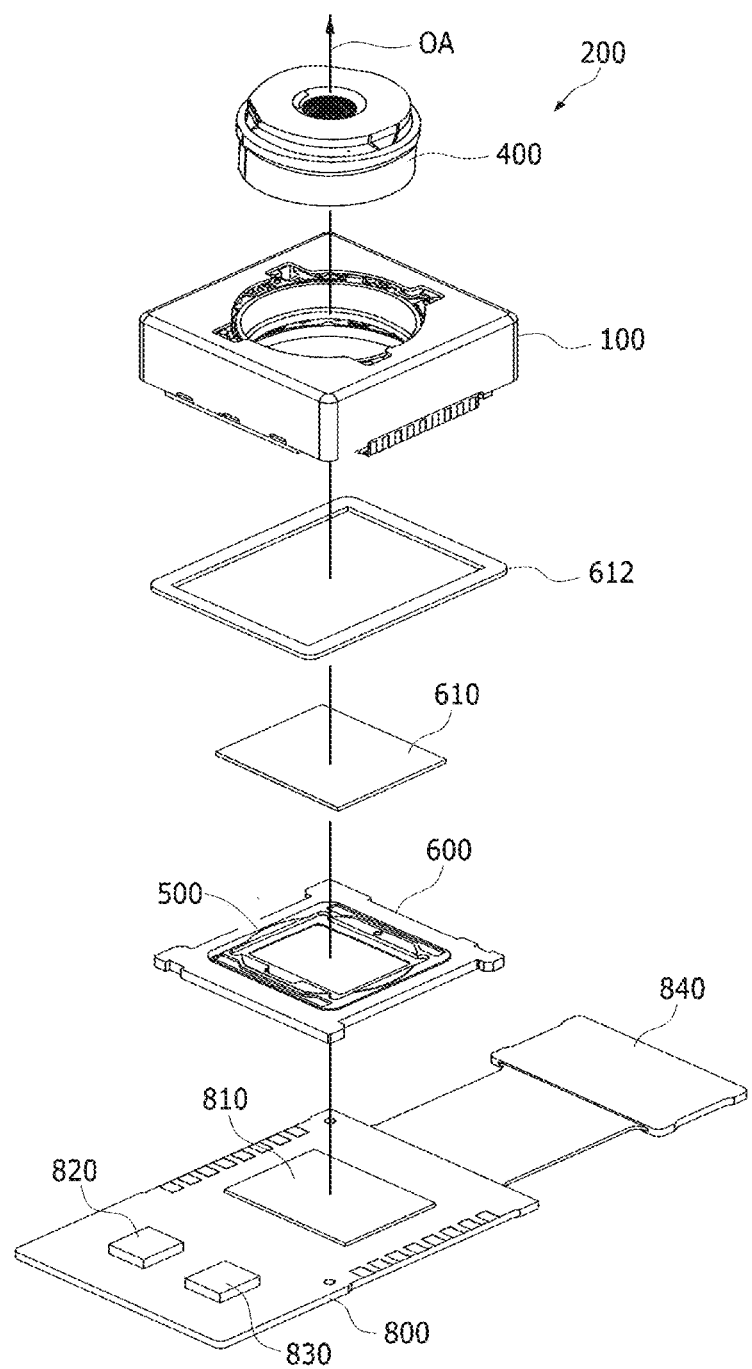
FIG. 39 is an exploded perspective view of a camera module according to a second embodiment.

FIG. 39 is an exploded perspective view of a camera module 200 according to a second embodiment.

Referring to FIG. 39, the camera module 200 may comprise a lens or lens barrel 400, a lens driving apparatus 100, an adhesive member 612, a filter 610, a first holder 600, a second holder 800, an image sensor 810, a motion sensor 820, a control unit 830, and a connector 840.

The lens or lens barrel 400 may be mounted on the bobbin 110 of the lens driving apparatus 100.

The first holder 600 may be disposed below the base 210 of the lens driving apparatus 100. The filter 610 is mounted in the first holder 600, and the first holder 600 may comprise a protruded portion 500 on which the filter 610 is mounted.

The adhesive member 612 may couple or attach the base 210 of the lens driving apparatus 100 to the first holder 600. In addition to the above-described adhesive role, the adhesive member 612 may serve to inhibit foreign substances from flowing into the lens driving apparatus 100.

For example, the adhesive member 612 may be an epoxy, a thermosetting adhesive, an ultraviolet curable adhesive, or the like.

The filter 610 may serve to block light of a specific frequency band in the light passing through the lens barrel 400 from entering the image sensor 810. The filter 610 may be an infrared cut filter, but is not limited thereto. In this case, the filter 610 may be disposed parallel to the x-y plane.

An opening may be formed at a portion of the first holder 600 on which the filter 610 is mounted so that light passing through the filter 610 can enter into the image sensor 810.

The second holder 800 may be disposed under the first holder 600, and an image sensor 810 may be mounted on the second holder 600. The image sensor 810 is a portion where the light that has passed through the filter 610 is incident and the image contained in the light is formed.

The second holder 800 may be provided with various circuits, elements, control units, and the like to convert an image formed in the image sensor 810 into an electrical signal and transmit it to an external device.

The second holder 800 may be implemented as a circuit board on which an image sensor may be mounted, a circuit pattern may be formed, and various elements are coupled. The first holder 600 may be expressed as a sensor base, and the second holder 800 may be expressed as a circuit board.

The image sensor 810 may receive an image comprised in light incident through the lens driving apparatus 100 and convert the received image into an electrical signal.

The filter 610 and the image sensor 810 may be disposed to be spaced apart to face each other in a first direction.

The motion sensor 820 is mounted on the second holder 800 and may be electrically connected to the control unit 830 through a circuit pattern provided on the second holder 800.

The motion sensor 820 outputs rotational angular velocity information due to the movement of the camera module 200. The motion sensor 820 may be implemented as a 2-axis or 3-axis gyro sensor or an angular velocity sensor.

The control unit 830 is mounted or disposed on the second holder 800. The second holder 800 may be electrically connected to the lens driving apparatus 100. For example, the second holder 800 may be electrically connected to the circuit boards 190 and 250 of the lens driving apparatus 100.

For example, a driving signal may be provided to the position sensor 170 and the position sensor 240 through the second holder 800, and the output signal of the position sensor 170 and the output signal of the position sensor 240 may be transmitted to the second holder 800. For example, an output signal of the position sensor 170 and an output signal of the position sensor 240 may be received by the control unit 830.

The connector 840 is electrically connected to the second holder 800 and may comprise a port for electrically connecting to an external device.

Figure 40:
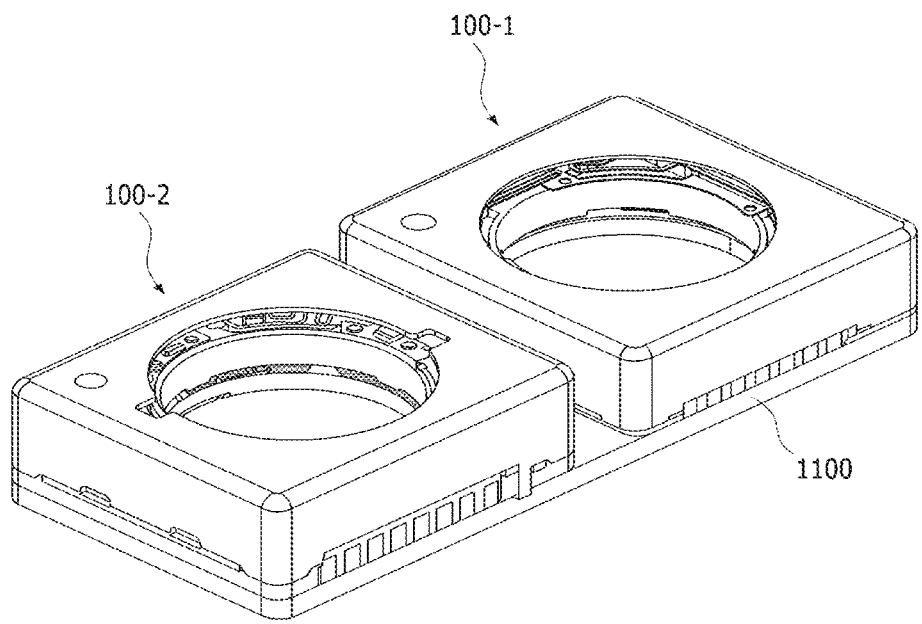
FIG. 40 is a perspective view of a camera module according to another embodiment.

FIG. 40 is a perspective view of a camera module according to another embodiment.

Referring to FIG. 40, the camera module may be a dual camera module comprising a first camera module 100-1 comprising a first lens driving apparatus and a second camera module 100-2 comprising a second lens driving apparatus.

Each of the first camera module 100-1 and the second camera module 100-2 may be one of a camera module for auto focusing (AF) or a camera module for optical image stabilization (OIS).

The camera module for AF refers to one that can perform only the auto focus function, and a camera module for OIS refers to one that can perform auto focus function and optical image stabilization (OIS) function.

For example, the first lens driving apparatus may be the second embodiment 100 illustrated in FIG. 20, and the second lens driving apparatus may be the second embodiment illustrated in FIG. 20 or a lens driving apparatus for AF.

The camera module may further comprise a circuit board 1100 for mounting the first camera module 100-1 and the second camera module 100-2. In FIG. 39, the first camera module 100-1 and the second camera module 100-2 are disposed side by side on one circuit board 1100, but is not limited thereto. In another embodiment, the circuit board 1100 may comprise a first circuit board and a second circuit board separated from each other, and the first camera module 100-1 may be disposed on the first circuit board, and the second camera module may be disposed on the second circuit board.

Figure 41A:
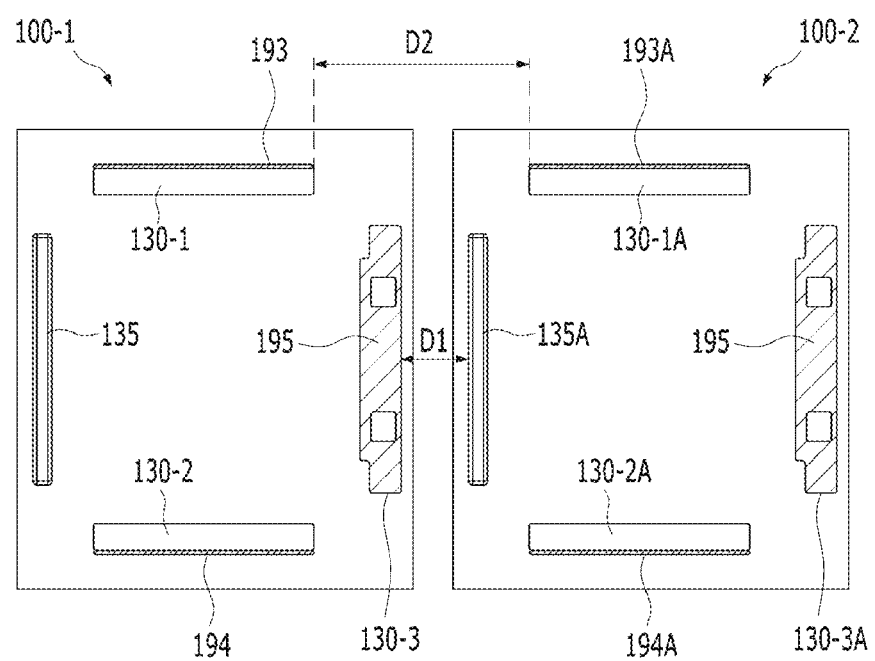
FIG. 41a is a schematic diagram of a second embodiment of a camera module illustrated in FIG. 40.

FIG. 41a is a schematic diagram of a second embodiment of a camera module illustrated in FIG. 40.

Referring to FIG. 41a, the camera module may comprise a first lens driving apparatus 100-1 and a second lens driving apparatus 100-2 disposed side by side.

A fourth side portion and the other third side portion of one of the housings of the first and second lens driving apparatuses 100-1 and 100-2 may be disposed adjacent to each other.

For example, the fourth side portion 141-4 of the housing of the first lens driving apparatus 100-1 and the third side portion 141-3 of the housing of the second lens driving apparatus 100-2 may be disposed adjacent to each other.

For example, the fourth side portion 141-4 of the housing of the first lens driving apparatus 100-1 and the third side portion 141-3 of the housing of the second lens driving apparatus 100-2 may be disposed adjacent to each other A dummy member (for example, 135A) of any one (for example, 100-2) of the first and second lens driving apparatuses 100-1 and 100-2 and a third magnet 130-3 of the other one (for example, 100-1) may be disposed adjacent to each other.

For example, the separation distance D1 between the dummy member 135a of the second lens driving apparatus 100-2 and the third magnet 135 of the first lens driving apparatus 100-1 may be smaller than the separation distance D2 between any one of the first magnet 130-1 (or the second magnet 130-2) of the first and second lens driving apparatuses 100-1 and 100-2 (D1<D2).

Figure 41B:
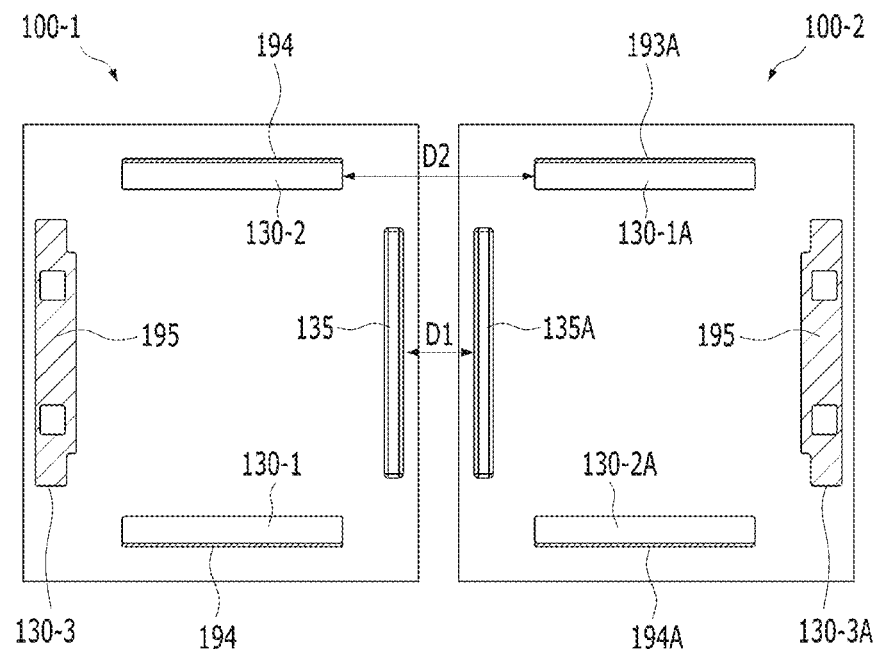
FIG. 41b is a schematic diagram of another embodiment of a camera module illustrated in FIG. 40.

Since D1 is smaller than D2 (D1<D2), it is possible to reduce the influence of the AF driving force and OIS driving force due to magnetic field interference between magnets 130-1 and 130-1a, 130-2 and 130-2a comprised in the first and second lens driving apparatuses 100-1 and 100-2, thereby securing reliability for AF operation and OIS operation. FIG. 41b is a schematic diagram of another embodiment of a camera module illustrated in FIG. 40.

Referring to FIG. 41b, the camera module may comprise a first lens driving apparatus 100-1 and a second lens driving apparatus 100-2.

Each of the first and second lens driving apparatuses 100-1 and 100-2 may be the second embodiment 100 illustrated in FIG. 20.

Each of the first and second lens driving apparatuses 100-1 and 100-2 may comprise: first magnets 130-1 and 130-1A disposed on the first side portion of the housing 140, second magnets 130-2 and 130-2A disposed on the second side portion of the housing 140; third magnets 130-3 and 130-3A disposed on the third side portion of the housing 140; dummy members 135 and 135A disposed on the fourth side portion of the housing 140; and a first coil 120 comprising a first coil unit 120-1 disposed on the bobbin and facing the first magnets 130 and 130-1A and a second coil unit 120-2 disposed on the bobbin 110 and facing the second magnets 130-2 and 130-2A.

The fourth side portion of the housing 140 of the first lens driving apparatus 100-1 may be disposed adjacent to the fourth side portion of the housing 140 of the second lens driving apparatus 100-2.

In addition, when viewed from the top, the dummy member 135 of the first lens driving apparatus 100-1 may be disposed between a third magnet 130-3 of the first lens driving apparatus 100-1 and a dummy member 135A of a second lens driving apparatus 100-2.

For example, the fourth side portion of the housing 140 of the first lens driving apparatus 100-1 and the fourth side portion of the housing 140 of the second lens driving apparatus 100-2 may be disposed parallel to each other, but is not limited thereto. The dummy member 135 and the dummy member 135A may be disposed adjacent to each other.

For example, the separation distance D11 between the first dummy member 135 and the second dummy member 135A may be smaller than the separation distance D12 between the magnet 130-2 (or magnet 130-1) of the first lens driving apparatus 100-1, and the magnet 130-1A (or the magnet 130-2A) of the second lens driving apparatus 100-2 (D11<D12).

Since D11 is less than D12 (D11<D12), the influence of AF driving force and OIS driving force due to magnetic field interference between the magnets 130-1 and 130-2 of the first lens driving apparatus 100-1 and the second magnets 130-1A and 130-2A of the second lens driving apparatus 110-2 can be reduced.

Figure 41C:
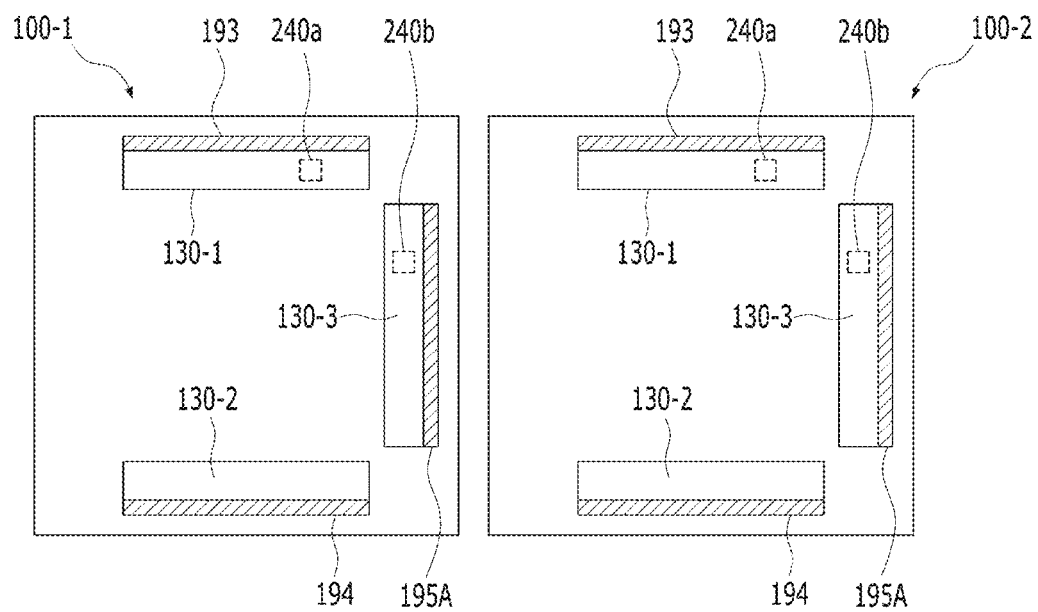
FIG. 41c shows a schematic diagram of another embodiment of a camera module illustrated in FIG. 40.

FIG. 41c shows a schematic diagram of another embodiment of a camera module illustrated in FIG. 40.

Referring to FIG. 41c, the camera module of FIG. 41c may be a modified embodiment of FIG. 41a, and dummy members 135 and 135A of FIG. 41a may be omitted. In addition, in the third yoke 195A of FIG. 41c, the body 195a and the first extension portion 49a are omitted in FIG. 34b, and only the second extension 49b may be comprised.

In addition, the first sensor 240a may be overlapped with one end of the first magnet 130-1 in the optical axis direction, and the second sensor 240b may be overlapped with one end of the third magnet 130-3 in the optical axis direction. At this time, one end of the first magnet 130-1 being overlapped with the first sensor 240a may be adjacent to one end of the third magnet 130-3 being overlapped with the second sensor 240b.

For example, in FIG. 41c, the first yoke 193 and the first sensor 240a may not be overlapped in the optical axis direction, and the third yoke 195A and the second sensor 240b may not be overlapped in the optical axis direction, but is not limited thereto. In another embodiment, the first yoke and the first sensor 240a may be overlapped in the optical axis direction, and the third yoke and the second sensor 240b may be overlapped.

A description of the relationship between the first sensor 240a and the first magnet 130-1 and the relationship between the second sensor 240b and the third magnet 130-3 in FIG. 41c can be also applied to or inferred in FIG. 41a.

Figure 41D:
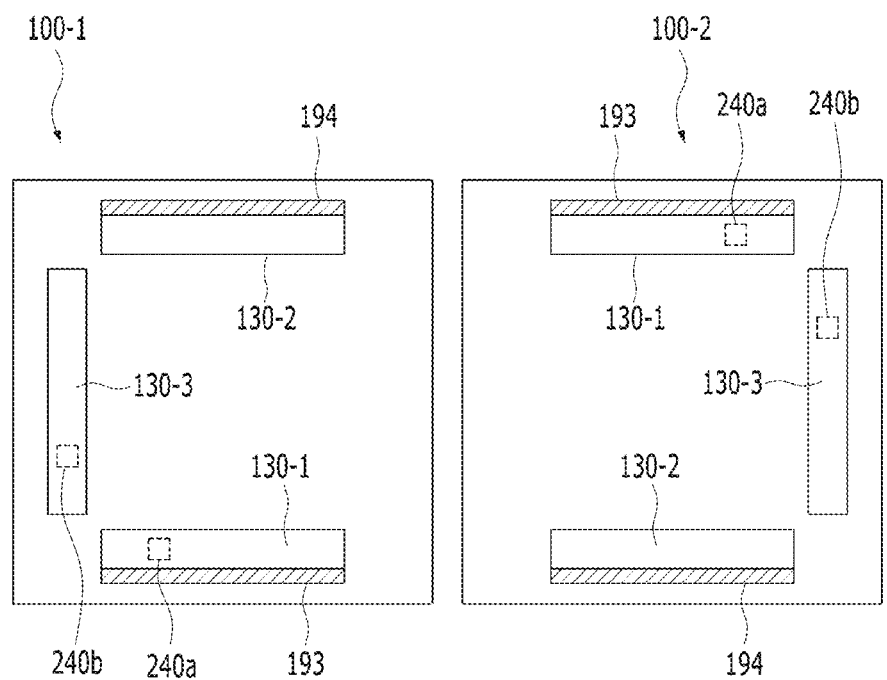
FIG. 41d shows a schematic diagram of another embodiment of a camera module illustrated in FIG. 40.

FIG. 41d shows a schematic diagram of another embodiment of a camera module illustrated in FIG. 40.

Referring to FIG. 41d, the camera module of FIG. 41c may be a modified embodiment of FIG. 41b, and the dummy members 135 and 135A of FIG. 41b and the third yoke 195 of FIG. 41b may be omitted.

Figure 42:
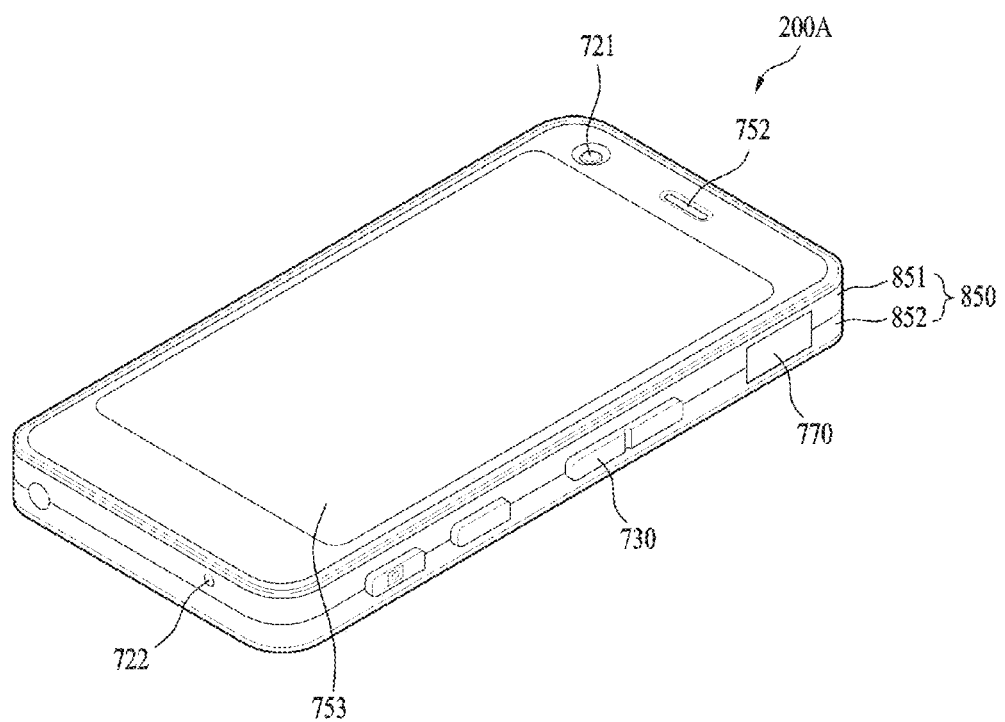
FIG. 42 is a perspective view of a portable terminal according to a second embodiment.
Figure 43:
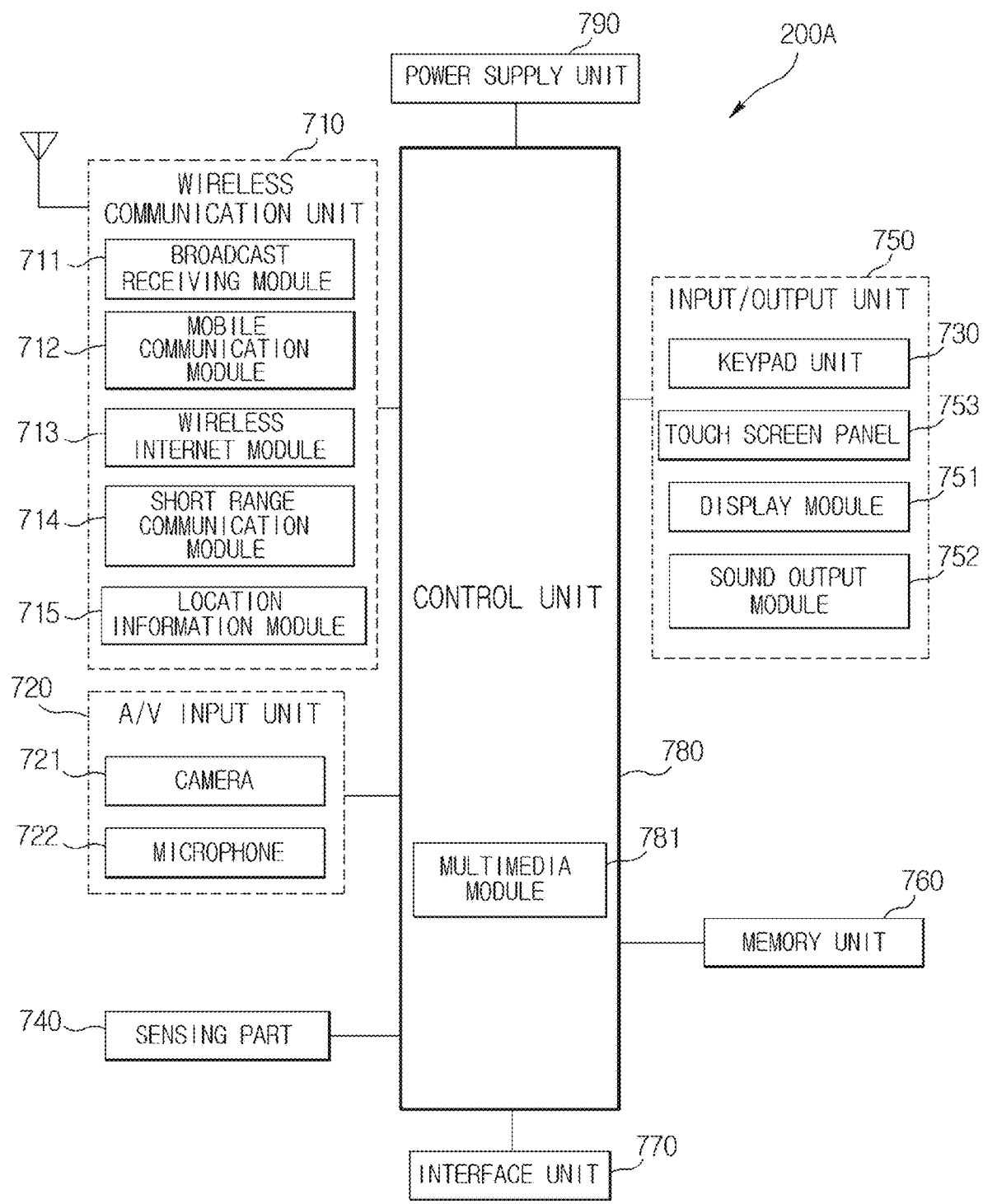
FIG. 43 shows a configuration diagram of a portable terminal illustrated in FIG. 42.

FIG. 42 is a perspective view of a portable terminal 200A according to a second embodiment, and FIG. 43 shows a configuration diagram of a portable terminal 200A illustrated in FIG. 42.

FIGS. 42 and 43, the portable terminal 200A (hereinafter referred to as "terminal") may comprise a body 850, a wireless communication unit 710, an A/V input unit 720, a sensing unit 740, and an input/output unit 750, a memory unit 760, an interface unit 770, a control unit 780, and a power supply unit 790.

The body 850 illustrated in FIG. 42 is in the form of a bar, but is not limited thereto, and may have various structures such as a slide type in which two or more sub-bodies are coupled to enable relative movement, a folder type, and a swing type, swirl type, and the like.

The body 850 may comprise a case (casing, housing, cover, and the like) forming an outer appearance. For example, the body 850 may be divided into a front case 851 and a rear case 852. Various electronic components of the terminal may be embedded in a space formed between the front case 851 and the rear case 852.

The wireless communication unit 710 can be configured to comprise one or more modules that enable wireless communication between the terminal 200A and the wireless communication system or between the terminal 200A and a network in which the terminal 200A is located. For example, the wireless communication unit 710 may be configured to comprise a broadcast receiving module 711, a mobile communication module 712, a wireless Internet module 713, a short range communication module 714, and a location information module 715.

The A/V input unit 720 is for inputting an audio signal or a video signal, and may comprise a camera 721 and a microphone 722.

The camera 721 may comprise the camera module 200 according to the second embodiment.

The sensing unit 740 may generate a sensing signal for controlling the operation of the terminal 200A by detecting the current state of the terminal 200A, such as the open/closed state of the terminal 200A, the location of the terminal 200A, the presence of user contact, the orientation of the terminal 200A, and acceleration/deceleration of the terminal 200A. For example, when the terminal 200A is in the form of a slide phone, it is possible to sense whether the slide phone is opened or closed. In addition, it is responsible for a sensing function related to whether the power supply unit 790 supplies power and whether the interface unit 770 is coupled to an external device.

The input/output unit 750 is for generating input or output related to visual sense, auditory sense or tactile sense, and the like. The input/output unit 750 may generate input data for controlling the operation of the terminal 200A, and may also display information being processed by the terminal 200A.

The input/output unit 750 may comprise a keypad unit 730, a display module 751, a sound output module 752, and a touch screen panel 753. The keypad unit 730 may generate an input data through keypad inputting.

The display module 751 may comprise a plurality of pixels whose color changes according to an electrical signal. For example, the display module 751 may comprise at least one among a liquid crystal display, a thin film transistor-liquid crystal display, an organic light-emitting diode, a flexible display, and a 3D display.

The sound output module 752 may output audio data being received from the wireless communication unit 710 in a call signal reception, a call mode, a recording mode, a voice recognition mode, or a broadcast reception mode, and the like, or may output audio data stored in the memory unit 760.

The touch screen panel 753 may convert a change in capacitance caused by a user's touch to a specific area of the touch screen into an electric input signal.

The memory unit 760 may store a program for processing and control of the control unit 780, and temporarily store input/output data (e.g., phone book, message, audio, still image, photo, video, and the like). For example, the memory unit 760 may store an image photographed by the camera 721, for example, a photo or a video.

The interface unit 770 serves as a passage for connecting to an external device connected to the terminal 200A. The interface unit 770 receives data from an external device, receives power and transmits it to each component inside the terminal 200A, or transmits data inside the terminal 200A to an external device. For example, the interface unit 770 may comprise a wired/wireless headset port, an external charger port, a wired/wireless data port, a memory card port, a port connecting a device equipped with an identification module, and an audio input/output (I/O) port, video input/output (I/O) port, earphone port, and the like.

The control unit 780 may control the overall operation of the terminal 200A. For example, the control unit 780 may perform related control and processing associated with voice calls, data communication, video calls, and the like.

The control unit 780 may comprise a multimedia module 781 for multimedia playback. The multimedia module 781 may be implemented in the control unit 180 or may be implemented separately from the control unit 780.

The control unit 780 may perform a pattern recognition process capable of recognizing handwriting input or drawing input performed on the touch screen as characters and images, respectively.

The power supply unit 790 may receive external power or internal power under control of the control unit 780 to supply power required for operation of each component.

In the above, the first embodiment and the second embodiment have been described separately, but some configurations of the second embodiment may be applied to the first embodiment, and some configurations of the first embodiment may be applied to the second embodiment. In more detail, the yoke of the second embodiment may be disposed on the magnet of the first embodiment. Conversely, the magnet and related components of the second embodiment can be disposed in the same layout as in FIG. 4 of the first embodiment.

The embodiments of the present invention have been described above with reference to the accompanying drawings, but a person skilled in the art to which the present invention belongs may understand that the present invention can be implemented in other specific forms without changing the technical idea or essential features. Therefore, it should be understood that the embodiments described above are illustrative and non-limiting in all respects.

The invention claimed is:
1. A camera module comprising:
a first camera module and a second camera module spaced apart from the first camera module, wherein the first camera module comprises:
a cover;
a housing disposed in the cover;
a bobbin disposed in the housing;
a first coil disposed on the bobbin;
a first magnet disposed on the housing;
a second coil facing the first magnet;
a second magnet disposed on the bobbin;
a first sensor detecting the second magnet; and
a balancing member disposed on the bobbin and disposed opposite to the second magnet,
wherein the cover comprises a first lateral plate disposed adjacent to the second camera module, a second lateral plate disposed opposite to the first lateral plate, and a third lateral plate and a fourth lateral plate disposed opposite to each other between the first lateral plate and the second lateral plate,
wherein the first magnet comprises a first-first magnet disposed at a position corresponding to the second lateral plate, a first-second magnet disposed at a position corresponding to the third lateral plate, and a first-third magnet disposed at a position corresponding to the fourth lateral plate, wherein a first dummy member is disposed at a position corresponding to the first lateral plate of the cover, wherein the second coil comprises a second-first coil facing the first-first magnet, a second-second coil facing the first-second magnet, and a second-third coil facing the first-third magnet, wherein a number of turns of a coil wound in the second-first coil is greater than a number of turns of a coil wound in the second-second coil, wherein a yoke is disposed on the first-first magnet, wherein the first dummy member comprises two dummy members spaced apart from each other, wherein the first camera module comprises a first substrate, wherein at least a portion of the first substrate is disposed between the two dummy members, wherein the first sensor is disposed on an inner surface of the first substrate, and wherein the first substrate has two distal ends, an outer lateral surface of each distal end of the first substrate contacting an inner lateral surface of each dummy member, respectively.

2. The camera module of claim 1, wherein the first sensor is disposed between the two dummy members, and wherein the bobbin comprises a cutout portion opened so that a portion of an outer surface of the second magnet is visible.

3. The camera module of claim 1, wherein when viewed from below the second magnet is disposed between the two dummy members.

4. The camera module of claim 2, wherein the first camera module comprises an upper elastic member coupled to an upper portion of the bobbin and an upper portion of the housing, wherein the upper elastic member comprises four upper elastic units, wherein the first substrate comprises four terminals formed on an upper portion of an outer surface of the first substrate, and wherein the four upper elastic units are electrically connected with the four terminals, respectively.

5. The camera module of claim 4, wherein the first camera module comprises a lower elastic member coupled to a lower portion of the bobbin and a lower portion of the housing, wherein the lower elastic member comprises two lower elastic units, wherein the first substrate comprises two terminals formed on a lower portion the first substrate, and wherein the two lower elastic units electrically connect the first coil and the two terminals of the first substrate, respectively.

6. The camera module of claim 5, wherein the first camera module comprises a base disposed below the housing;

a second substrate disposed on an upper surface of the base; and four wires connecting the four upper elastic units and the second substrate, respectively, wherein the second coil is disposed on the second substrate, and wherein a number of turns of a coil wound in the second-third coil corresponds to the number of turns of the coil wound in the second-second coil.

7. The camera module of claim 6, wherein the first coil comprises a first-first coil facing the first-second magnet and a first-second coil facing the first-third magnet, and wherein the first coil does not face the first-first magnet.

8. The camera module of claim 7, wherein the first-first magnet is a two-pole magnet, an inner surface and an outer surface of the first-first magnet having different polarities, and wherein each of the first-second magnet and the first-third magnet is a four-pole magnet in which an upper portion of an inner surface has a polarity different from that of a lower portion of the inner surface and an upper portion of an outer surface and has same polarity as that of a lower portion of the outer surface.

9. The camera module of claim 1, wherein the first dummy member is a non-magnetic body, wherein the first dummy member has a weight corresponding to a weight of the first-first magnet, wherein the first magnet is not disposed at a position corresponding to the first lateral plate of the cover, and wherein the yoke is disposed at a position opposite to the first dummy member with respect to the bobbin.

10. The camera module of claim 1, wherein the first-second magnet is overlapped with the first-third magnet in a direction from the first-second magnet toward the first-third magnet.

11. The camera module of claim 1, wherein the first-first magnet is overlapped with the first dummy member in a direction from the first-first magnet toward the first dummy member.

12. The camera module of claim 1, wherein the second coil is not disposed at a position overlapped with the first dummy member in an optical axis direction.

13. The camera module of claim 1, wherein the first dummy member is disposed on the housing to be opposite to the first-first magnet.

14. The camera module of claim 1, wherein the second magnet is disposed on a lateral surface of the bobbin facing the first lateral plate of the cover.

15. An optical apparatus comprising:

a main body;

a display disposed on the main body; and the camera module of claim 1 disposed on the main body.

16. A camera module comprising:

a first camera module and a second camera module, wherein the first camera module comprises a cover, a bobbin disposed in the cover, a first coil disposed on the bobbin, a first magnet facing the first coil, a second coil disposed below the first magnet, a second magnet disposed on the bobbin, a first sensor detecting the second magnet, and a balancing member disposed on the bobbin and disposed opposite to the second magnet, wherein the second camera module comprises a cover, a bobbin disposed in the cover of the second camera module, a first coil disposed on the bobbin of the second camera module, a first magnet facing the first coil of the second camera module, a second coil disposed below the first magnet of the second camera module, a second magnet disposed on the bobbin of the second camera module, and a second sensor for detecting the second magnet of the second camera module, wherein each of the cover of the first camera module and the cover of the second camera module comprises a first lateral plate disposed adjacent to each other, a second lateral plate disposed opposite the first lateral plate, and a third lateral plate and a fourth lateral plate disposed opposite to each other between the first lateral plate and the second lateral plate, wherein the first magnet of the first camera module comprises a first-first magnet disposed at a position corresponding to the second lateral plate of the first camera module, a first-second magnet disposed at a position corresponding to the third lateral plate of the first camera module, and a first-third magnet disposed at a position corresponding to the fourth lateral plate of the first camera module, wherein a first dummy member is disposed at a position corresponding to the first lateral plate of the first camera module, wherein a second dummy member is disposed at a position corresponding to the first lateral plate of the second camera module, wherein the second coil of the first camera module comprises a second-first coil facing the first-first magnet, a second-second coil facing the first-second magnet, and a second-third coil facing the first-third magnet, wherein a number of turns of a coil wound in the second-first coil is greater than a number of turns of a coil wound in the second-second coil, wherein a yoke is disposed on the first-first magnet, wherein the first dummy member comprises two dummy members spaced apart from each other, wherein the first camera module comprises a first substrate, wherein at least a portion of the first substrate is disposed between the two dummy members, wherein the first sensor is disposed on an inner surface of the first substrate, and wherein the first substrate has two distal ends, an outer lateral surface of each distal end of the first substrate contacting an inner lateral surface of each dummy member, respectively.

17. The camera module of claim 16, wherein the first sensor is disposed between the two dummy members.

18. The camera module of claim 16, wherein when viewed from below the second magnet is disposed between the two dummy members.

19. The camera module of claim 16, wherein the first-second magnet is overlapped with the first-third magnet in a direction from the first-second magnet toward the first-third magnet.

20. A camera module comprising:

a first camera module and a second camera module spaced apart from the first camera module, wherein the first camera module comprises:

a cover;

a housing disposed in the cover;

a bobbin disposed in the housing;

a first coil disposed on the bobbin;

a first magnet disposed on the housing;

a second coil facing the first magnet;

a first dummy member disposed on the housing, a second magnet disposed on the bobbin; and a balancing member disposed on the bobbin and disposed opposite to the second magnet, wherein the cover comprises a first lateral plate disposed adjacent to the second camera module, a second lateral plate disposed opposite to the first lateral plate, and a third lateral plate and a fourth lateral plate disposed opposite to each other between the first lateral plate and the second lateral plate, wherein the first dummy member is disposed between the bobbin and the first lateral plate, wherein the first magnet comprises a first-first magnet disposed at a position corresponding to the second lateral plate, a first-second magnet disposed at a position corresponding to the third lateral plate, and a first-third magnet disposed at a position corresponding to the fourth lateral plate, wherein the first magnet is not disposed between the bobbin and the first lateral plate, wherein the second coil comprises a second-first coil facing the first-first magnet, a second-second coil facing the first-second magnet, and a second-third coil facing the first-third magnet, wherein a number of turns of a coil wound in the second-first coil is greater than a number of turns of a coil wound in the second-second coil, wherein a yoke is disposed on the first-first magnet, wherein the first dummy member comprises two dummy members spaced apart from each other, wherein the first camera module comprises a first substrate, wherein at least a portion of the first substrate is disposed between the two dummy members, wherein the first sensor is disposed on an inner surface of the first substrate, and wherein the first substrate has two distal ends, an outer lateral surface of each distal end of the first substrate contacting an inner lateral surface of each dummy member, respectively.

* * * * *